(12) United States Patent
Shin

(10) Patent No.: US 10,437,346 B2
(45) Date of Patent: *Oct. 8, 2019

(54) WEARABLE DEVICE AND METHOD OF OPERATING THE SAME

(71) Applicant: Samsung Electronics Co., Ltd., Gyeonggi-do (KR)

(72) Inventor: Ho-chul Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,586

(22) Filed: Nov. 14, 2017

(65) Prior Publication Data

US 2018/0067564 A1  Mar. 8, 2018

Related U.S. Application Data

(63) Continuation of application No. 14/813,889, filed on Jul. 30, 2015, now Pat. No. 9,823,751.

(30) Foreign Application Priority Data

Jul. 30, 2014 (KR) .................. 10-2014-0097613
Apr. 3, 2015 (KR) .................. 10-2015-0047493

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/163* (2013.01); *G06F 3/011* (2013.01); *G06F 3/0482* (2013.01);
(Continued)

(58) Field of Classification Search
CPC ...... G06F 3/017; G06F 3/011; G06F 3/04812; G06F 3/04817; G06F 3/0482;
(Continued)

(56) References Cited

U.S. PATENT DOCUMENTS 8,279,181 B2   10/2012 Kanno
8,405,601 B1*  3/2013 Beale .................... G06F 3/0219
                                                         345/156
(Continued)

FOREIGN PATENT DOCUMENTS

CN   1940635      4/2007
CN   101203003    6/2008
(Continued)

OTHER PUBLICATIONS

Chris Harrison et al., "Abracadabra: Wireless, High-Precision, and Unpowered Finger Input for very Small Mobile Devices", Proceedings of the 22nd Annual ACM Symposium on User Interface Software and Technology, XP007913390, Oct. 4, 2009, 6 pages.

(Continued)

*Primary Examiner* — Tom V Sheng
(74) *Attorney, Agent, or Firm* — The Farrell Law Firm, P.C.

(57) ABSTRACT

Disclosed is wearable device including a sensor that detects a movement of a peripheral object, a display unit that displays a plurality of items and displaying a focus on at least one of the plurality of items, and a processor that controls the display unit to move the focus onto an item at a position corresponding to a moving direction of the peripheral object.

20 Claims, 55 Drawing Sheets

(51) Int. Cl.
*G06F 3/0482* (2013.01)
*G06F 3/0481* (2013.01)

(52) U.S. Cl.
CPC ...... *G06F 3/04812* (2013.01); *G06F 3/04817* (2013.01); *G06F 2203/04101* (2013.01)

(58) Field of Classification Search
CPC .............. G06F 3/0484; G06F 3/04842; G06F 3/04845; G06F 3/0485; G06F 3/04855; G06F 1/163; G06F 2203/04101; G06F 2203/04803; G02B 27/01; G02B 27/017
See application file for complete search history.

(56) References Cited

U.S. PATENT DOCUMENTS

| | | | |
|---|---|---|---|
| 8,451,254 B2 | 5/2013 | Bisutti | |
| 8,624,836 B1* | 1/2014 | Miller | G06F 1/163 345/157 |
| 9,189,071 B2 | 11/2015 | Qin et al. | |
| 9,256,288 B2 | 2/2016 | Lee et al. | |
| 9,323,339 B2 | 4/2016 | Tamai | |
| 9,823,751 B2* | 11/2017 | Shin | G06F 1/163 |
| 2008/0106525 A1* | 5/2008 | Orr | G06F 3/0338 345/174 |
| 2009/0119615 A1* | 5/2009 | Huang | G06F 3/03547 715/786 |
| 2010/0169781 A1 | 7/2010 | Graumann et al. | |
| 2010/0219943 A1* | 9/2010 | Vanska | G06F 1/163 340/407.1 |
| 2011/0109544 A1 | 5/2011 | Kitagawa et al. | |
| 2011/0158478 A1* | 6/2011 | Yamada | G02B 6/0006 382/103 |
| 2011/0291985 A1 | 12/2011 | Wakako | |
| 2011/0314425 A1 | 12/2011 | Chiang | |
| 2012/0026111 A1 | 2/2012 | Kasahara et al. | |
| 2012/0082013 A1 | 4/2012 | Yeung et al. | |
| 2013/0002544 A1 | 1/2013 | Norieda et al. | |
| 2013/0013229 A1* | 1/2013 | Norieda | G06F 3/011 702/56 |
| 2013/0106684 A1 | 5/2013 | Weast et al. | |
| 2013/0169560 A1* | 7/2013 | Cederlund | G06F 3/013 345/173 |
| 2013/0234924 A1 | 9/2013 | Janefalkar et al. | |
| 2013/0254705 A1* | 9/2013 | Mooring | G06F 3/0488 715/784 |
| 2013/0335301 A1 | 12/2013 | Wong et al. | |
| 2013/0335303 A1 | 12/2013 | Maciocci et al. | |
| 2014/0062877 A1* | 3/2014 | Lee | G06F 1/1694 345/158 |
| 2014/0134575 A1 | 5/2014 | Kim | |
| 2014/0139454 A1 | 5/2014 | Mistry et al. | |
| 2014/0143738 A1* | 5/2014 | Underwood, IV | H04L 51/38 715/863 |
| 2014/0204062 A1 | 7/2014 | Goto | |
| 2014/0347289 A1* | 11/2014 | Suh | G06F 3/017 345/173 |
| 2015/0049037 A1 | 2/2015 | Vincent | |
| 2015/0153889 A1* | 6/2015 | VanBlon | G06F 3/0416 345/173 |
| 2015/0199020 A1* | 7/2015 | Hatada | G06F 3/04812 345/158 |
| 2015/0277715 A1* | 10/2015 | Wang | G06F 3/04845 345/661 |
| 2015/0324004 A1 | 11/2015 | Lee | |
| 2015/0341752 A1* | 11/2015 | Flynn | G06F 3/0488 455/456.3 |
| 2016/0041680 A1* | 2/2016 | Chi | H04B 1/385 345/173 |
| 2016/0291687 A1* | 10/2016 | Kasahara | G06F 3/03547 |
| 2016/0328023 A1 | 11/2016 | Mistry et al. | |

FOREIGN PATENT DOCUMENTS

| | | |
|---|---|---|
| CN | 101619976 | 1/2010 |
| CN | 102346637 | 2/2012 |
| EP | 2 703 971 | 3/2014 |
| JP | 2010-237765 | 10/2010 |
| JP | 2012-113715 | 6/2012 |
| JP | 2012-113743 | 6/2012 |
| JP | 2013-033382 | 2/2013 |
| JP | 2013-545183 | 12/2013 |
| JP | 2014-102838 | 6/2014 |
| KR | 1020010110615 | 12/2013 |
| KR | 1020140062893 | 5/2014 |
| TW | 201037558 | 10/2010 |
| TW | 201344484 | 11/2013 |
| WO | WO 2011/161312 | 12/2011 |
| WO | WO 2012/147959 | 11/2012 |
| WO | WO 2014/106085 | 7/2014 |

OTHER PUBLICATIONS

Takehiro Niikura et al., "In-air Typing Interface for Mobile Devices with Vibration Feedback", ACM Siggraph 2010 Emerging Technologies, Jul. 29, 2010, 1 Page.
Jarrod Knibbe et al., "Extending Interaction for Smart Watches", XP058047875, Apr. 26, 2014.
International Search Report dated Oct. 16, 2015 issued in counterpart application No. PCT/KR2015/006995, 8 pages.
European Search Report dated Dec. 23, 2015 issued in counterpart application No. 15178252.1-1972, 10 pages.
Taiwanese Search Report dated Apr. 11, 2016 issued in counterpart application No. 104124615, 6 pages.
Japanese Office Action dated Sep. 25, 2017 issued in counterpart application No. 2017-504397, 6 pages.
Chinese Office Action Report dated Jun. 20, 2017 Issued in counterpart application No. 201510458504.2, 14 pages.
Japanese Final Rejection dated Mar. 19, 2018 issued in counterpart application No. 2017-504397, 6 pages.
Chinese Office Action Report dated Jul. 13, 2018 issued in counterpart application No. 201510458504.2, 16 pages.
Japanese Office Action dated Sep. 14, 2018 issued in counterpart application No. 2017-504397, 6 pages.
Martin Pielot et al., "PocketMenu: Non-Visual Menus for Touch Screen Devices", Proceedings of the 14th International Conference on Human-computer interaction with mobile devices and services, MobileHCI '12, Sep. 21, 2012, 4 pages.
European Search Report dated Dec. 4, 2018 issued in counterpart application No. 15178252.1-1216, 8 pages.
Indian Office Action dated Dec. 14, 2018 issued in counterpart application No. 2768/MUM/2015, 5 pages.
Chinese Office Action dated Jan. 14, 2019 issued in counterpart application No. 201510458504.2, 12 pages.

\* cited by examiner

FIG. 20
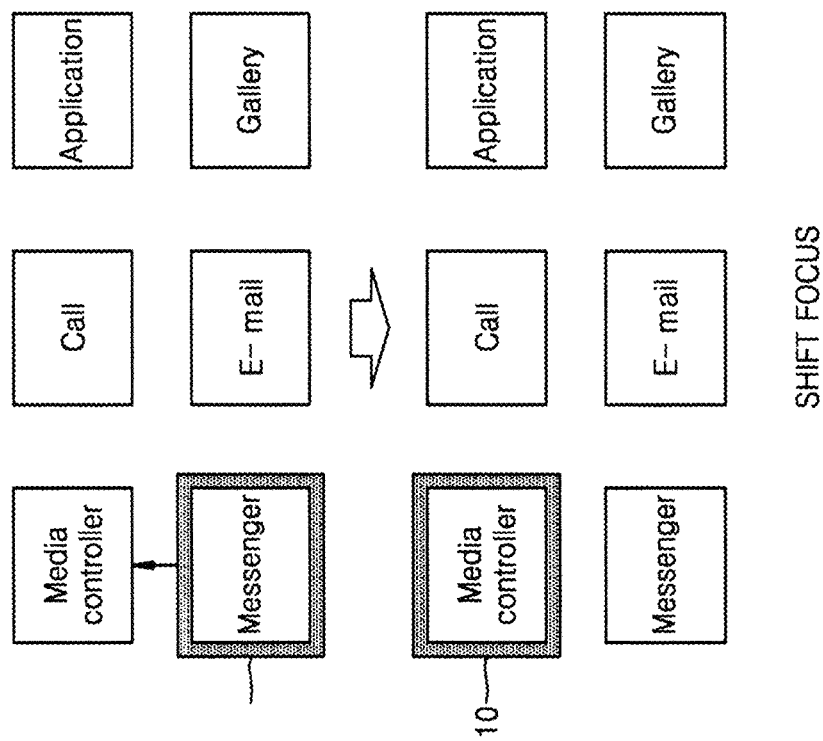
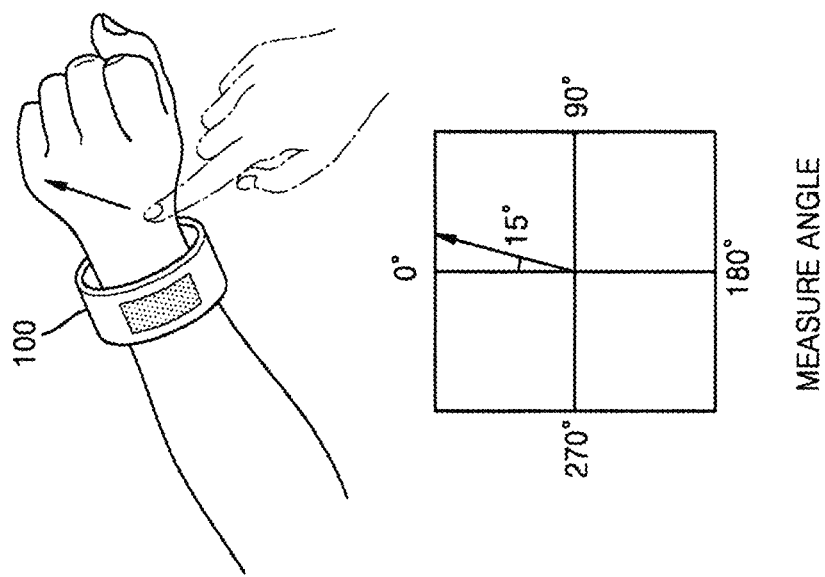

FIG. 39
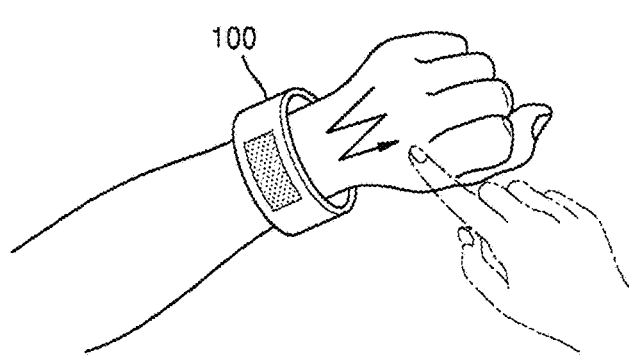
Sweep
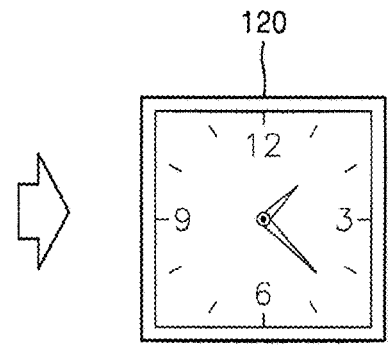
HOME SCREEN/UNDO

Previous

FIG. 41
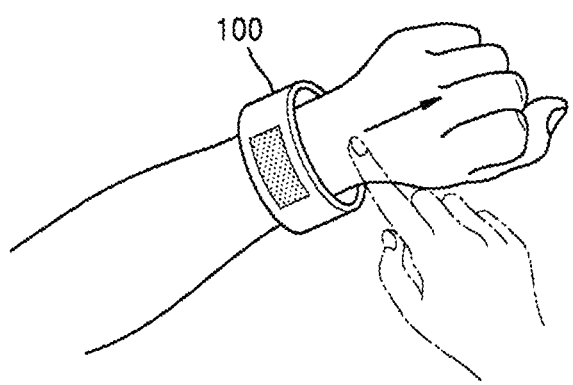 
Next

WEARABLE DEVICE AND METHOD OF OPERATING THE SAME

PRIORITY

This application is a continuation application of U.S. patent application Ser. No. 14/813,889, which was filed on Jul. 30, 2015 and which claims priority under 35 U.S.C. § 119(a) to Korean Patent Application No. 10-2014-0097613, filed on Jul. 30, 2014 in the Korean Intellectual Property Office, and to Korean Patent Application No. 10-2015-0047493, filed on Apr. 3, 2015 in the Korean Intellectual Property Office, the contents of each of which are incorporated herein by reference.

BACKGROUND OF THE INVENTION

1. Field of the Invention

The present disclosure relates to a wearable device and a method of operating the wearable device.

2. Description of the Related Art

As processors are decreased in size, mobile devices have also decreased in size. Accordingly, a wearable device capable of being worn on a user's body has been introduced.

A user obtains desired information by manipulating the wearable device, such as by using a touch interface. The result of the manipulation is displayed on a display apparatus of the wearable device.

The wearable device is manufactured to be small-sized to facilitate being worn. In the conventional art, however, it is difficult for a user to conveniently manipulate such wearable devices. Accordingly, there is a need in the art for a method in which a user may conveniently manipulate a small-sized wearable device.

SUMMARY

Accordingly, the present disclosure has been made to address at least the problems and/or disadvantages described above and to provide at least the advantages described below.

Accordingly, an aspect of the present disclosure is to provide a wearable device and a method of operating the wearable device. According to an aspect of the present disclosure, a wearable device includes a sensor that detects a movement of a peripheral object, a display unit that displays a plurality of items and displays a focus on at least one of the plurality of items, and a processor that controls the display unit to shift the focus onto an item at a position corresponding to a moving direction of the peripheral object.

According to another aspect of the present disclosure, a method of operating a wearable device includes displaying a plurality of items and displaying a focus on at least one of the plurality of items, detecting a movement of a peripheral object, and shifting and displaying the focus on an item at a position corresponding to a moving direction of the peripheral object.

BRIEF DESCRIPTION OF THE DRAWINGS

The above and other aspects, features, and advantages of the present disclosure will become apparent and more readily appreciated from the following description of the embodiments, taken in conjunction with the accompanying drawings in which:

FIGS. 20 through 26 illustrate examples in which a wearable device moves a focus according to a user input, according to embodiments of the present disclosure;

FIGS. 35 through 41 illustrate a method of navigating a wearable device, according to embodiments;

DETAILED DESCRIPTION OF EMBODIMENTS OF THE DISCLOSURE

Figure 1A:
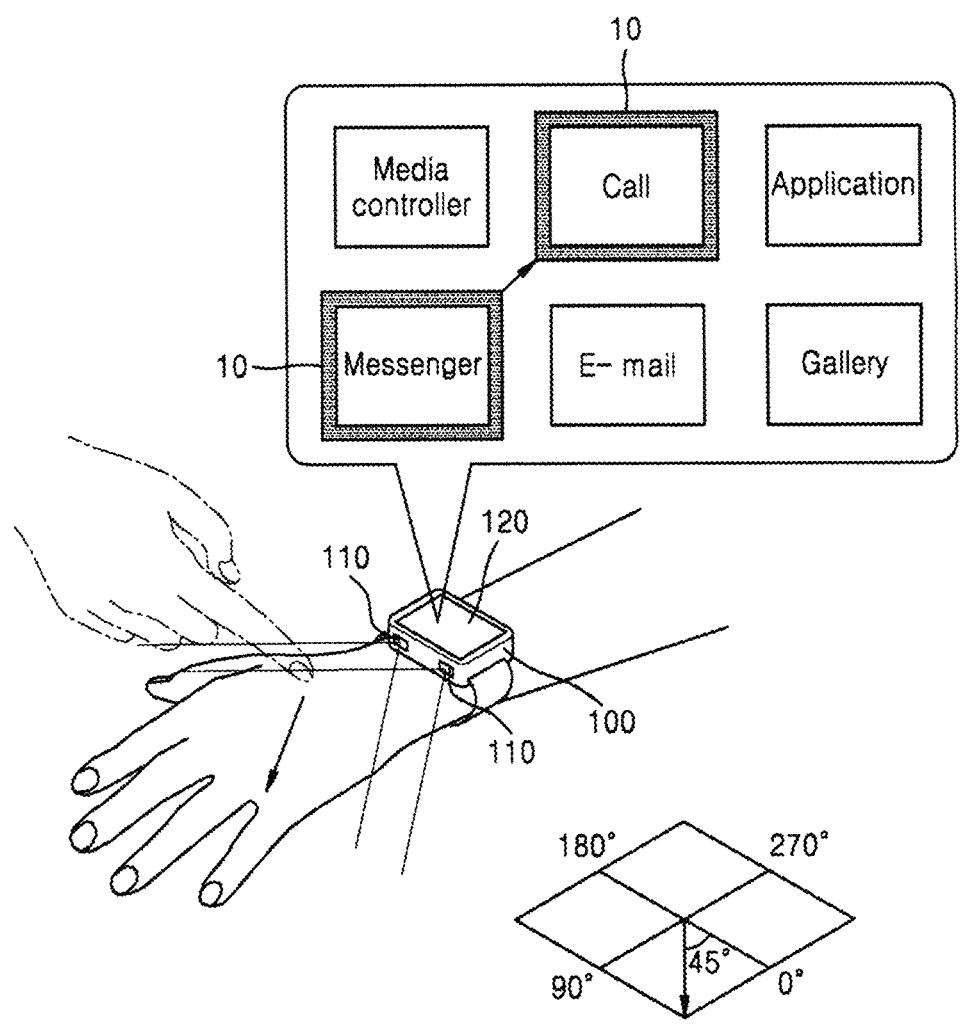
FIG. 1A illustrates a method of operating a wearable device, according to an embodiment of the present disclosure.

Embodiments of the present disclosure will be described in detail with reference to the attached drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for the sake of clarity and conciseness. While such terms as "first," "second," etc., may be used to describe various components, such components must not be limited to the above terms. The above terms are used only to distinguish one component from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1A illustrates a method of operating a wearable device 100, according to an embodiment of the present disclosure. Referring to FIG. 1A, the wearable device 100 senses a movement of an object to shifts the focus 10 from one item to another.

The object may be an item sensed in the periphery of the wearable device 100, such as a user's finger. The "periphery" of the wearable device 100 indicates a region within a preset distance from the wearable device 100 or from a side surface of the wearable device 100. For example, the periphery of the wearable device 100 may be the back or front of a user's hand that wears the wearable device 100. The periphery of the wearable device 100 may be a region in which the object is recognizable by a camera of the wearable device 100.

Sensing the movement of the object indicates that the wearable device 100 senses a peripheral object and measures such parameters as a moving direction of the object, a moving angle, a moving distance, and a moving speed.

The wearable device 100 includes a sensor 110 and a display unit 120. The sensor 110 detects the peripheral object. The display unit 120 displays at least one item and the focus 10.

The at least one item indicates a function of a menu of the wearable device 100. The display unit 120 displays one item on an entire screen or two or more items on a screen. The display unit 120 may differently display sizes of items. For example, the display unit 120 displays a centered item to be greater than other items.

The focus 10 is an identification display indicating a currently selected item. The focus 10 may be expressed in such a way that a color of an item or a size thereof is changed. Alternatively, the focus 10 may be a figure displayed on an item.

Figure 6:
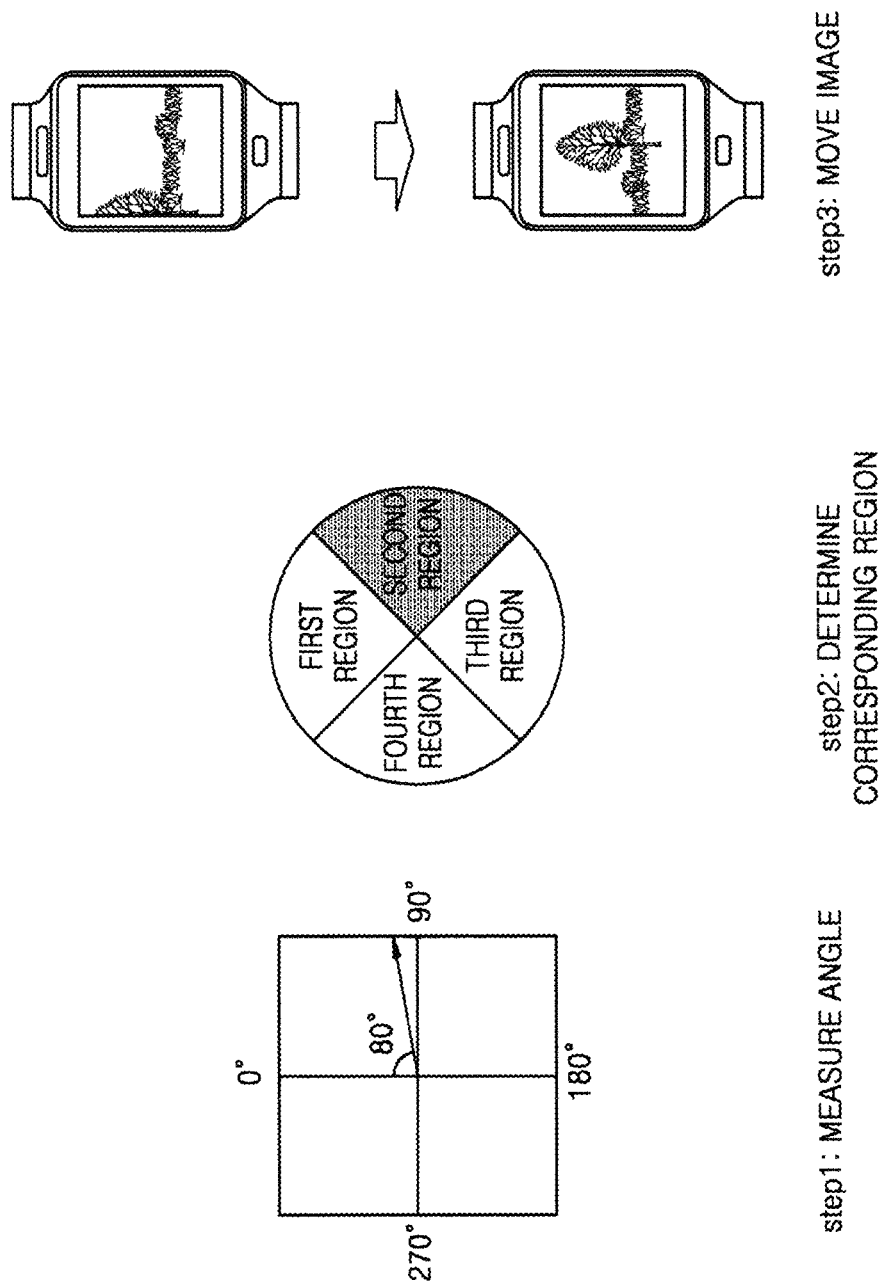
FIG. 6 illustrates a method in which a wearable device determines a region corresponding to an angle and moves an image, according to an embodiment of the present disclosure.

FIG. 1A illustrates an example of the focus 10 that is outside the at least one item. In FIG. 1A, 6 items (a 'Media controller', a 'Call', an 'Application', a 'Messenger', an E-mail, and a 'Gallery') are displayed on the wearable device 100. FIG. 1A illustrates a process of displaying the focus 10 on the 'Messenger' item and then adjusting the focus 10 to the 'Call' item.

The sensor 110 of the wearable device 100 detects the movement of the object and whether the object is within a set distance. The sensor 110 measures the moving direction of the object, the moving angle, and the moving distance.

In FIG. 1A, the wearable device 100 recognizes the user's finger and movements of various objects. For example, the wearable device 100 recognizes an item such as a pen.

The wearable device 100 displays a plurality of items on the display unit 120. The wearable device 100 displays the focus 10 on at least one of the plurality of items.

The wearable device 100 obtains the moving angle or the moving direction of the object. When the wearable device 100 measures a position of the object and when the position of the object is changed, the wearable device 100 calculates the moving angle of the object or the moving direction. In FIG. 1A, the object moves in a direction of 45 degrees. The wearable device 100 sets a distance or speed range and calculates the moving angle of the object only when the moving distance or moving speed of the object is within the set range. Thus, when the moving distance or moving speed of the object is not within the set range (for example, the moving distance is short or the moving speed is slow), the wearable device 100 determines a small movement of the object or that a user does not want to make an input. In this case, the wearable device 100 does not shift the focus 10.

The wearable device 100 shifts the focus 10 to an item at a position corresponding to the movement direction of the object and determines a movement direction of the focus 10 according to the movement direction of the object. The wearable device 100 shifts the focus 10 displayed on the display unit 120 to an item positioned in the determined movement direction. In FIG. 1A, the object moves in the direction of 45 degrees, and thus the wearable device 100 shifts the focus 10 from the 'Messenger' item to the 'Call' item.

The wearable device 100 may be worn by the user on his or her body, such as a smart watch, smart glasses, or an arm band.

The wearable device 100 includes two sensors 110 that are disposed in a position in which the wearable device 100 may sense a user's gesture, such as in a side surface of a smart watch, as illustrated in FIG. 1A. In another example, the sensors 110 are disposed in the front of smart glasses.

Figure 1B:
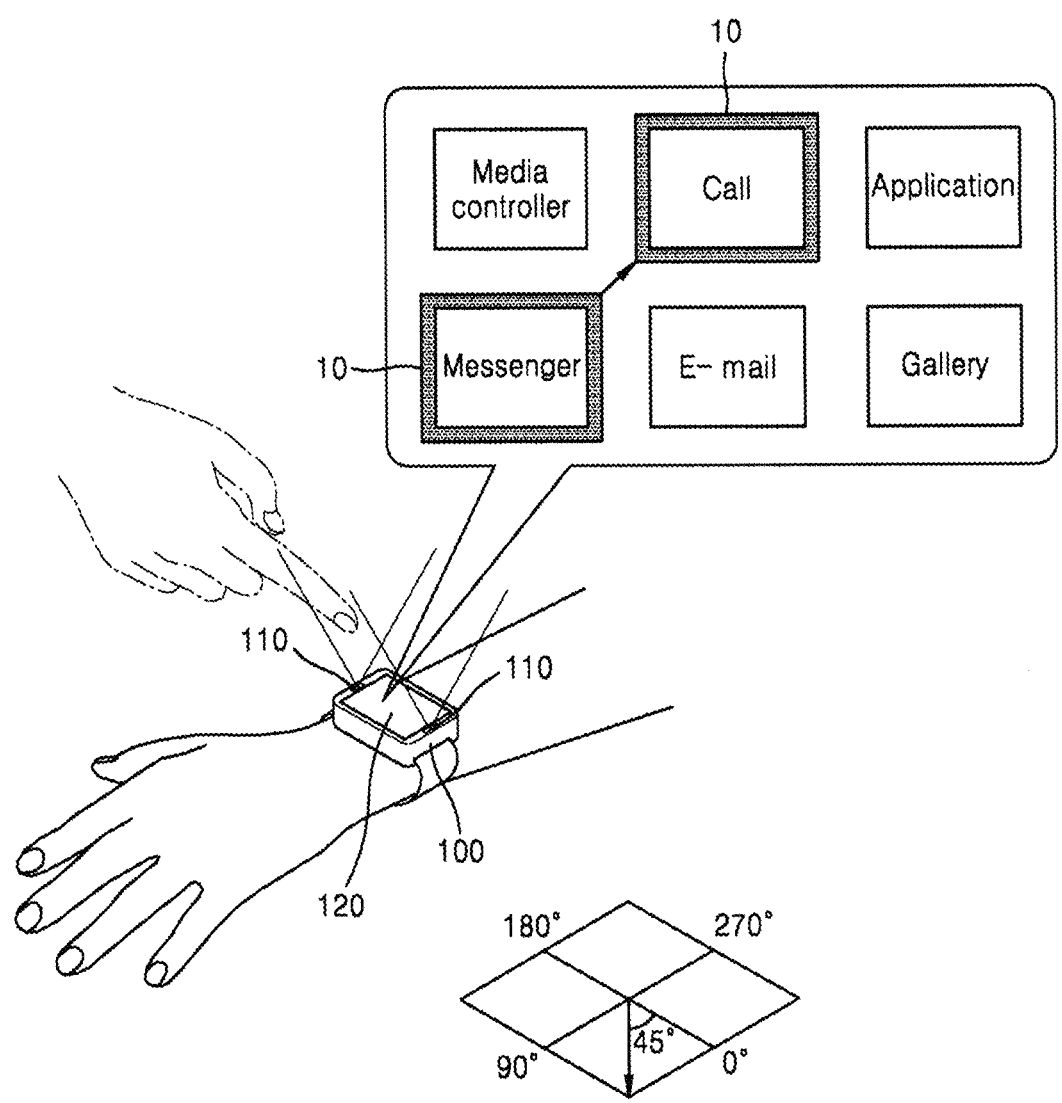
FIG. 1B illustrates a method of operating a wearable device including sensors on the front of the wearable device, according to an embodiment of the present disclosure.

FIG. 1B illustrates a method of operating the wearable device 100 including the sensors 110 on the front of the wearable device, according to an embodiment of the present disclosure. Referring to FIG. 1B, the wearable device 100 includes the sensors 110, and a display unit 120 included the front region. The two sensors 110 are positioned in upper and lower sides of the display unit 120.

The sensors 110 detect an object that moves in front of the wearable device 100, such as by sensing a user's finger that moves in front of the sensors 110, as illustrated in FIG. 1B.

The wearable device 100 obtains a direction of the user's finger sensed by the sensors 110 and shifts the focus 10 to an item at a position corresponding to the obtained direction.

Figure 2:
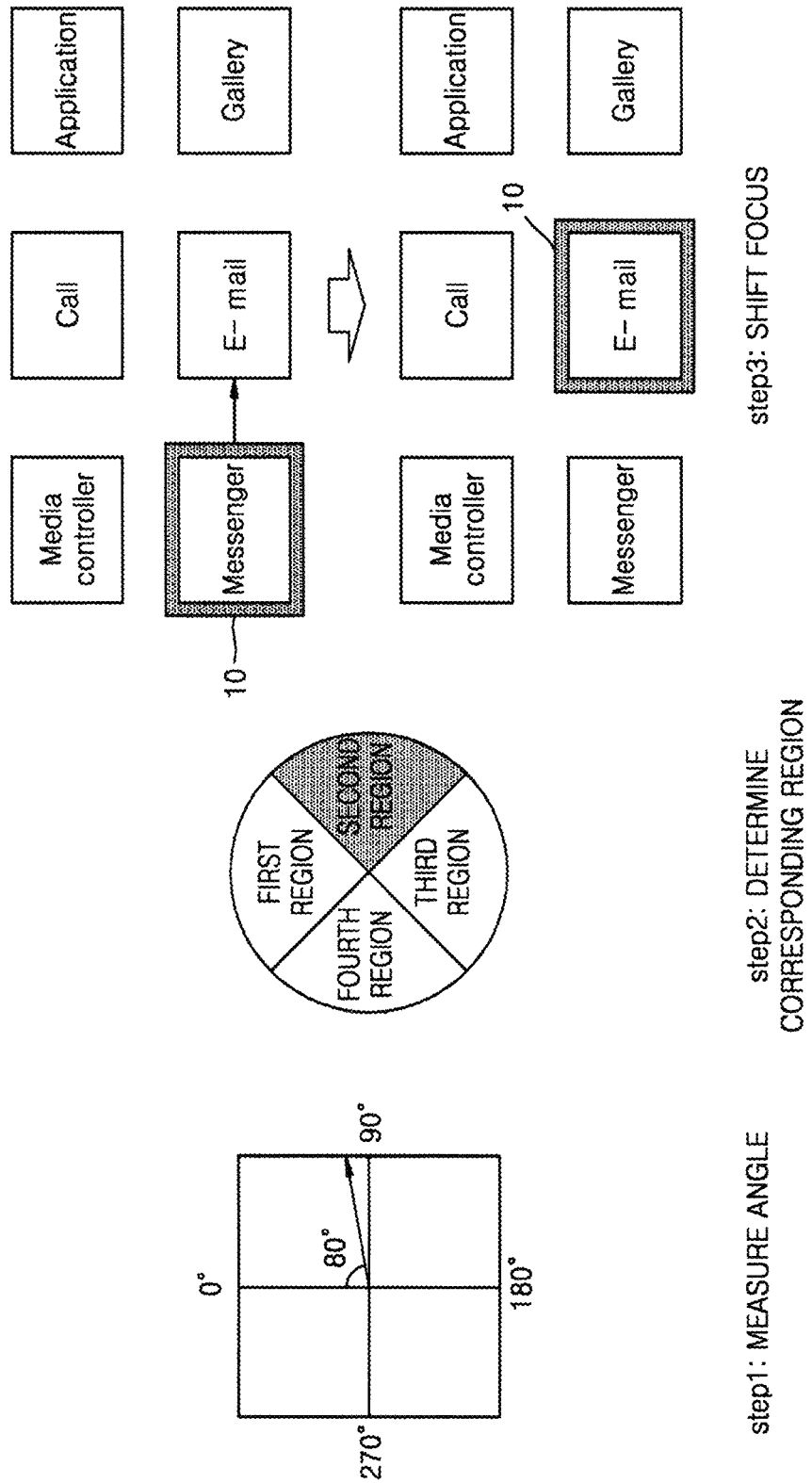
FIG. 2 illustrates a method of adjusting a focus on a display unit of a wearable device by using a movement of an object in the periphery of the wearable device, according to an embodiment of the present disclosure.

FIG. 2 illustrates a method of adjusting the focus 10 displayed on a display unit of the wearable device 100 by using a movement of an object in the periphery of the wearable device 100, according to an embodiment of the present disclosure. Referring to FIG. 2, the wearable device 100 measures an angle and determines a movement direction of the focus 10 according to the measured angle.

In step 1, the wearable device 100 measures a movement angle of an object in the periphery of the wearable device 100. In FIG. 2, for example, the movement angle of the object is 80 degrees and is calculated with respect to the wearable device 100.

In step 2, the wearable device 100 determines a region corresponding to the measured angle. The wearable device 100 may previously set regions according to the measured angle and determine a region corresponding to the measured angle. For example, the wearable device 100 may set 360 degrees to include at least two regions. In FIG. 2, the wearable device 100 sets 360 degrees to include four regions. An angle of 80 degrees may be in a second region. Thus, the wearable device 100 determines the second region as corresponding to the measured angle.

In step 3, the wearable device 100 shifts the focus 10 displayed on the display unit in a direction corresponding to the determined region. In FIG. 2, the focus 10 shifts from a 'Messenger' item to an 'E-mail' item.

Figure 3:
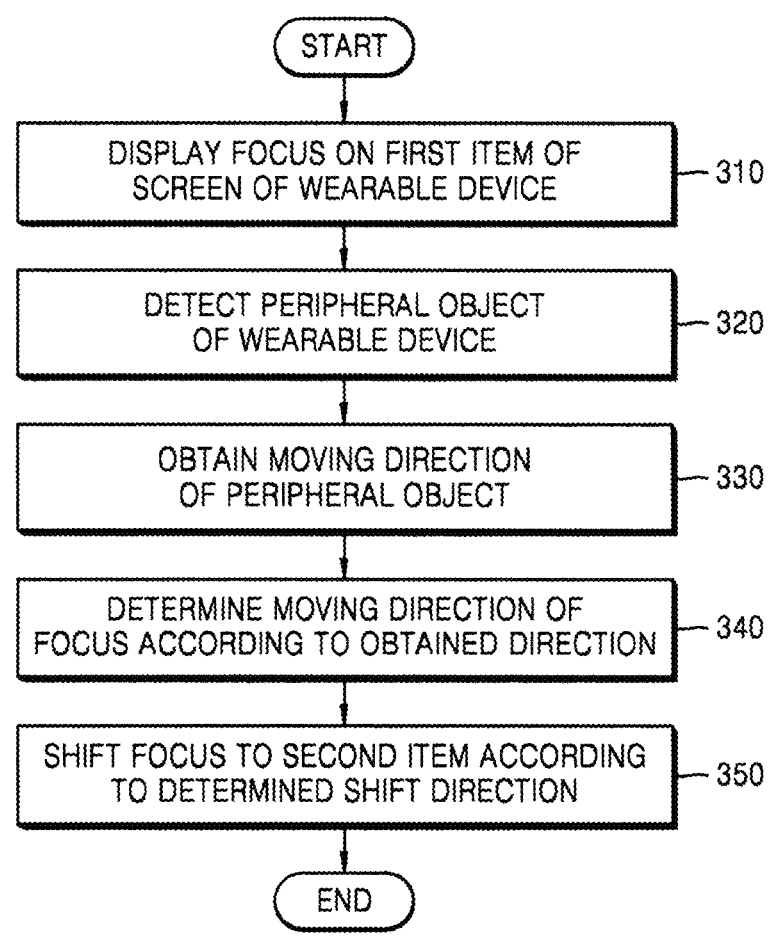
FIG. 3 is a flowchart of a method of operating a wearable device, according to an embodiment of the present disclosure.

FIG. 3 is a flowchart of a method of operating the wearable device 100, according to an embodiment of the present disclosure. Referring to FIG. 3, the wearable device 100 detects a peripheral object and shifts the focus from a first item to a second item.

In operation 310, the wearable device 100 displays the focus on the first item of a screen. The wearable device 100 displays the focus on the first item among a plurality of items displayed on the screen.

In operation 320, the wearable device 100 detects the peripheral object by using the sensor 110.

In operation 330, the wearable device 100 obtains a moving direction of the peripheral object by calculating a moving angle of the peripheral object with respect to the wearable device 100.

In operation 340, the wearable device 100 determines a shifting direction of the focus according to the obtained direction.

In operation 350, the wearable device 100 shifts the focus to the second item according to the determined moving direction.

The wearable device 100 sets regions corresponding to a shiftable direction of the focus, maps the regions and the obtained direction, and determines the shifting direction of the focus.

The shiftable direction of the focus is a direction in which an item on which the focus may be shifted is currently present by using an item arrangement method. The wearable device 100 determines shiftable directions of the focus, and sets the regions to the number of the checked directions. In this regard, the wearable device 100 sets the regions respectively, including the movable directions. For example, if the movable direction is toward an upper side, the wearable device 100 sets angles from about −20 degrees to about 20 degrees as a region corresponding to the upper side.

Mapping the regions and the obtained direction relates to determining which region includes the obtained direction among the regions, which may be identified as an angle range. For example, angles from about 0 degrees to about 180 degrees may be set as the first regions, and angles from about 180 degrees to about 360 degrees may be set as the second region. The wearable device 100 determines a direction corresponding to the determined region. The wearable device 100 determines the region including the obtained direction. The region may be set in correspondence to the movable direction of the focus, and thus the wearable device 100 determines a moving direction of the focus corresponding to the determined region.

Figure 4:
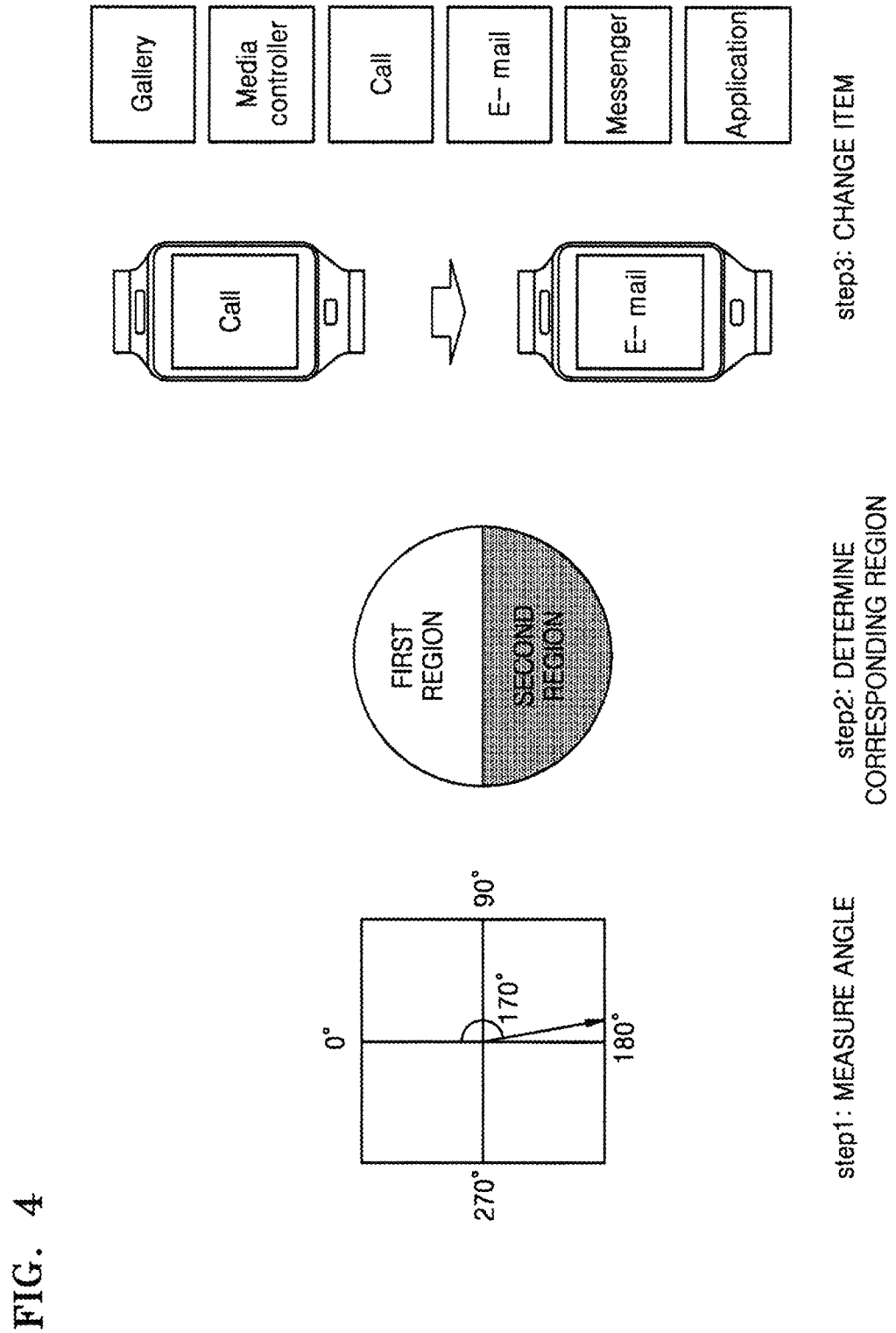
FIG. 4 illustrates a method in which a wearable device changes a displayed item by determining a region according to an angle, according to another embodiment of the present disclosure.

FIG. 4 illustrates a method in which the wearable device 100 changes a displayed item by determining a region according to an angle, according to another embodiment of the present disclosure. Referring to FIG. 4, the wearable device 100 changes the item displayed according to a moving angle of an object.

In step 1, the wearable device 100 measures the moving angle of the object, which is 170 degrees in FIG. 2.

In step 2, the wearable device 100 determines a region corresponding to the measured moving angle. The wearable device 100 sets regions according to the measured moving angle and determines a region including the measured moving angle. In FIG. 2, items are arranged in one column, and thus an upper or lower item of a current item may be displayed according to a user's manipulation. Thus, the wearable device 100 divides 360 degrees in half, sets the upper region as a first region, and sets the lower region as a second region. In FIG. 2, the measured angle of 170 degrees corresponds to the second region. Thus, the wearable device 100 determines the second region as corresponding to the measured moving angle.

In FIG. 2, if an item 'Gallery' is displayed, the upper region may be set as a neutral region, and the lower region may be set as the first region. When the moving angle of the object is included in the neutral region, the wearable device 100 may not change the displayed item. An item that is to be displayed is no longer present in a direction corresponding to the neutral region, and thus the wearable device 100 provides a user with feedback to inform the user that the item 'Gallery' is a final item.

In step 3, the wearable device 100 changes the display item. The wearable device 100 displays an item disposed in a direction corresponding to the determined region.

For example, the items are arranged in one column, and angles included in the second region are obtained. Thus, the wearable device 100 determines an item 'E-mail' disposed in an upper position to a currently displayed item 'Call' as an item that is to be next displayed.

Figure 5:
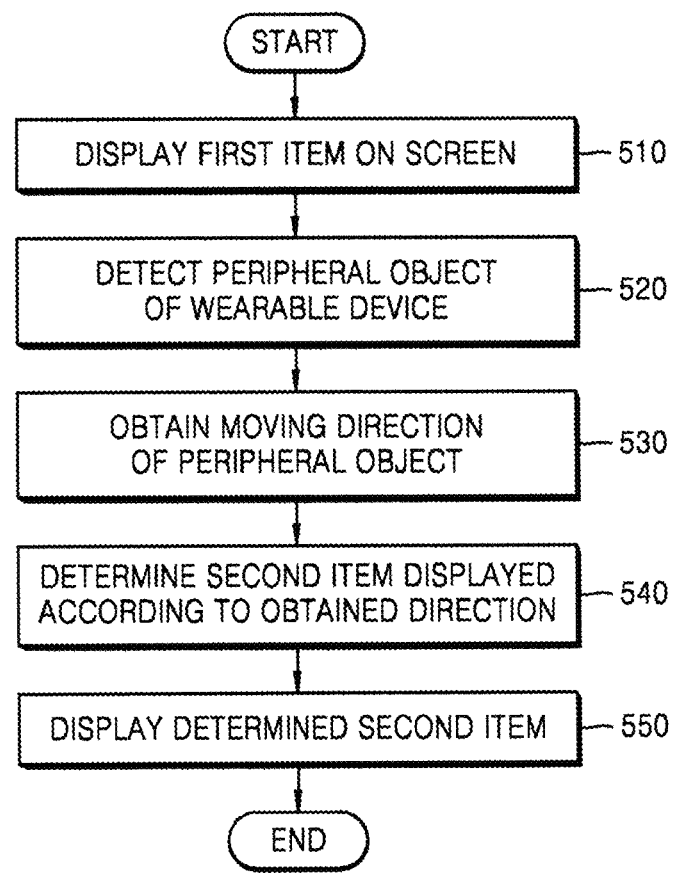
FIG. 5 is a flowchart of a method of operating a wearable device, according to another embodiment of the present disclosure.

FIG. 5 is a flowchart of a method of operating the wearable device 100, according to another embodiment of the present disclosure. Referring to FIG. 5, the wearable device 100 detects a peripheral object to change an item displayed according to a moving direction of the peripheral object.

In operation 510, the wearable device 100 displays a first item on a display unit of the wearable device 100.

In operation 520, the wearable device 100 detects the peripheral object by using the sensor 110.

In operation 530, the wearable device 100 obtains a moving direction of the peripheral object by calculating a moving angle of the peripheral object with respect to the wearable device 100.

In operation 540, the wearable device 100 determines a second item displayed according to the obtained direction. The wearable device 100 determines a currently displayed item and which item is to be displayed according to relative positions of the items.

In operation 550, the wearable device 100 displays the determined second item on the display unit of the wearable device 100.

The wearable device 100 sets corresponding regions according to arrangements of the items, and determines a displayed item by determining a region including the obtained direction.

FIG. 6 illustrates a method in which the wearable device 100 determines a region corresponding to an angle and moves an image, according to an embodiment of the present disclosure.

In step 1, the wearable device 100 measures the angle in which an object moves, such as 80 degrees in FIG. 6.

In step 2, the wearable device 100 determines the region corresponding to the measured angle. The wearable device 100 sets regions according to the angle and determines a region including the measured angle. In FIG. 6, 80 degrees corresponds to a second region. Thus, the wearable device 100 determines the second region as corresponding to the measured angle.

In step 3, the wearable device 100 moves the image in a direction corresponding to the determined region. In FIG. 6, the right direction corresponds to the second region, and thus the image moves to the right.

According to another embodiment, the wearable device 100 moves the image in the same manner in which a detected object moves. For example, if the object is detected, the wearable device 100 calculates a moving coordinate of the object with respect to a position of the detected object and moves the image by the calculated moving coordinate. The wearable device 100 moves a center of the image to the moving coordinate calculated by using a center of a screen as a reference point.

According to another embodiment, the wearable device 100 measures a moving angle and distance of a peripheral object of the wearable device 100 to move the image. In other words, the wearable device 100 moves the image at the measured angle by, or in proportion to the measured distance. If the peripheral object of the wearable device 100 is detected, the wearable device 100 moves the image by using a detected position as the reference point.

Figure 7:
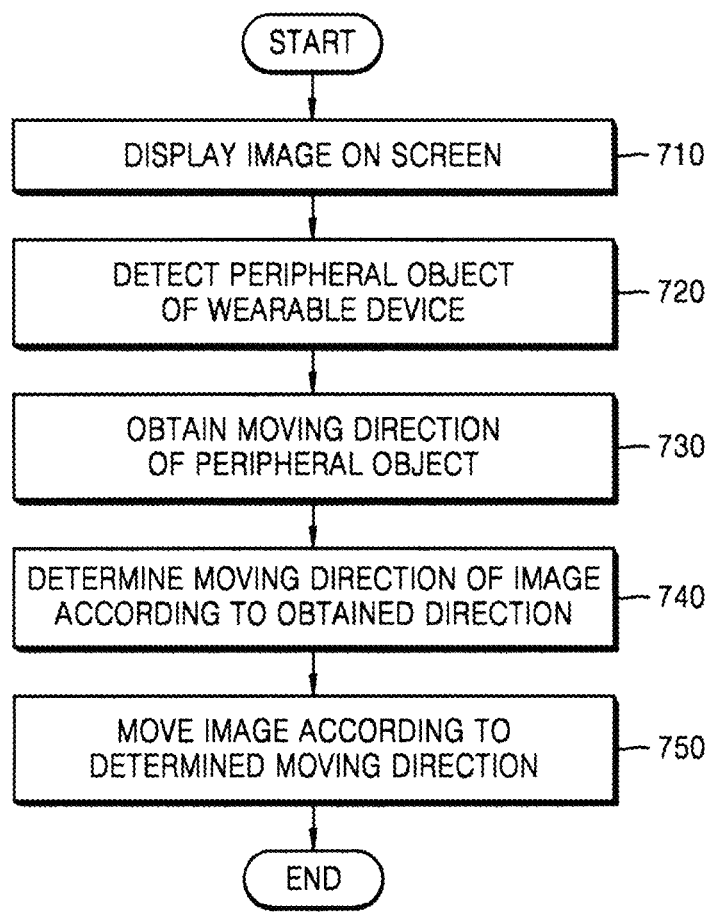
FIG. 7 is a flowchart of a method of operating a wearable device, according to another embodiment of the present disclosure.

FIG. 7 is a flowchart of a method of operating the wearable device 100, according to another embodiment of the present disclosure. Referring to FIG. 7, the wearable device 100 detects a peripheral object so as to move an image according to a moving direction of the peripheral object.

In operation 710, the wearable device 100 displays the image on a screen.

In operation 720, the wearable device 100 detects the peripheral object by using the sensor 110.

In operation 730, the wearable device 100 obtains a moving direction of the peripheral object. The wearable device 100 calculates a moving angle of the peripheral object with respect to the wearable device 100.

In operation 740, the wearable device 100 determines a moving direction of the image according to the obtained direction.

In operation 750, the wearable device 100 moves the image according to the determined moving direction.

The wearable device 100 obtains a moving distance of the peripheral object and moves the image by the obtained moving distance.

Figure 8:
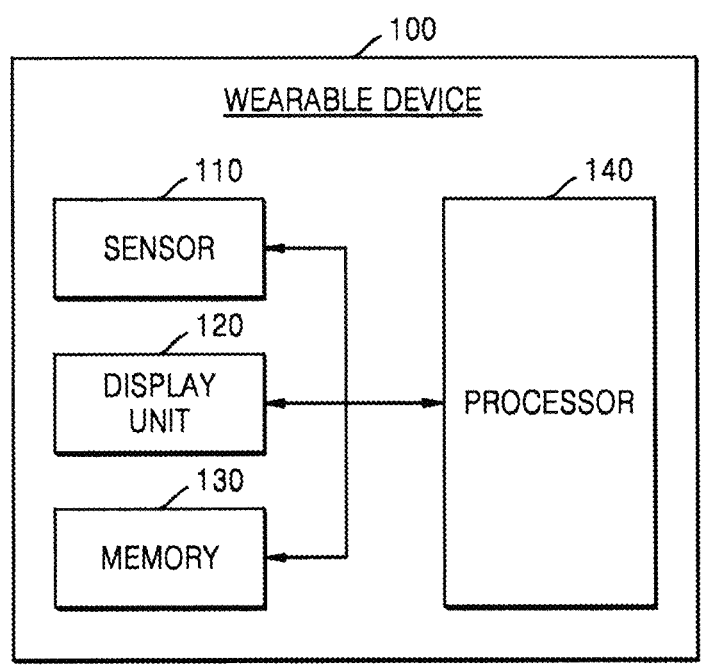
FIG. 8 is a block diagram of a wearable device, according to an embodiment of the present disclosure.

FIG. 8 is a block diagram of the wearable device 100, according to an embodiment of the present disclosure. Referring to FIG. 8, the wearable device 100 includes the sensor 110, the display unit 120, a memory 130, and a processor 140.

The sensor 110 senses a peripheral object of the wearable device 100 within a predetermined range. If the sensor 110 senses the peripheral object, the sensor 110 outputs a signal indicating the peripheral object has been sensed to the processor 140. The sensor 110 may also output information indicating a position of the peripheral object. For example, the sensor 110 measures and outputs a coordinate of the peripheral object by using the sensor 110 as an original point.

The sensor 110 obtains a moving direction of the peripheral object of the wearable device 100. The sensor 110 calculates a coordinate of a start point at which the peripheral object starts moving and a coordinate of an end point at which the peripheral object stops moving, and calculates the moving direction of the peripheral object by using the sensor 110 and a position relationship between the start point and the end point.

The sensor 110 may be an InfraRed (IR) sensor, an ultrasound sensor, or an ElectroMagnetic (EM) wave sensor. The IR sensor emits an infrared ray to measure a distance between the peripheral object and the IR sensor by using an instance when reflected infrared ray is sensed. The ultrasound sensor transmits ultrasound waves to measure a distance between the peripheral object and the ultrasound sensor by using an instance when ultrasound waves reflected from the peripheral object are received. Alternatively, the ultrasound sensor measures a phase change of transmitted and received ultrasound waves to measure the distance between the peripheral object and the ultrasound sensor. The EM wave sensor measures a phase change between transmitted and received EM waves to measure a distance between the peripheral object and the EM wave sensor. Alternatively, the EM wave sensor analyzes a distorted shape of the received EM wave to measure the distance between the peripheral object and the EM wave sensor.

The display unit 120 displays an image received from the processor 140. The image may be a photo, an item, or an initial screen.

The display unit 120 displays a focus on at least one of a plurality of items displayed on an entire screen. The display unit 120 displays the focus on a first item according to a control of the processor 140. The display unit 120 shifts the focus displayed on the first item to a second item according to the control of the processor 140.

The display unit 120 changes the displayed item. The display unit 120 displays the first item on the entire screen and displays the second item on the entire screen according to the control of the processor 140.

The display unit 120 moves the displayed image. When an entire image is not displayed on the display unit 120, the display unit 120 displays a part of the image and displays the moved image according to the control of the processor 140.

The memory 130 stores data for operating the wearable device 100. For example, the memory 130 stores a program, an image, and data for performing an arithmetic operation.

The processor 140 controls an operation of the wearable device 100. The processor 140 determines the image displayed on the display unit 120 by using data received from the sensor 110. For example, the processor 140 receives data regarding a movement of an object from the sensor 110 and shifts the focus displayed on the display unit 120. The processor 140 changes the item displayed on the display unit 120 and moves the image.

The processor 140 obtains the moving direction of the peripheral object based on the information received from the sensor 110. The processor 140 calculates the coordinate of the start point at which the peripheral object starts moving and the coordinate of the end point at which the peripheral object stops moving, and obtains the moving direction of the peripheral object by using the wearable device 100 and the position relationship between the start point and the end point.

The processor 140 determines a shifting direction of the focus according to the obtained direction. The processor 140 sets a region according to the obtained direction and determines the shifting direction of the focus. The processor 140 sets a plurality of regions according to a screen display status of the wearable device 100. The processor 140 may adaptively set the regions corresponding to shiftable directions of the focus. The processor 140 differently sets the regions according to the screen display status. The processor 140 determines which region includes the obtained direction among the regions. The processor 140 determines the moving direction corresponding to the determined region.

The processor 140 changes the display item and inputs characters according to the determined moving direction.

When a gesture of the object is sensed, the processor 140 performs an operation corresponding to the gesture. For example, when the processor 140 obtains at least two moving directions of the object within a predetermined time, the processor 140 performs operations corresponding to at least two moving patterns of the object.

Figure 9:
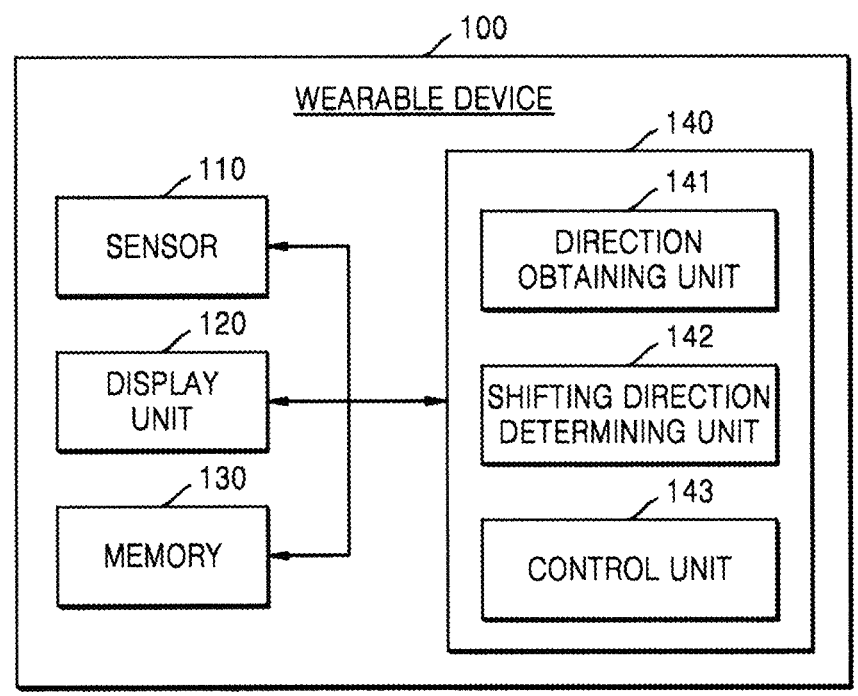
FIG. 9 is a block diagram of a wearable device, according to another embodiment of the present disclosure.

FIG. 9 is a block diagram of the wearable device 100, according to another embodiment of the present disclosure. Referring to FIG. 9, the processor 140 of the wearable device 100 includes a direction obtaining unit 141, a shifting direction determining unit 142, and a control unit 143.

The direction obtaining unit 141 obtains a moving direction of an object based on information received from the sensor 110. For example, the direction obtaining unit 141 measures distances between the object and first and second sensors of the wearable device 100. The direction obtaining unit 141 obtains the moving direction of the object by using the distance between the first sensor and the object, the distance between the second sensor and the object, and a distance between the first and second sensors. Alternatively, the direction obtaining unit 141 calculates a coordinate of the object by using the distance between the first sensor and the object, the distance between the second sensor and the object, and the distance between the first and second sensors. When the coordinate is calculated, a center of the wearable device 100 may be an original point.

The direction obtaining unit 141 calculates a coordinate of a start point at which the object starts moving and a coordinate of an end point at which the object stops moving, and obtains the moving direction of the object by using the wearable device 100 and a position relationship between the start point and the end point.

The shifting direction determining unit 142 determines a shifting direction of a focus according to the obtained direction. The shifting direction determining unit 142 sets a region according to the direction and determines the shifting direction of the focus.

The shifting direction determining unit 142 sets a plurality of regions according to a screen display status of the wearable device 100. The shifting direction determining unit 142 adaptively sets the regions corresponding to shiftable directions of the focus. The shifting direction determining unit 142 differently sets the regions according to the screen display status.

The control unit 143 shifts the focus to a second item according to the determined moving direction. The shifting direction determining unit 142 sets a neutral region corresponding to a direction in which the focus does not shift. The control unit 143 does not shift the focus when the moving direction of the object is included in the neutral region and provides a user with appropriate feedback.

When the moving direction of the object is included in the neutral region, the shifting direction determining unit 142 determines the shifting direction of the focus based on history regarding a previously stored moving direction of the object. In other words, the shifting direction determining unit 142 includes the neutral region in another region through a learning procedure.

For example, when the moving direction of the object corresponds to the neutral region, and a very next moving direction of the object corresponds to a first region adjacent to the neutral region, the shifting direction determining unit 142 includes the neutral region in the first region. Thus, if a subsequently measured moving direction of the object is included in the neutral region, the shifting direction determining unit 142 determines the moving direction of the object as corresponding to the first region.

The above-described learning procedure is merely an example. That is, the shifting direction determining unit 142 alternatively performs the learning procedure using various rules, and differently determines the moving direction of the object when the moving direction of the object is included in the neutral region through a learning procedure.

When the moving direction of the object is included in the neutral region, the control unit 143 provides the user with feedback. For example, the control unit 143 drives a vibration apparatus or partially modifies an image displayed on the display unit 120.

The control unit 143 changes a displayed item and inputs characters according to the determined moving direction.

When a gesture of the object is sensed, the control unit 143 performs an operation corresponding to the gesture. For example, when the direction obtaining unit 141 obtains at least two moving directions of the object within a predetermined time, the control unit 143 performs operations corresponding to at least two moving patterns of the object.

The direction obtaining unit 141, the shifting direction determining unit 142, and the control unit 143 may be software modules implemented in the processor 140. The processor 140 may be implemented in a hardware module that may process all functions performed by the direction obtaining unit 141, the shifting direction determining unit 142, and the control unit 143.

Figure 10:
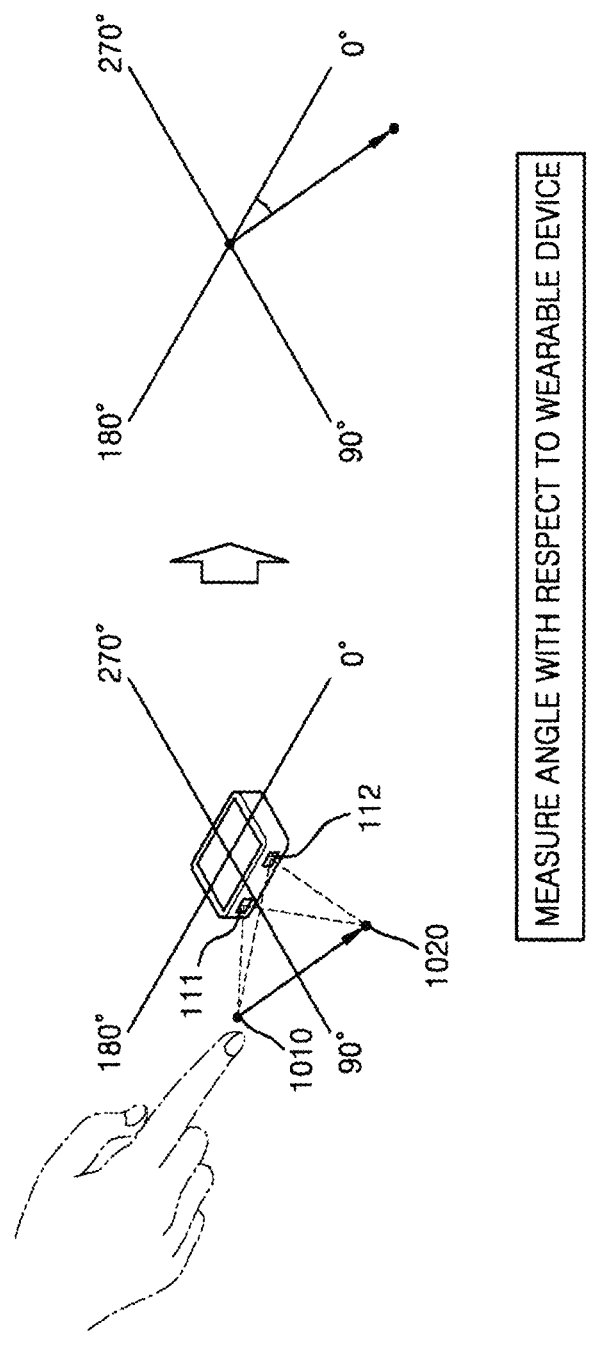
FIG. 10 illustrates a method in which a wearable device measures a moving angle of an object, according to an embodiment of the present disclosure.

FIG. 10 illustrates a method in which the wearable device 100 measures a moving angle of an object, according to an embodiment of the present disclosure. Referring to FIG. 10, the wearable device 100 measures the moving angle of the object by using two sensors 111 and 112.

The wearable device 100 measures an angle between the object and the wearable device 100 when the object moves from a start point 1010 to an end point 1020. The first sensor 111 measures a distance between the first sensor 111 and each of the start point 1010 and the end point 1020 of the object. The second sensor 112 measures a distance between the second sensor 112 and each of the start point 1010 and the end point 1020 of the object.

The wearable device 100 calculates a coordinate of the start point 1010 by using the distance between the first sensor 111 and the start point 1010 and the distance between the second sensor 112 and the start point 1010. The wearable device 100 calculates a coordinate of the end point 1020 by using the distance between the first sensor 111 and the end point 1020 and the distance between the second sensor 112 and the end point 1020. The wearable device 100 sets a coordinate axis by using a center of the wearable device 100 as an original point as shown in FIG. 10.

The wearable device 100 obtains a vector by using the coordinate of the start point 1010 and the coordinate of the end point 1020 and parallel moves the vector such that the start point 1010 is disposed in the original point. The wearable device 100 calculates an angle formed by the vector and the coordinate axis with respect to the coordinate axis.

Figure 11:
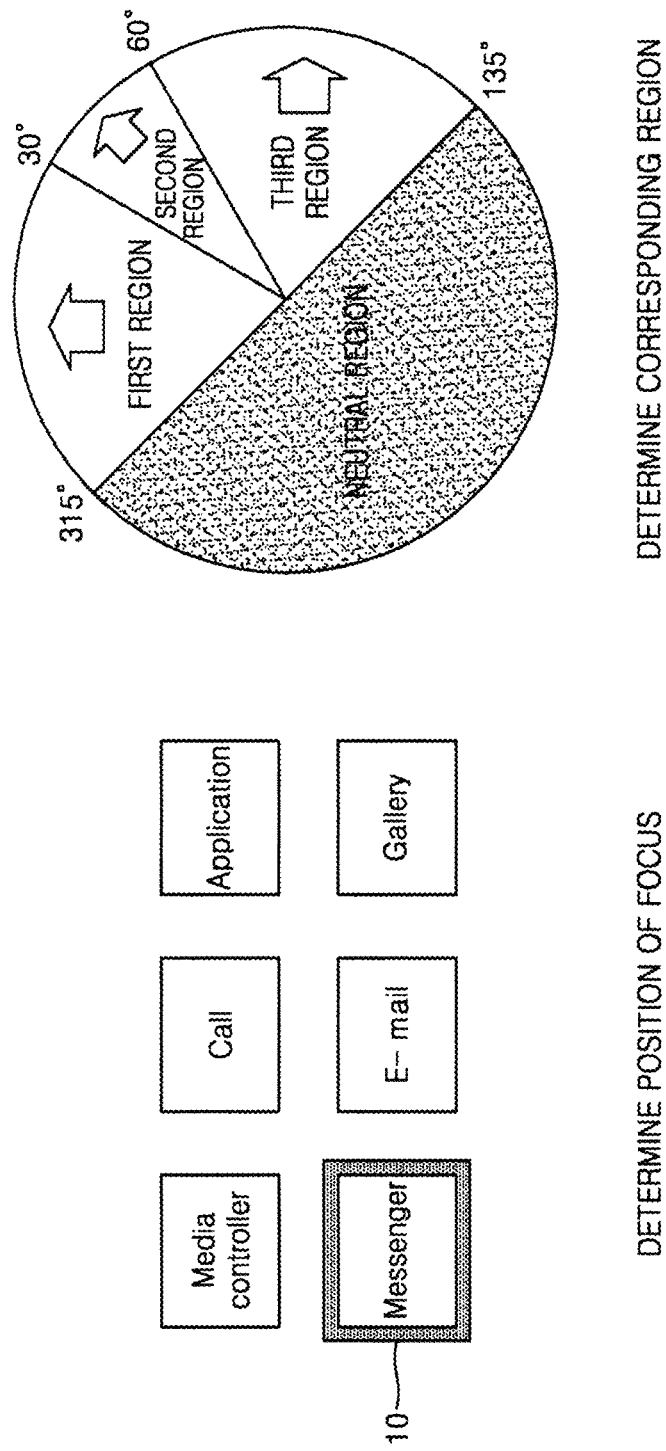
FIGS. 11 through 18 illustrate methods in which a wearable device sets a region corresponding to a position of a focus, according to embodiments.

FIGS. 11 through 18 illustrate methods in which the wearable device 100 sets a region corresponding to a position of a focus, according to embodiments of the present disclosure. FIG. 11 illustrates a method in which the wearable device 100 sets a corresponding region 10 when the focus is displayed on a lower left item 'Messenger'.

In this case, the focus shifts to the right or upward. Thus, the wearable device 100 sets first through third regions based on a shiftable direction of the focus. The first region corresponds to an item 'Media controller'. The second region corresponds to an item 'Call'. The third region corresponds to an item 'E-mail'.

Since the focus is displayed on the lower left item 'Messenger', the focus does not shift to the right or downward. Thus, the wearable device 100 sets a neutral region based on an unshiftable direction of the focus. For example, the wearable device 100 sets an angle range from about 135 degrees to about 315 degrees as the neutral region.

In FIG. 11, the first region indicates an angle range from about 315 degrees to about 30 degrees, the second region indicates an angle range from about 30 to about 60 degrees, the third region indicates an angle range from about 60 degrees to about 135 degrees, and neutral region indicates an angle range from about 135 degrees to about 315 degrees.

Figure 12:
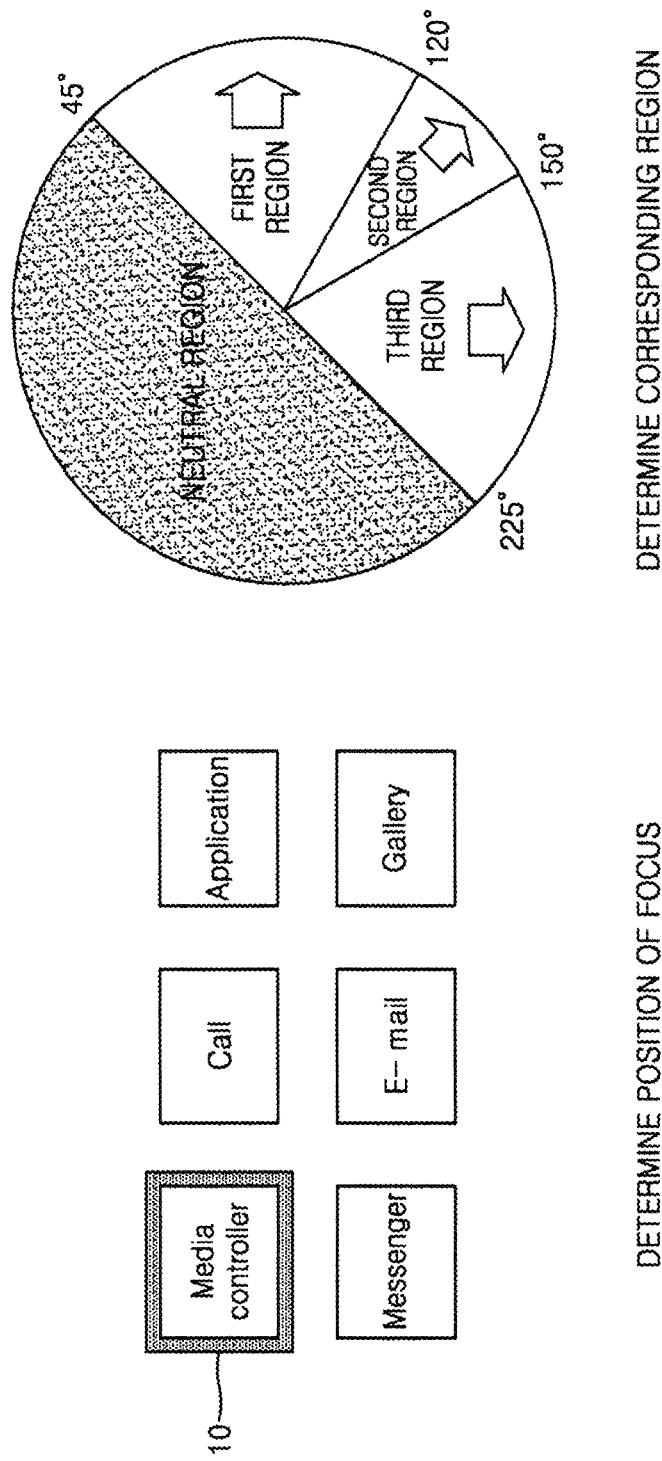

FIG. 12 illustrates a method in which the wearable device 100 sets a corresponding region 10 when the focus is displayed on an upper left item 'Media controller'.

In this case, the focus shifts to the right or downward. Thus, the wearable device 100 sets first through third regions based on a shiftable direction of the focus. The first region corresponds to an item 'Call'. The second region corresponds to an item 'E-mail'. The third region corresponds to an item 'Messenger'.

Since the focus is displayed on the upper left item 'Media controller', the focus does not shift to the left or upward. Thus, the wearable device 100 sets a neutral region based on an unshiftable direction of the focus.

In FIG. 12, the first region indicates an angle range from about 45 degrees to about 120 degrees, and the second region indicates an angle range from about 120 to about 150 degrees. The third region indicates an angle range from about 150 degrees to about 225 degrees. The neutral region indicates an angle range from about 225 degrees to about 45 degrees.

Figure 13:
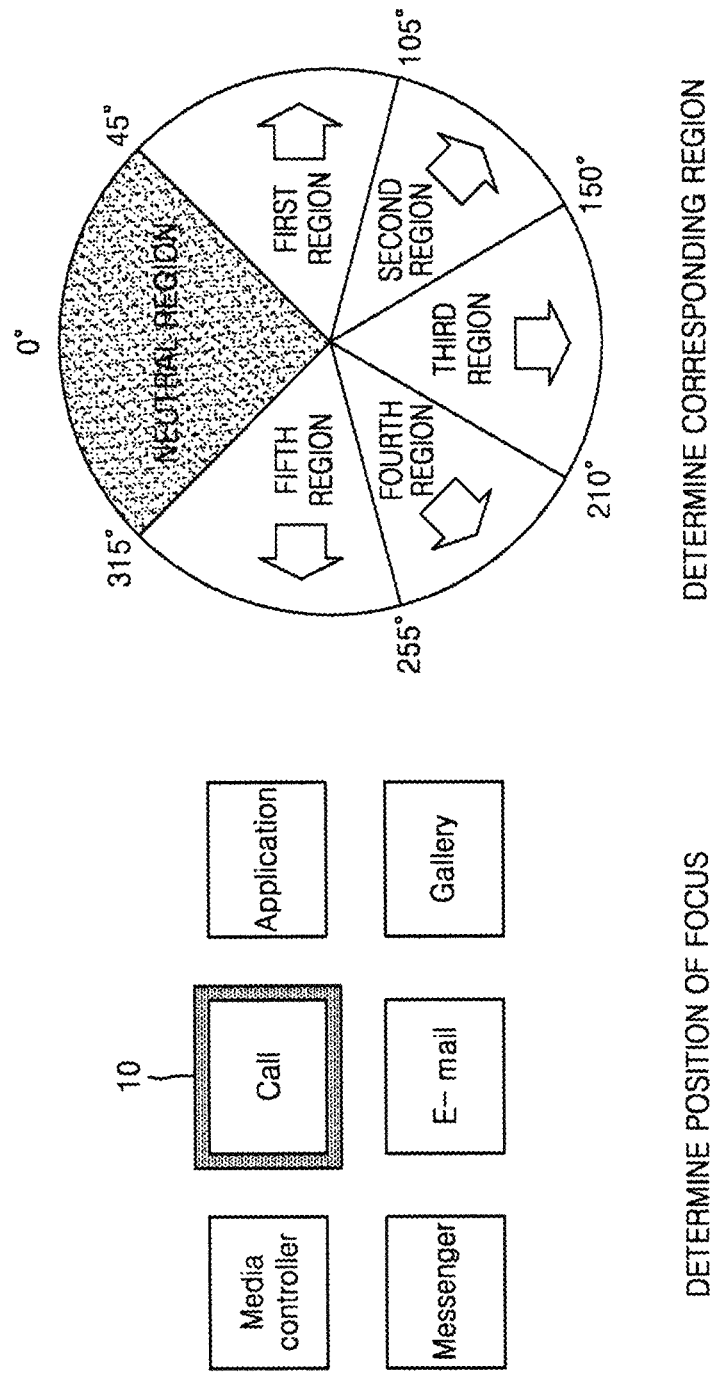

FIG. 13 illustrates a method in which the wearable device 100 sets a corresponding region 10 when the focus is displayed on an upper center item 'Call'.

In this case, the focus shifts to the right, left, or downward. Thus, the wearable device 100 sets first through fifth regions based on a shiftable direction of the focus. The first region corresponds to an item 'Application', the second region corresponds to an item 'Gallery', the third region corresponds to an item 'E-mail', the fourth region corresponds to an item 'Messenger', and the fifth region corresponds to an item 'Media controller'.

Since the focus is displayed on the upper center item 'Call', the focus does not shift upward. Thus, the wearable device 100 sets a neutral region based on this unshiftable direction of the focus.

In FIG. 13, the first region indicates an angle range from about 45 degrees to about 105 degrees, the second region indicates an angle range from about 105 to about 160 degrees, the third region indicates an angle range from about 160 degrees to about 210 degrees, the fourth region indicates an angle range from about 210 degrees to about 255 degrees, the fifth region indicates an angle range from about 255 degrees to about 315 degrees, and the neutral region indicates an angle range from about 315 degrees to about 45 degrees.

Figure 14:
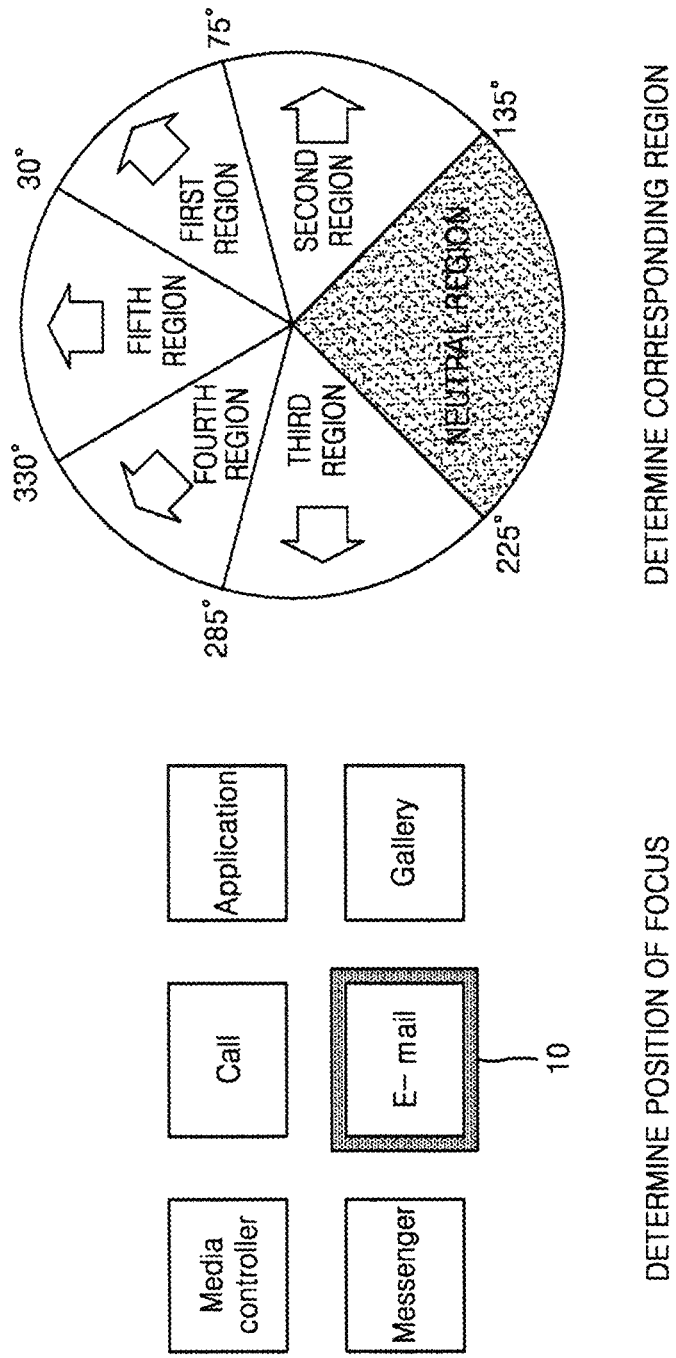

FIG. 14 illustrates a method in which the wearable device 100 sets a corresponding region 10 when the focus is displayed on a lower center item 'E-mail'.

In this case, the focus shifts to the right, left, or upward. Thus, the wearable device 100 sets first through fifth regions based on a shiftable direction of the focus. The first region corresponds to an item 'Application', the second region corresponds to an item 'Gallery', the third region corresponds to an item 'Messenger', the fourth region corresponds to an item 'Media controller'. The fifth region corresponds to an item 'Call'.

Since the focus is displayed on the lower center item 'E-mail', the focus does not shift downward. Thus, the wearable device 100 sets a neutral region based on an unshiftable direction of the focus.

In FIG. 14, the first region indicates an angle range from about 30 degrees to about 75 degrees, the second region indicates an angle range from about 75 to about 135 degrees, the third region indicates an angle range from about 225 degrees to about 285 degrees, the fourth region indicates an angle range from about 285 degrees to about 330 degrees, the fifth region indicates an angle range from about 330 degrees to about 30 degrees, and the neutral region indicates an angle range from about 135 degrees to about 225 degrees.

Figure 15:
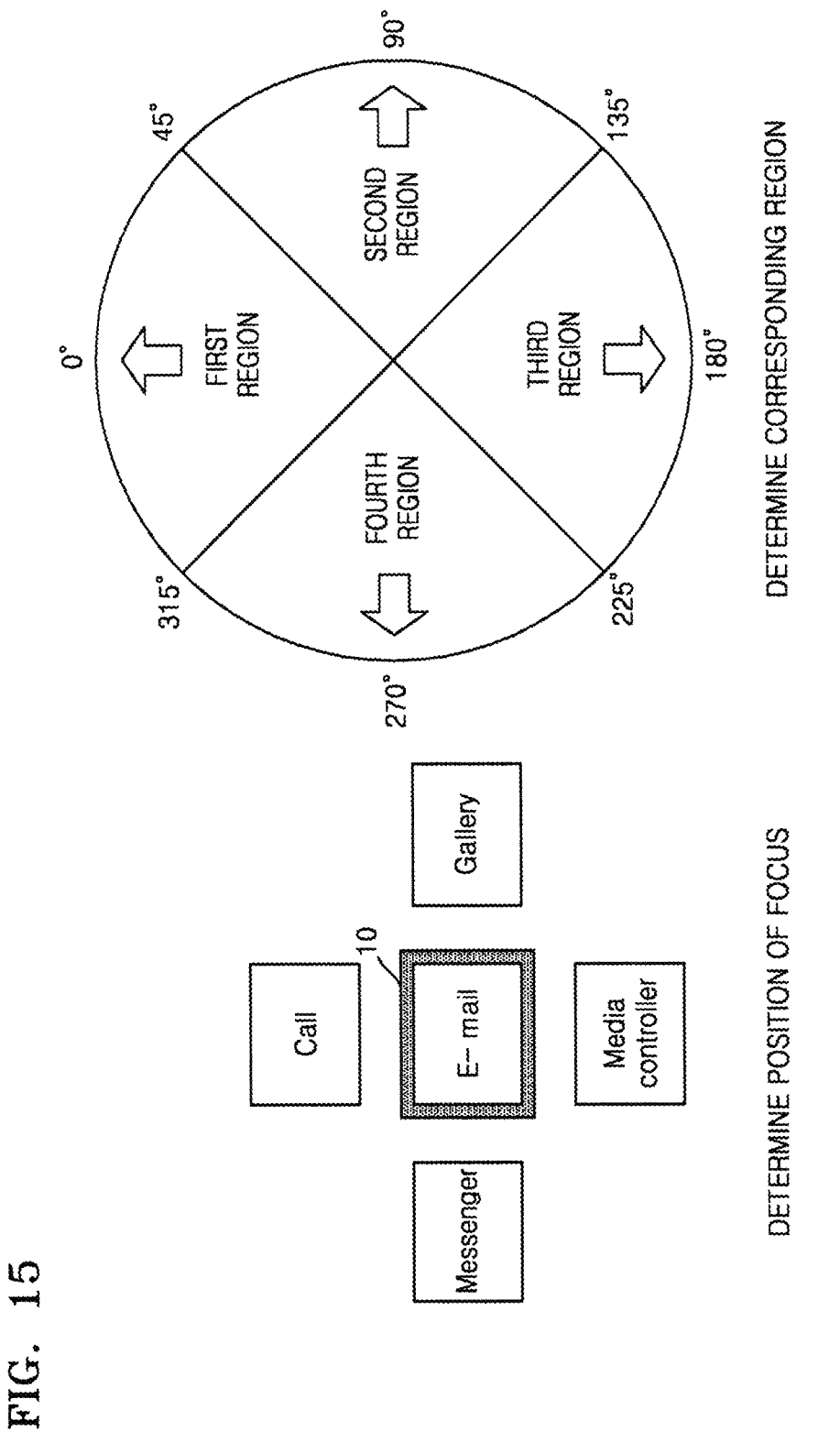

FIG. 15 illustrates a method in which the wearable device 100 sets a corresponding region 10 when the focus is displayed on a center item 'E-mail', and items are arranged in a cross shape.

In this case, the focus shifts to the right, left, upward, or downward. Thus, the wearable device 100 sets first through fourth regions based on a shiftable direction of the focus. The first region corresponds to an item 'Call', the second region corresponds to an item 'Gallery', the third region corresponds to an item 'Media controller', and the fourth region corresponds to an item 'Messenger'.

In FIG. 15, the first region indicates an angle range from about 315 degrees to about 45 degrees, the second region indicates an angle range from about 45 to about 135 degrees, the third region indicates an angle range from about 135 degrees to about 225 degrees, and the fourth region indicates an angle range from about 225 degrees to about 315 degrees.

Figure 16:
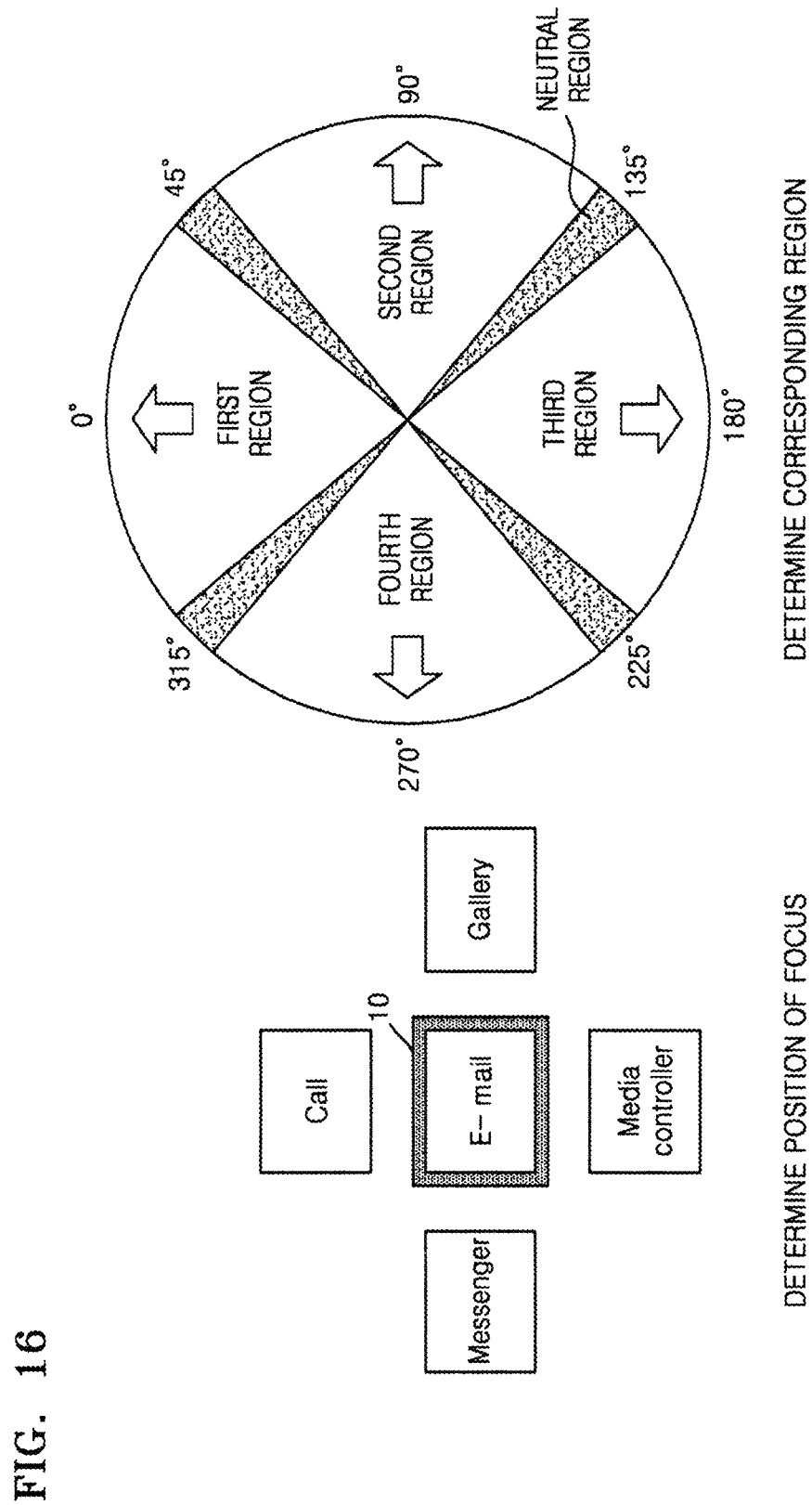

FIG. 16 illustrates a method in which the wearable device 100 sets neutral regions when the focus is displayed on a center item 'E-mail', and items are arranged in a cross shape.

In this case, and since no item is present in a diagonal direction, the focus does not shift in the diagonal direction. Thus, the wearable device 100 sets the neutral region based on a shiftable direction of the focus.

In FIG. 16, the neutral regions are set between first through fourth regions.

Figure 17:
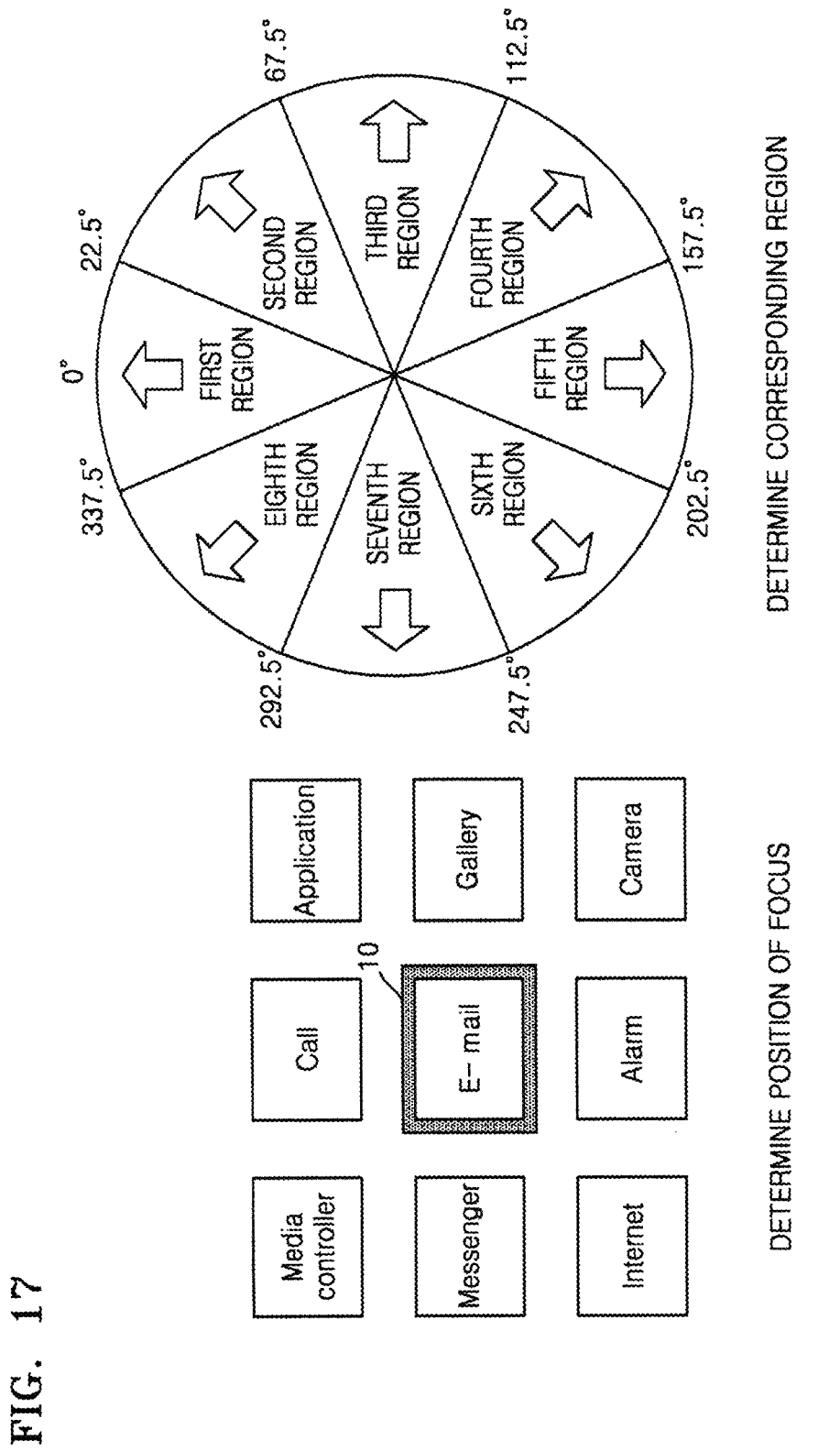

FIG. 17 illustrates a method in which the wearable device 100 sets a corresponding region 10 when the focus is displayed on a center item 'E-mail', and items are arranged in a 3×3 configuration.

In this case, the focus shifts to the right, left, upward, downward, or diagonal direction. Thus, the wearable device 100 sets first through eighth regions based on the shiftable direction of the focus.

In FIG. 17, the first region indicates an angle range from about 337.5 degrees to about 22.5 degrees, the second region indicates an angle range from about 22.5 to about 67.5 degrees, the third region indicates an angle range from about 67.5 degrees to about 112.5 degrees, the fourth region indicates an angle range from about 112.5 degrees to about 157.5 degrees, the fifth region indicates an angle range from about 157.5 degrees to about 202.5 degrees, the sixth region indicates an angle range from about 202.5 to about 247.5 degrees, the seventh region indicates an angle range from about 247.5 degrees to about 292.5 degrees, and the eighth region indicates an angle range from about 292.5 degrees to about 337.5 degrees.

Figure 18:
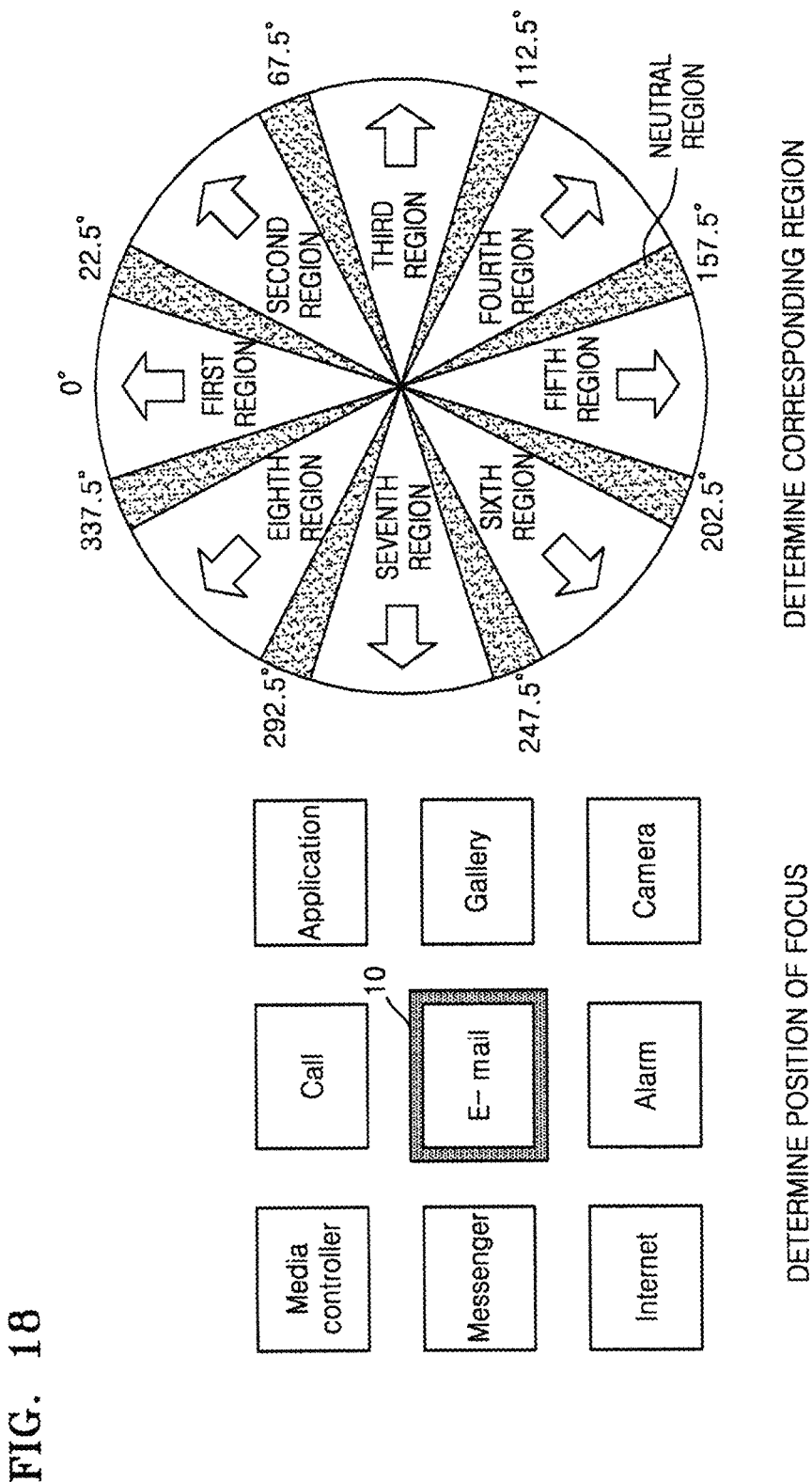

FIG. 18 illustrates a method in which the wearable device 100 sets neutral regions when the focus is displayed on a region 10 of a center item 'E-mail', and items are arranged in a 3×3 configuration.

In FIG. 18, the neutral regions are set between first through eighth regions.

Figure 19:
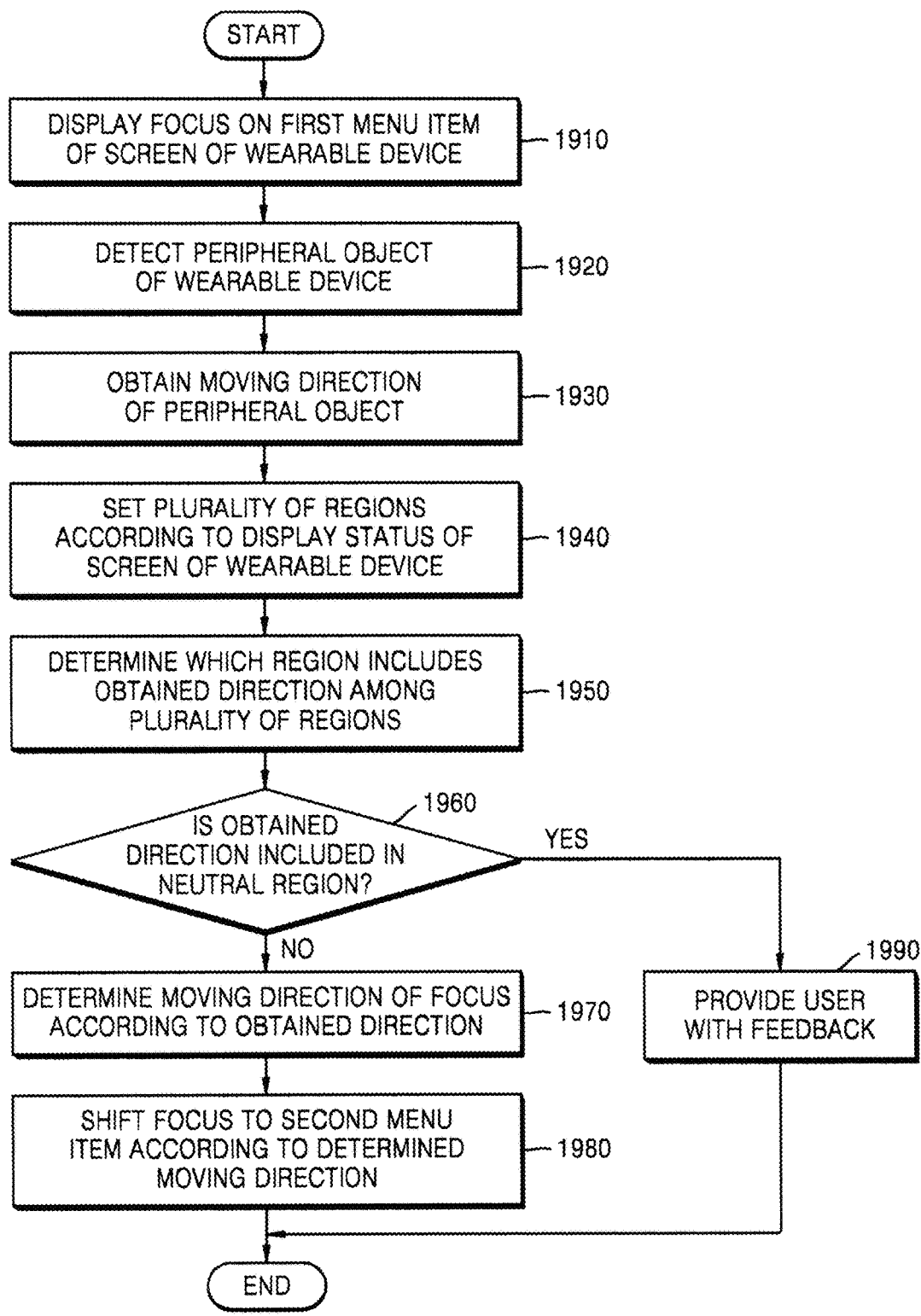
FIG. 19 illustrates a method of operating a wearable device, according to an embodiment of the present disclosure.

FIG. 19 illustrates a method of operating the wearable device 100, according to an embodiment of the present disclosure. Referring to FIG. 19, the wearable device 100 provides a user with feedback when a moving direction of an object is included in a neutral region.

In operation 1910, the wearable device 100 displays a focus on a first menu item of a screen of the wearable device 100.

In operation 1920, the wearable device 100 detects the peripheral object of the wearable device 100.

In operation 1930, the wearable device 100 obtains the moving direction of the peripheral object.

In operation 1940, the wearable device 100 sets a plurality of regions according to a display status of the screen of the wearable device 100. The wearable device 100 sets the plurality of regions based on an arrangement of items or a display position of the focus.

In operation 1950, the wearable device 100 determines which region includes the obtained direction among the plurality of regions.

In operation 1960, the wearable device 100 determines whether the obtained direction is included in the neutral region. If the obtained direction is included in the neutral region, operation 1970 is performed, and if not, operation 1990 is performed.

In operation 1970, the wearable device 100 determines a shifting direction of the focus according to the obtained direction.

In operation 1980, the wearable device 100 shifts the focus to a second menu item according to the determined shifting direction.

In operation 1990, the wearable device 100 provides the user with the feedback by driving a vibration apparatus or partially modifying an image displayed on the display unit 120.

FIGS. 20 through 26 illustrate examples in which the wearable device 100 shifts the focus 10 according to a user input, according to embodiments of the present disclosure.

FIG. 20 illustrates an example in which the wearable device 100 shifts the focus 10 based on a moving direction of an object, according to an embodiment of the present disclosure. In FIG. 20, a moving angle of the object is 15 degrees, and the wearable device 100 shifts the focus 10 from an item 'Messenger' to an item 'Media controller'.

Figure 21:
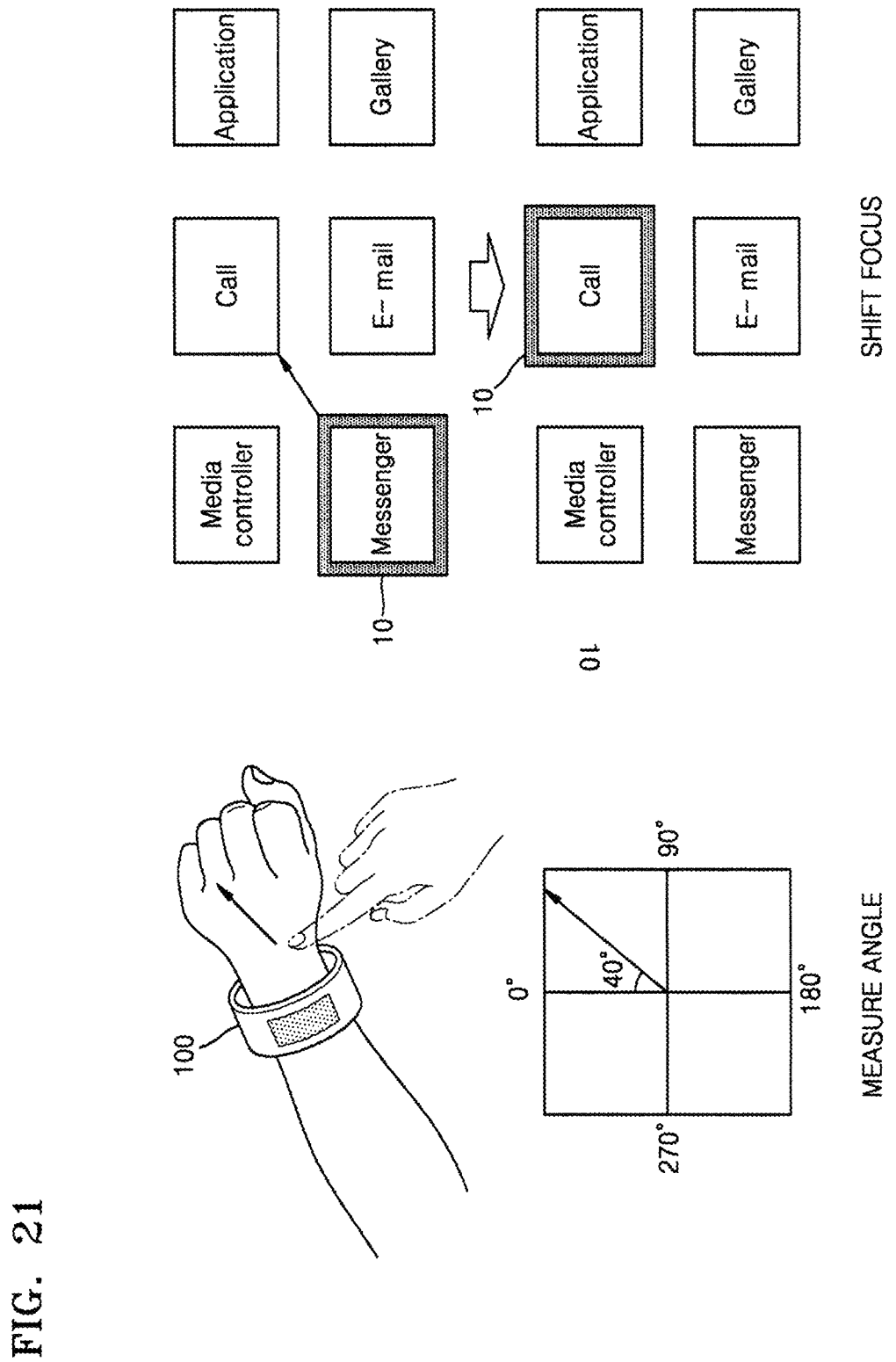

FIG. 21 illustrates an example in which the wearable device 100 shifts the focus 10 based on a moving direction of an object, according to an embodiment of the present disclosure. In FIG. 21, a moving angle of the object is 40 degrees, and the wearable device 100 shifts the focus 10 from 'Messenger' to 'Call'.

Figure 22:
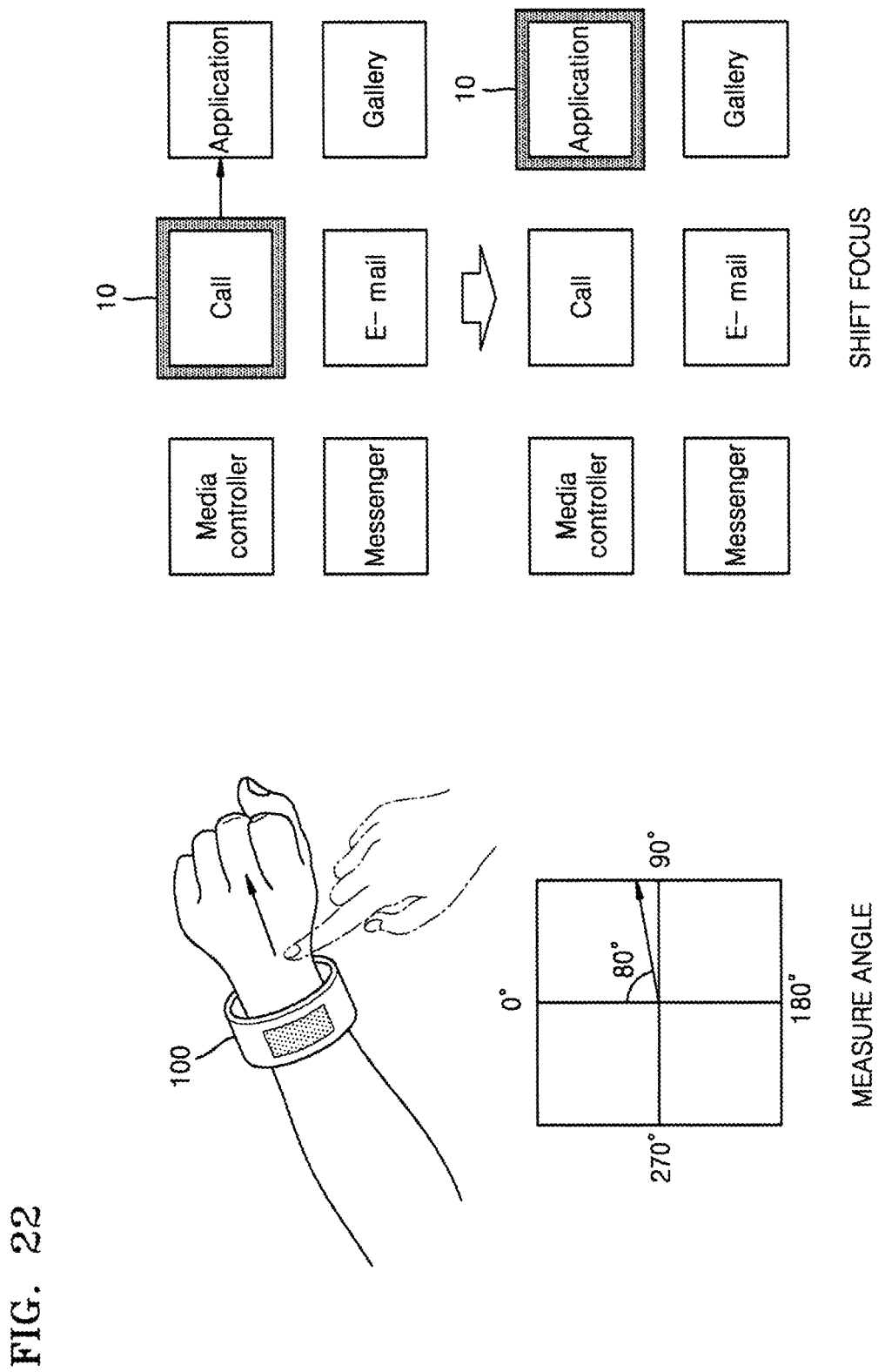

FIG. 22 illustrates an example in which the wearable device 100 shifts the focus 10 based on a moving direction of an object, according to an embodiment of the present disclosure. In FIG. 22, a moving angle of the object is 80 degrees, and the wearable device 100 shifts the focus 10 from 'Call' to 'Application'.

Figure 23:
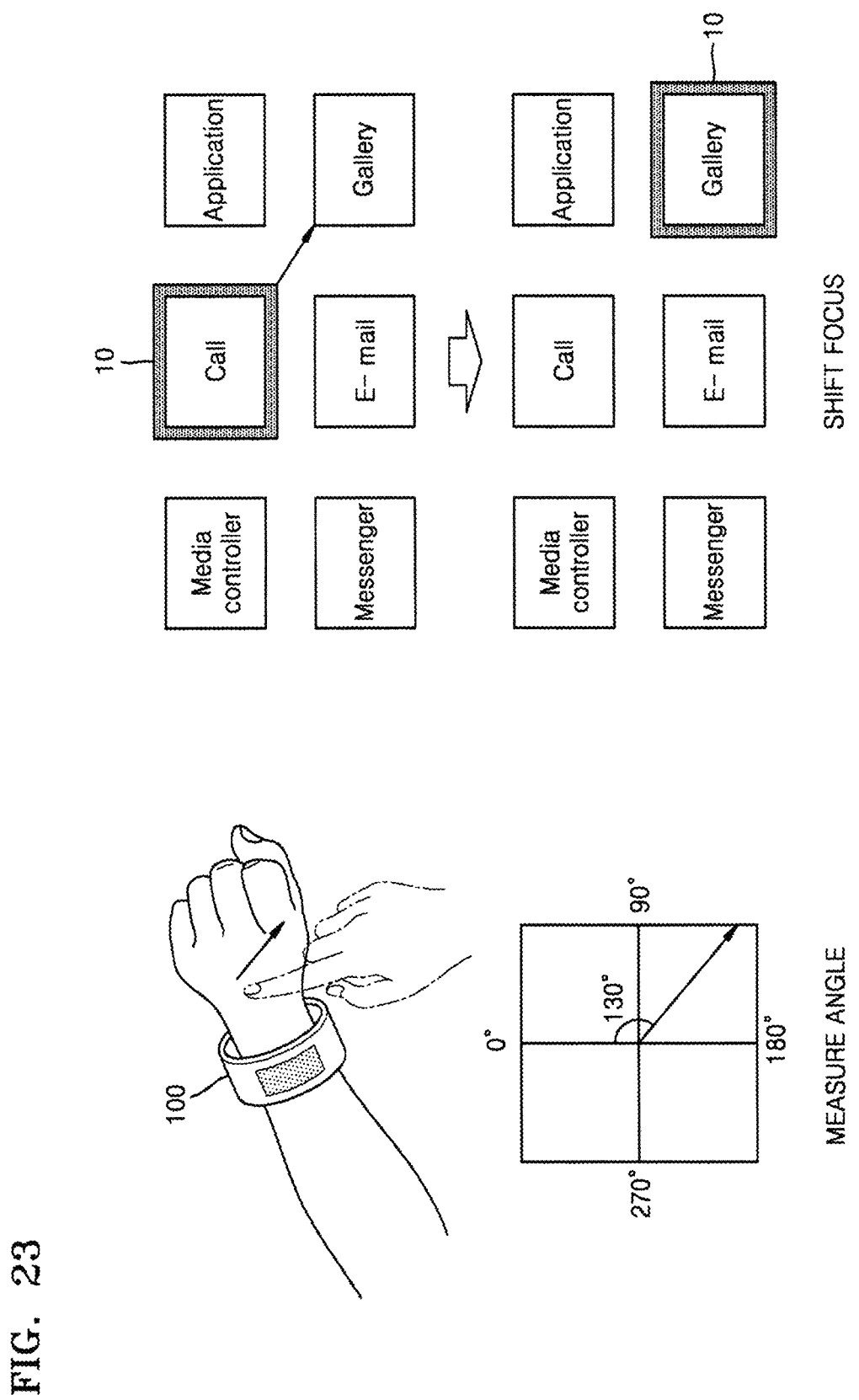

FIG. 23 illustrates an example in which the wearable device 100 shifts the focus 10 based on a moving direction of an object, according to an embodiment of the present disclosure. In FIG. 23, a moving angle of the object is 130 degrees, and the wearable device 100 shifts the focus 10 from 'Call' to 'Gallery'.

Figure 24:
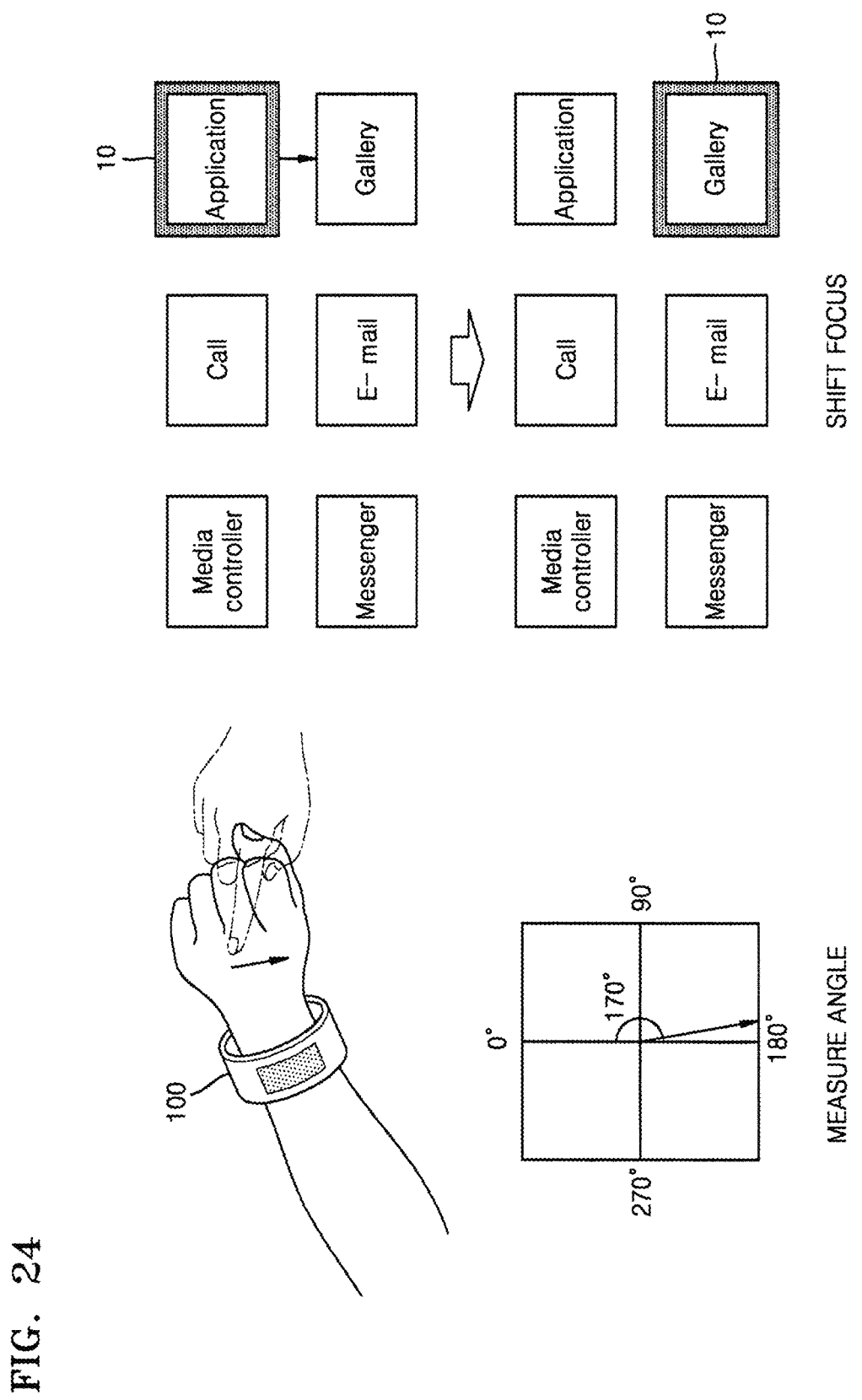

FIG. 24 illustrates an example in which the wearable device 100 shifts the focus 10 based on a moving direction of an object, according to an embodiment of the present disclosure. In FIG. 24, a moving angle of the object is 170 degrees, and the wearable device 100 shifts the focus 10 from 'Application' to 'Gallery'.

Figure 25:
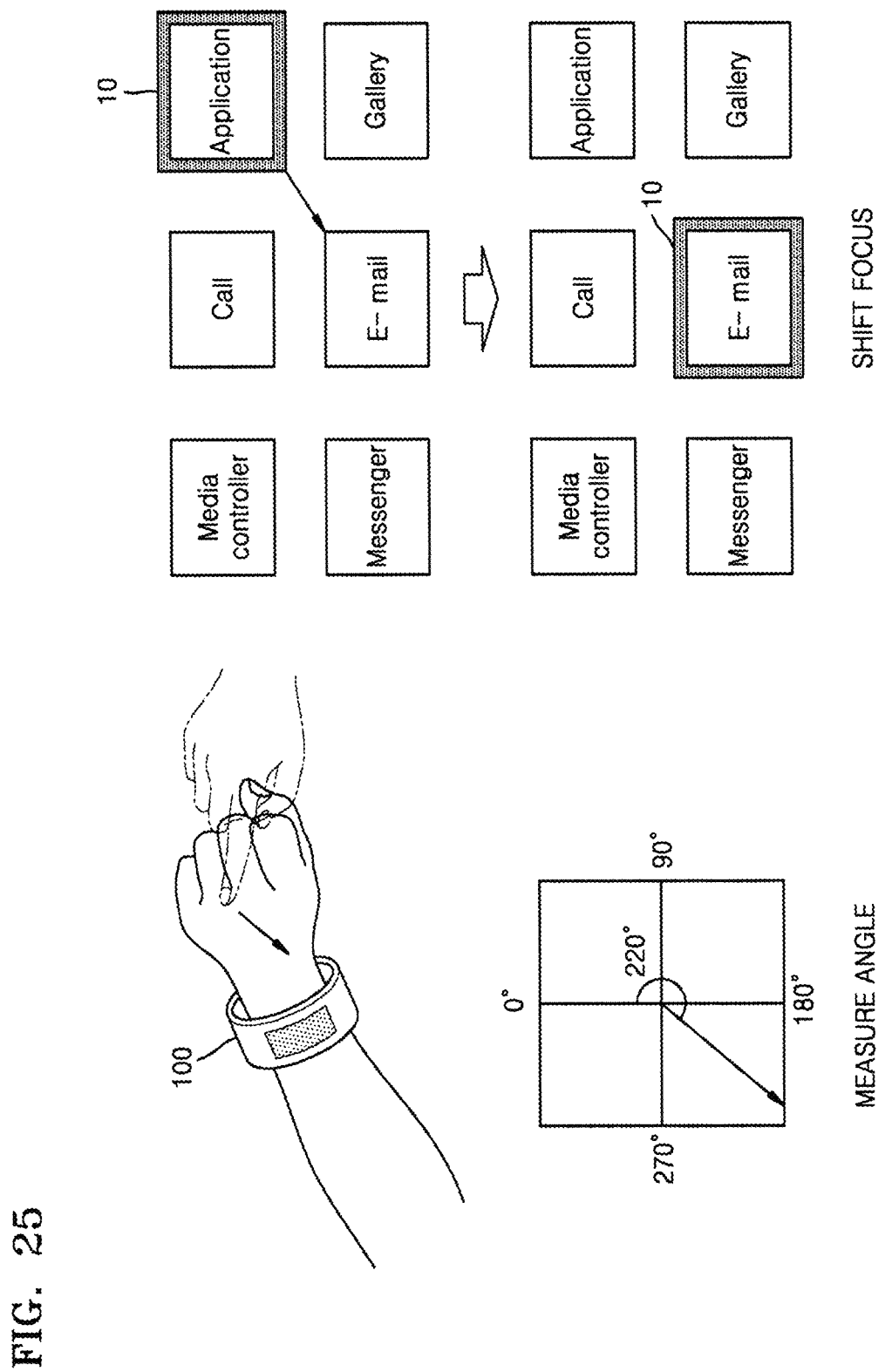

FIG. 25 illustrates an example in which the wearable device 100 shifts the focus 10 based on a moving direction of an object, according to an embodiment of the present disclosure. In FIG. 25, a moving angle of the object is 220 degrees, and the wearable device 100 shifts the focus 10 from 'Application' to 'E-mail'.

Figure 26:
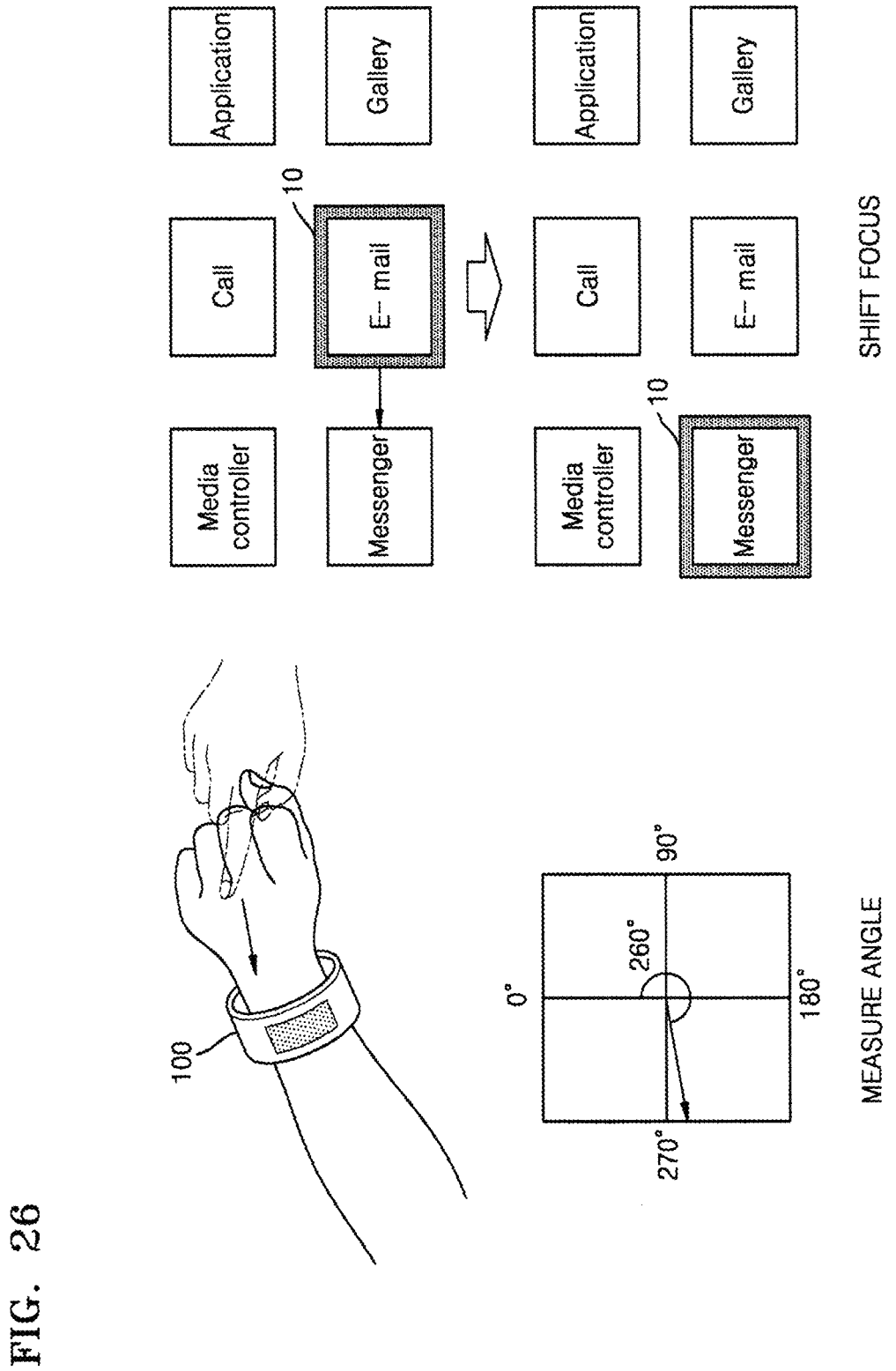

FIG. 26 illustrates an example in which the wearable device 100 shifts the focus 10 based on a moving direction of an object, according to an embodiment of the present disclosure. In FIG. 26, a moving angle of the object is 260 degrees, and the wearable device 100 shifts the focus 10 from 'E-mail' to 'Messenger'.

Figure 27:
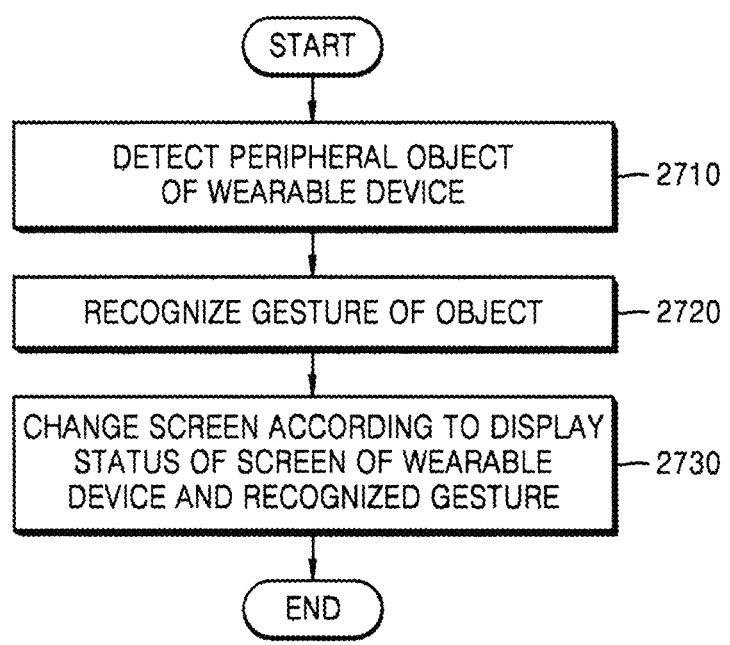
FIG. 27 is a flowchart of a method in which a wearable device recognizes a gesture of an object and changes a screen, according to an embodiment of the present disclosure.

FIG. 27 is a flowchart of a method in which the wearable device 100 recognizes a gesture of an object and changes a screen, according to an embodiment of the present disclosure.

In operation 2710, the wearable device 100 detects a peripheral object of the wearable device 100.

In operation 2720, the wearable device 100 recognizes the gesture of the object. The wearable device 100 obtains a moving direction of the object and determines a region including the obtained direction. The wearable device 100 senses at least two movements of the object. In this case, the wearable device 100 measures the moving direction of the object at least twice.

In operation 2730, the wearable device 100 changes the screen according to a display status of the screen of the wearable device 100 and the recognized gesture. The wearable device 100 changes the screen in consideration of both the display status of the screen and the gesture. For example, the wearable device 100 records a currently displayed item and a previously displayed item and displays the previously displayed item according to the recognized gesture.

When the object moves in two or more different directions within a set time, the wearable device 100 performs an operation corresponding to a combination of two or more directions. The wearable device 100 sets at least one region and determines a region corresponding to the obtained direction. If two or more moving directions of the object are measured, the wearable device 100 changes the screen according to corresponding regions. For example, the wearable device 100 displays a previous screen, displays an upper folder, cancels a currently executed program, and displays the previous screen or a home screen.

Figure 28:
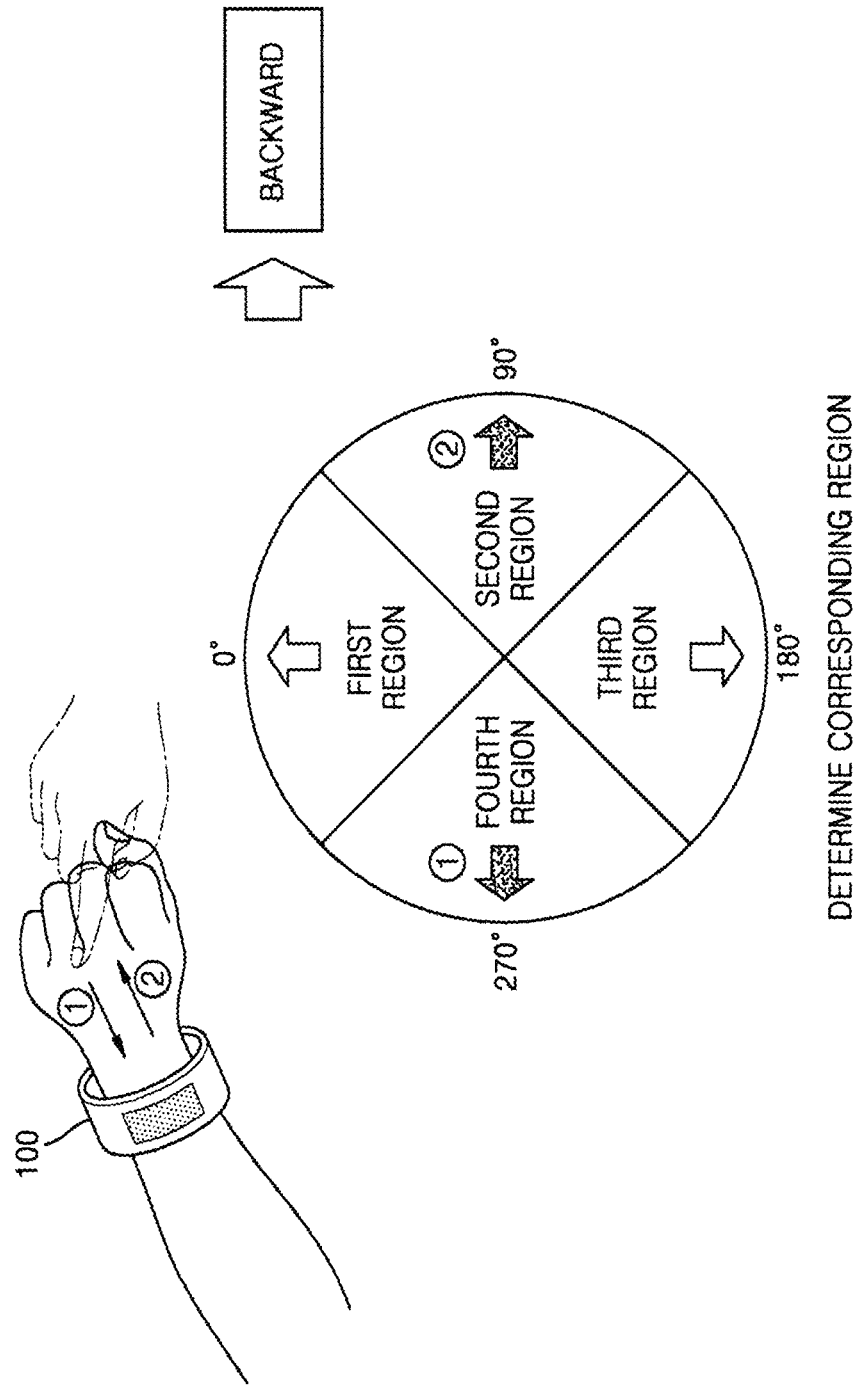
FIG. 28 illustrates a method in which a wearable device operates by recognizing a gesture, according to an embodiment of the present disclosure.

FIG. 28 illustrates a method in which the wearable device 100 operates by recognizing a gesture, according to an embodiment of the present disclosure. Referring to FIG. 28, the wearable device 100 recognizes the gesture of an object that moves left and right and performs a "backward" function.

FIG. 28 illustrates where a first moving direction of the object is included in a fourth region, and a second moving direction of the object is included in a second region. The wearable device 100 performs a function corresponding to a combination of the fourth region and the second region. For example, the wearable device 100 performs the "backward" function by referring to a display order of a screen.

Figure 29:
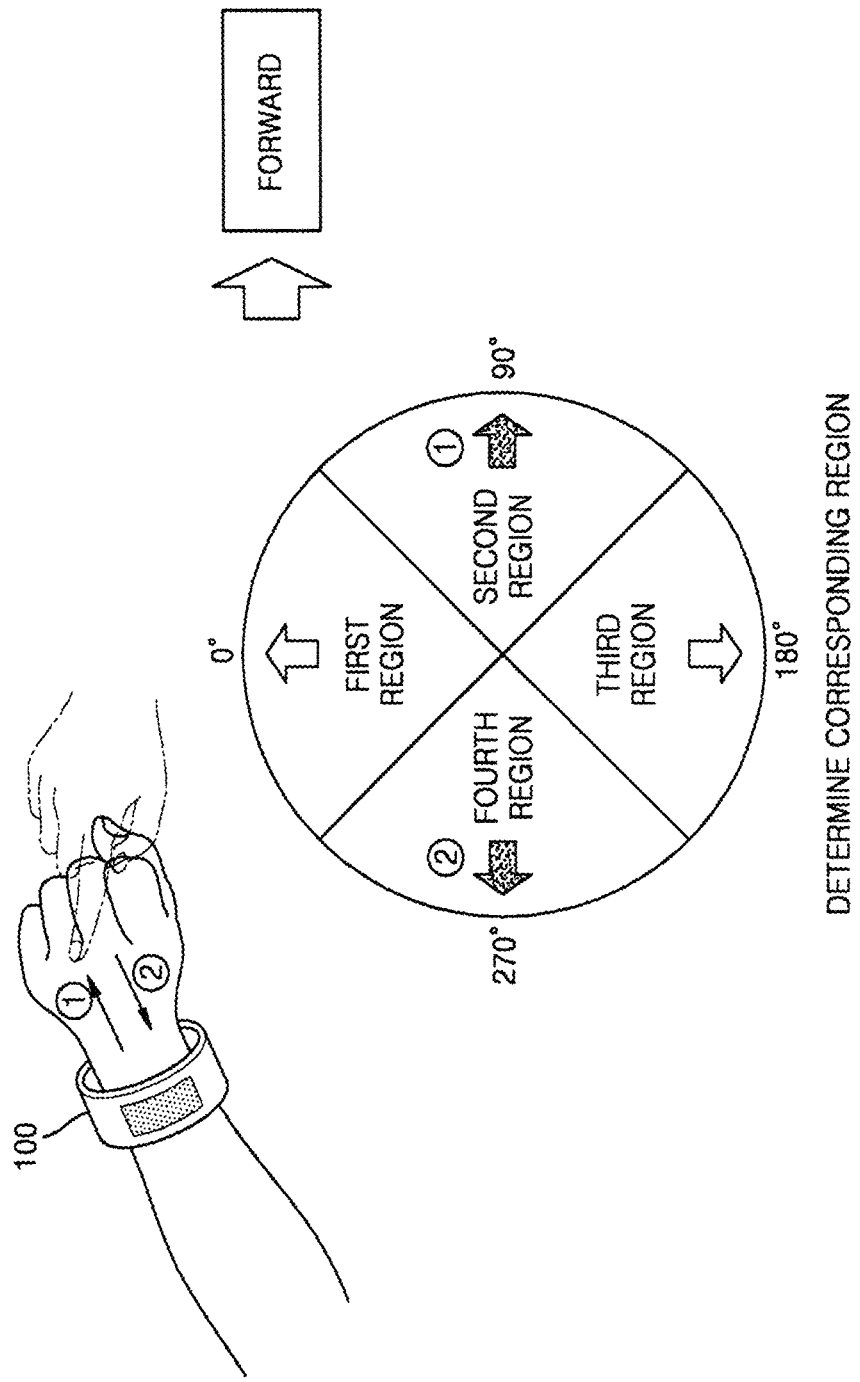
FIG. 29 illustrates a method in which a wearable device operates by recognizing a gesture, according to another embodiment of the present disclosure.

FIG. 29 illustrates a method in which a wearable device operates by recognizing a gesture, according to another embodiment of the present disclosure. Referring to FIG. 29, the wearable device 100 performs a "forward" function by recognizing the gesture.

FIG. 29 illustrates where a first moving direction of the object is included in a second region, and a second moving direction of the object is included in a fourth region. The wearable device 100 performs a function corresponding to a combination of the second region and the fourth region. For example, the wearable device 100 performs the "forward" function by referring to a display order of a screen.

Figure 30:
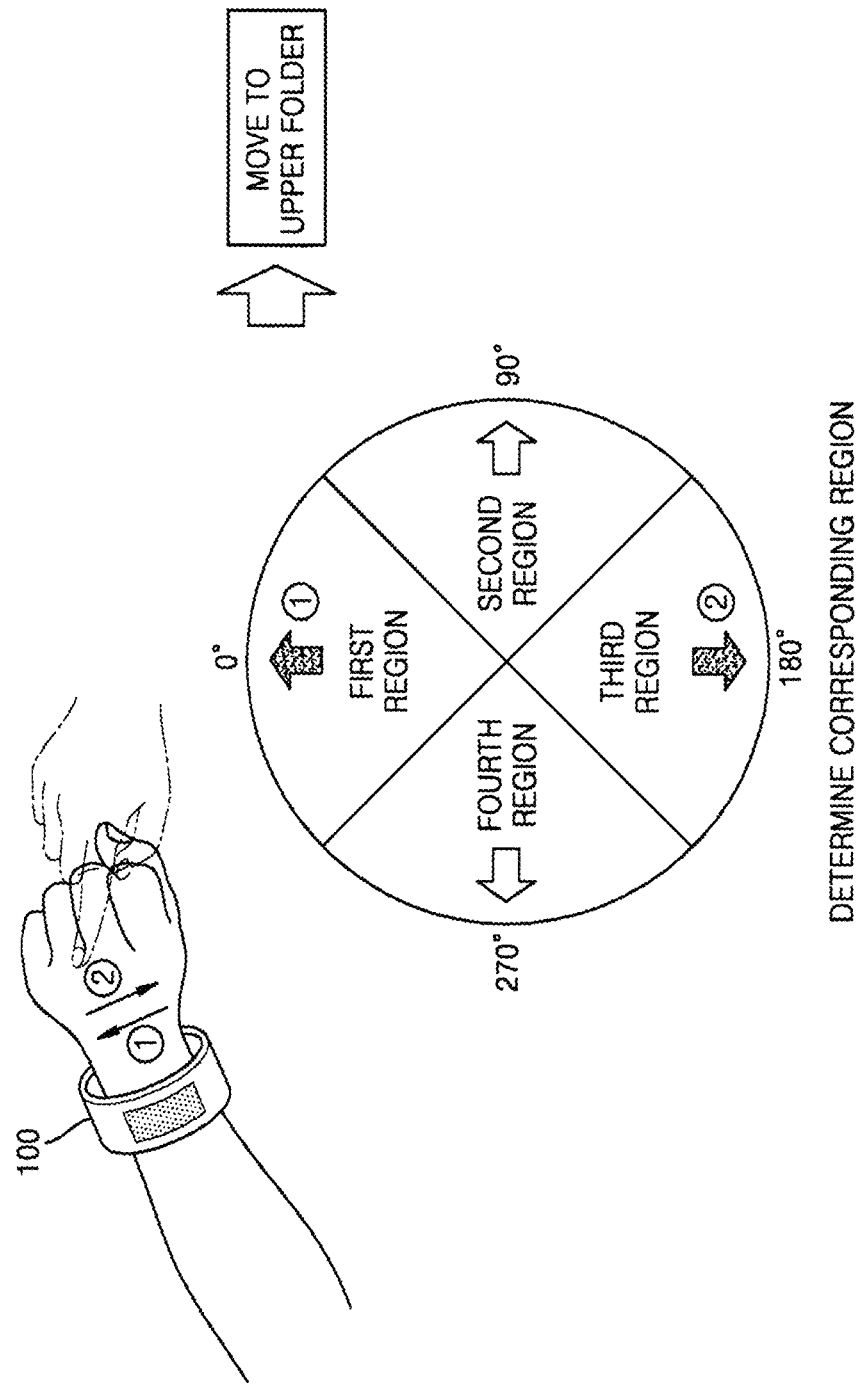
FIG. 30 illustrates a method in which a wearable device operates by recognizing a gesture, according to another embodiment of the present disclosure.

FIG. 30 illustrates a method in which a wearable device operates by recognizing a gesture, according to another embodiment of the present disclosure. Referring to FIG. 30, the wearable device 100 performs a "move to upper folder" function by recognizing the gesture of an object that moves up and down.

FIG. 30 illustrates where a first moving direction of the object is included in a first region, and a second moving direction of the object is included in a third region. The wearable device 100 performs a function corresponding to a combination of the first region and the third region. For example, the wearable device 100 performs the "move to upper folder" function by referring to a relationship between folders.

Figure 31:
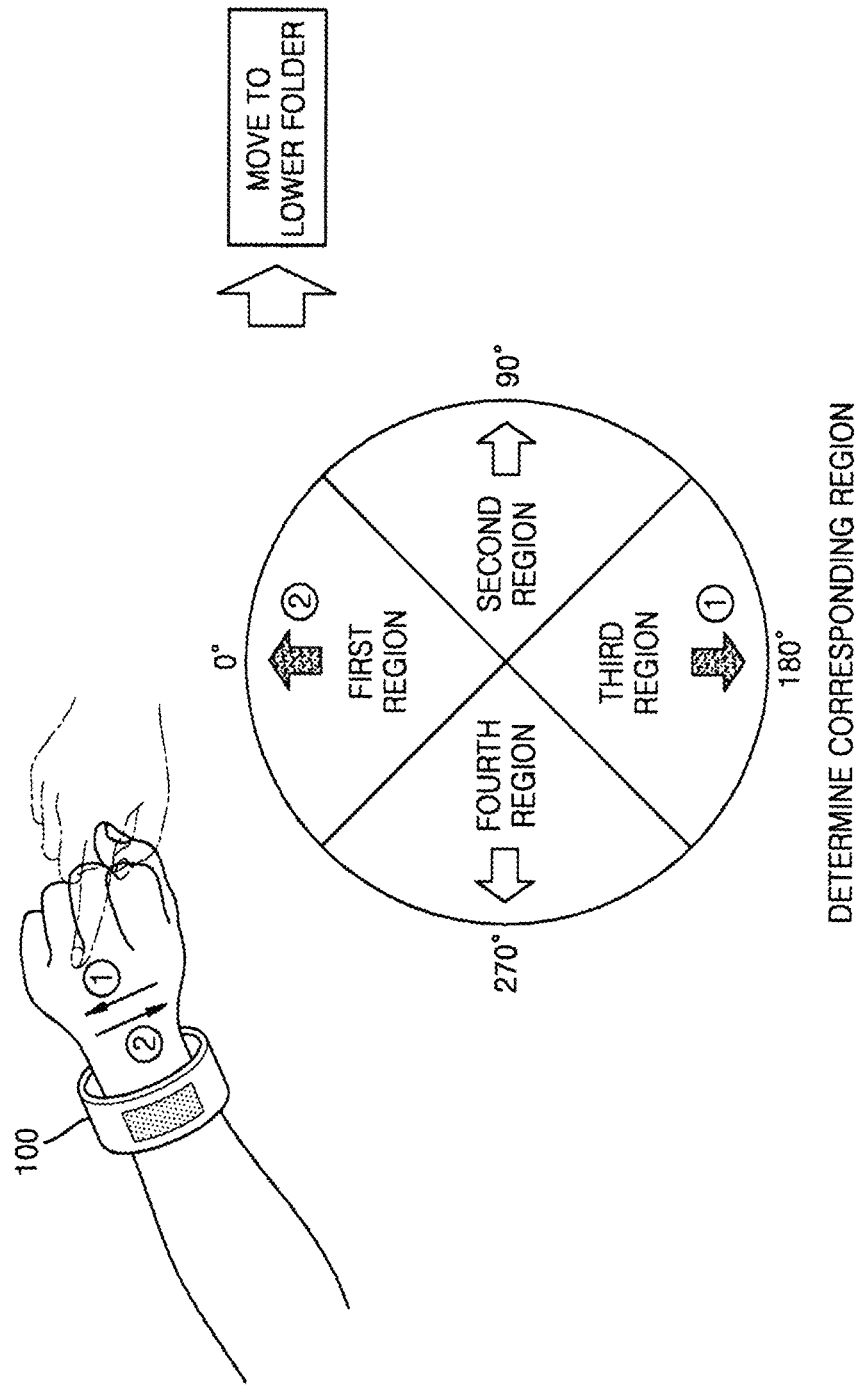
FIG. 31 illustrates a method in which a wearable device operates by recognizing a gesture, according to another embodiment of the present disclosure.

FIG. 31 illustrates a method in which a wearable device operates by recognizing a gesture, according to another embodiment of the present disclosure. Referring to FIG. 31, the wearable device 100 performs a "move to lower folder" function by recognizing the gesture of an object that moves up and down.

FIG. 31 illustrates where a first moving direction of the object is included in a third region, and a second moving direction of the object is included in a first region. The wearable device 100 performs a function corresponding to a combination of the third region and the first region. For example, the wearable device 100 performs the "move to lower folder" function by referring to a relationship between folders.

Figure 32:
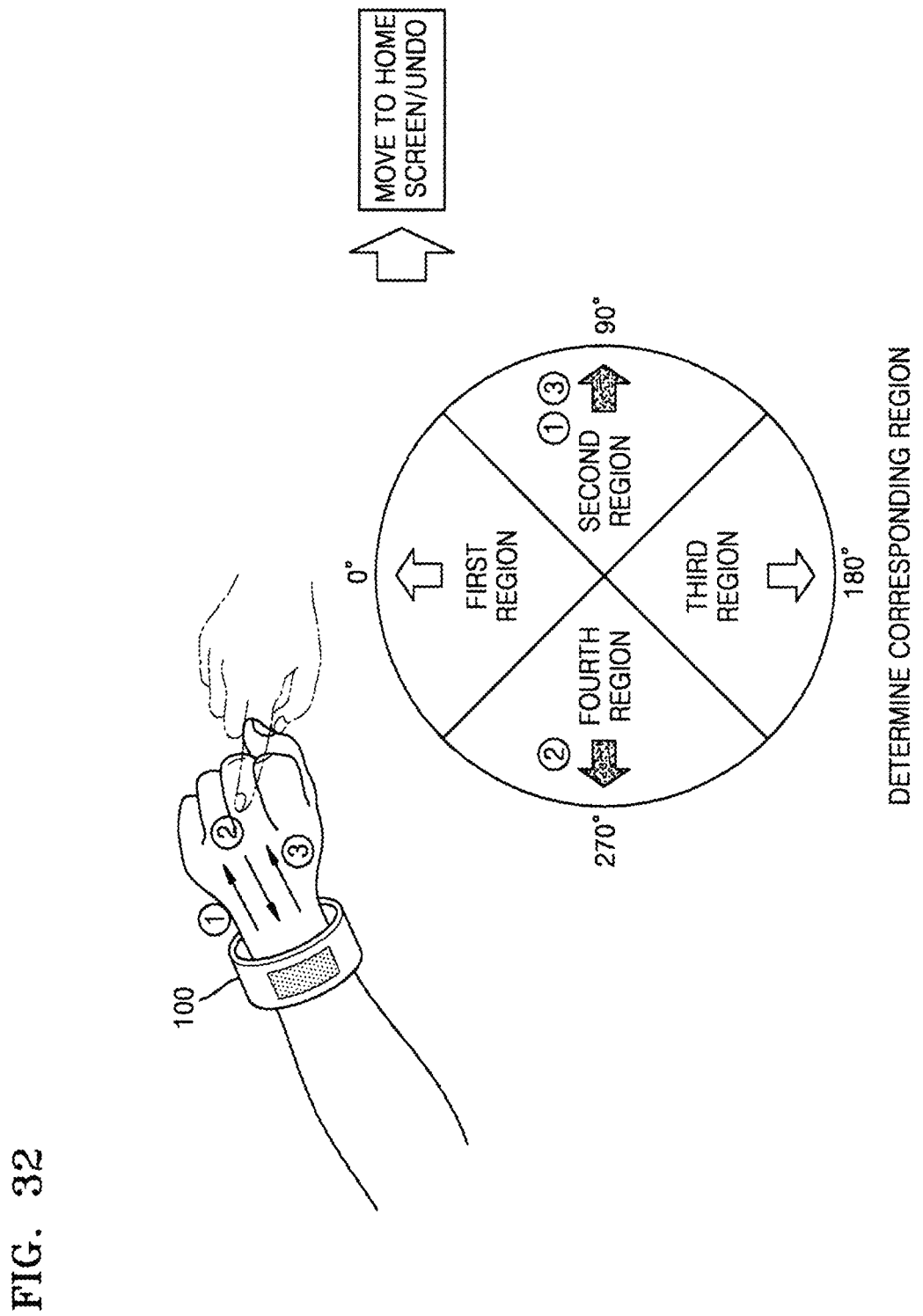
FIG. 32 illustrates a method in which a wearable device operates by recognizing a gesture, according to another embodiment of the present disclosure.

FIG. 32 illustrates a method in which a wearable device operates by recognizing a gesture, according to another embodiment of the present disclosure. Referring to FIG. 32, the wearable device 100 performs a "move to home screen or undo" function by recognizing the gesture of an object that moves right, left, and right.

FIG. 32 illustrates where a first moving direction of the object is included in a second region, a second moving direction of the object is included in a fourth region, and a third moving direction of the object is included in a second region. The wearable device 100 performs a function corresponding to a combination of a second region and a fourth region. For example, the wearable device 100 performs the "move to home screen or undo" function.

Figure 33:
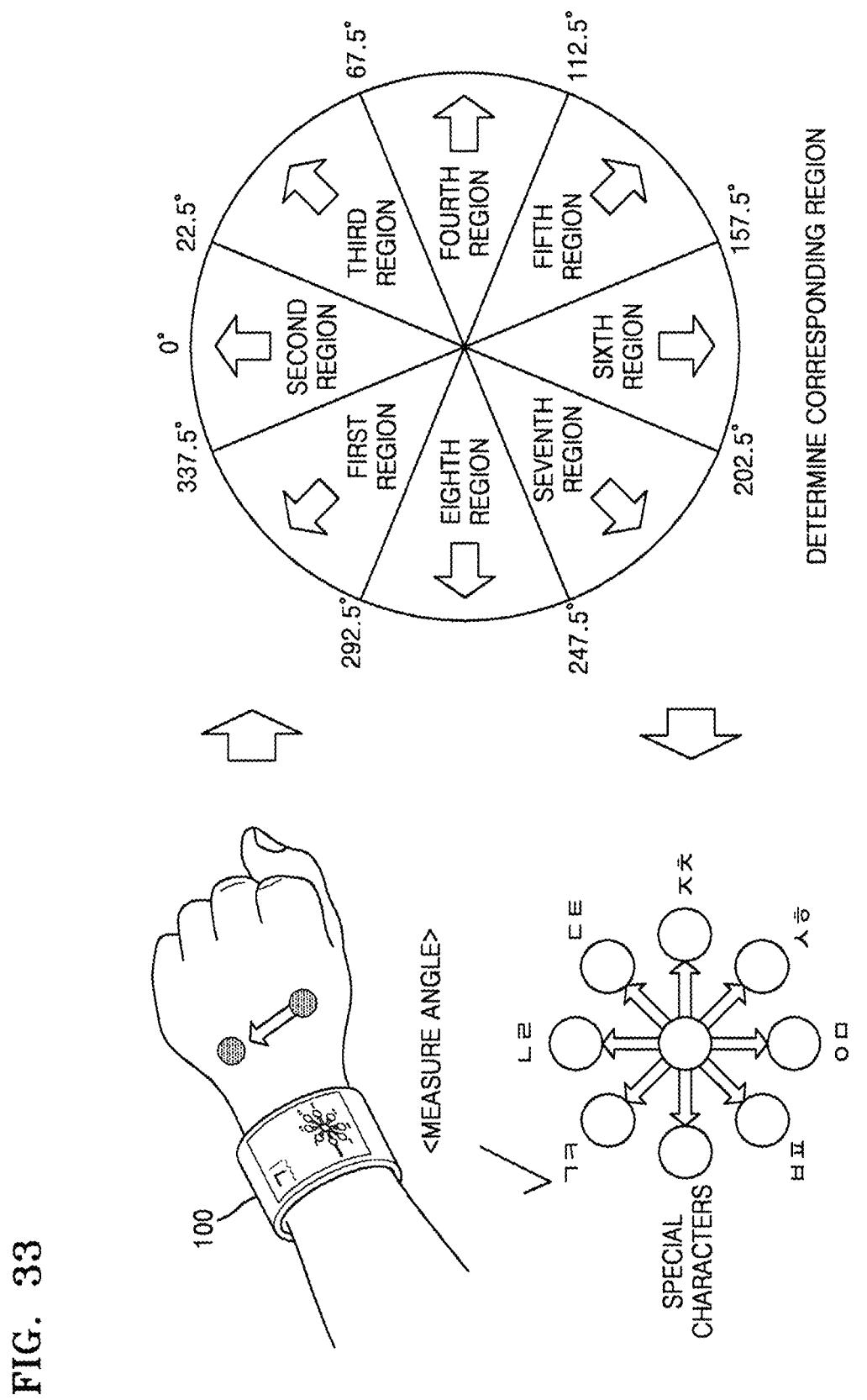
FIG. 33 illustrates a method in which a wearable device inputs text, according to another embodiment of the present disclosure.

FIG. 33 illustrates a method in which the wearable device 100 inputs characters, according to another embodiment of the present disclosure. Referring to FIG. 33, the wearable device 100 obtains a direction of a peripheral object and input the characters corresponding to the obtained direction.

The wearable device 100 detects the peripheral object of the wearable device 100 and obtains a moving direction of the peripheral object.

The wearable device 100 determines a region corresponding to and including the obtained direction. The wearable device 100 determines the number of regions according to a character input system. In FIG. 33, for example, the wearable device 100 sets 8 regions.

The wearable device 100 inputs characters corresponding to the determined region. The wearable device 100 designates characters corresponding to set regions in advance. For example, in FIG. 33, a first region corresponds to ㄱ and ㅋ, a second region corresponds to ㄴ and ㄹ, a third region corresponds to ㄷ and ㅌ, a fourth region corresponds to ㅈ and ㅊ, a fifth region corresponds to ㅅ and ㅎ, a sixth region corresponds to ㅇ and ㅁ, a seventh region corresponds to ㅂ and ㅍ, and an eighth region corresponds to special characters.

When each region corresponds to two or more characters, the wearable device 100 determines one of the two or more characters by additionally detecting an operation of a user. For example, the wearable device 100 additionally detects a tap operation of the user. If the wearable device 100 determines that the moving direction of the object corresponds to the first region, the wearable device 100 inputs ㄱ. If the wearable device 100 additionally detects the tap operation of the user, the wearable device 100 inputs ㅋ.

Figure 34:
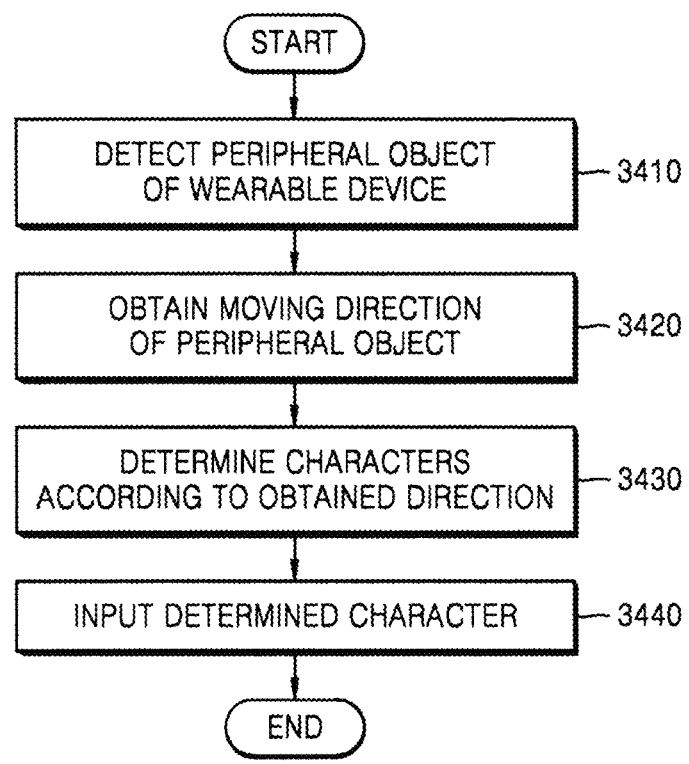
FIG. 34 is a flowchart of a method of operating a wearable device, according to another embodiment of the present disclosure.

FIG. 34 is a flowchart of a method of operating the wearable device 100, according to another embodiment of the present disclosure. Referring to FIG. 34, the wearable device 100 obtains a direction of an object and input characters.

In operation 3410, the wearable device 100 detects a peripheral object within a set range.

In operation 3420, the wearable device 100 obtains a moving direction of the peripheral object. If the peripheral object moves, the wearable device 100 calculates a moving angle of the peripheral object, such as by using a position of the peripheral object when the peripheral object is detected and a position of the peripheral object when the peripheral object stops moving.

In operation 3430, the wearable device 100 determines characters according to the obtained direction. The wearable device 100 sets regions according to the direction for each character input system, determines which region includes the obtained direction among the set regions, stores the characters mapped for each region and determines which character is mapped to the determined region.

In operation 3440, the wearable device 100 inputs the determined character. The wearable device 100 displays the determined character on the display unit 120.

FIGS. 35 through 41 illustrate a method of navigating the wearable device 100, according to embodiments of the present disclosure. Referring to FIGS. 35 through 41, the wearable device 100 detects a gesture of a user and performs an operation corresponding to the gesture.

Figure 35:
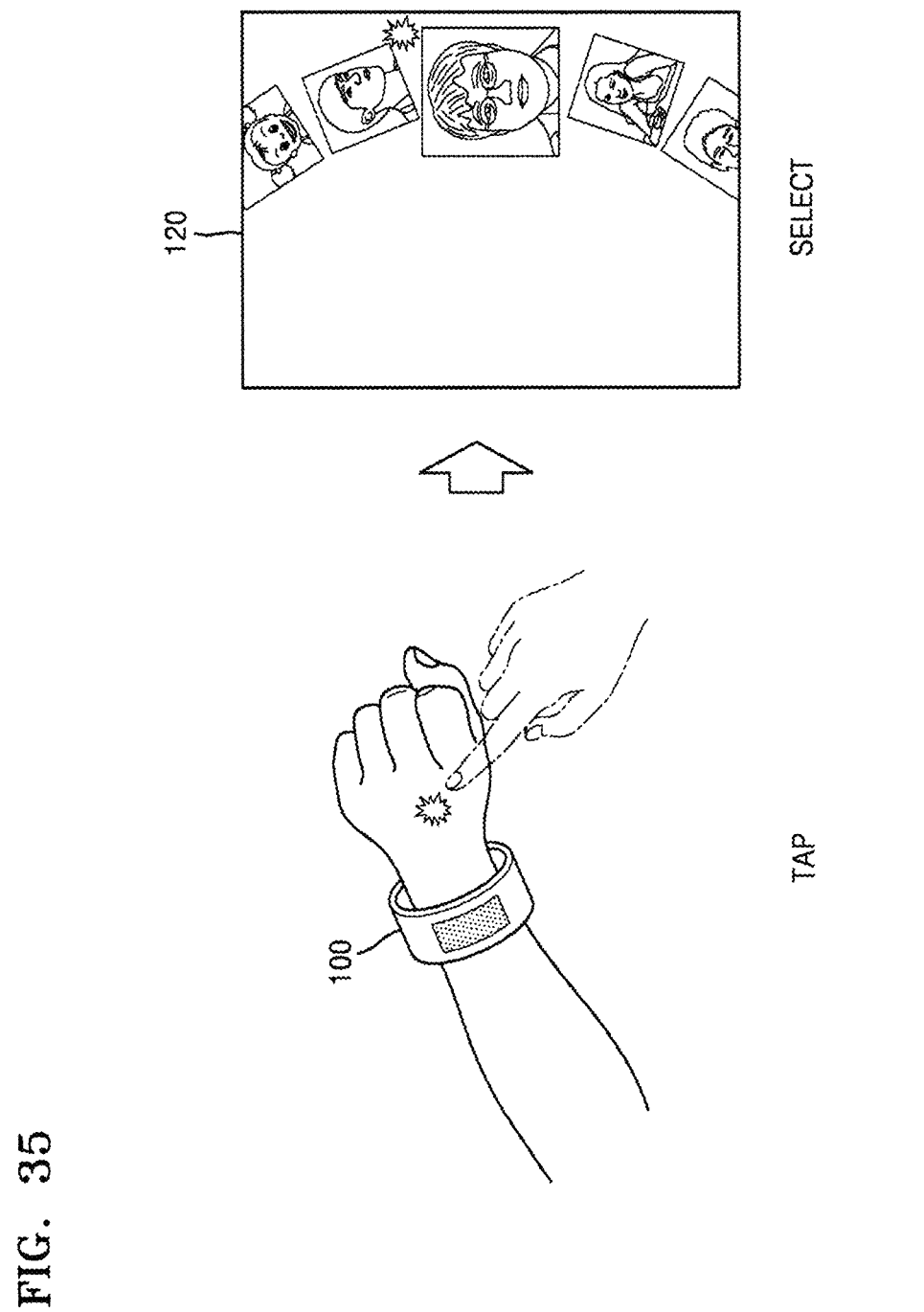

In FIG. 35, the wearable device 100 senses a tap operation and selects or executes a current item. The display unit 120 displays items. If the wearable device 100 senses the tap operation, the wearable device 100 selects the item currently displayed on the display unit 120.

Figure 36:
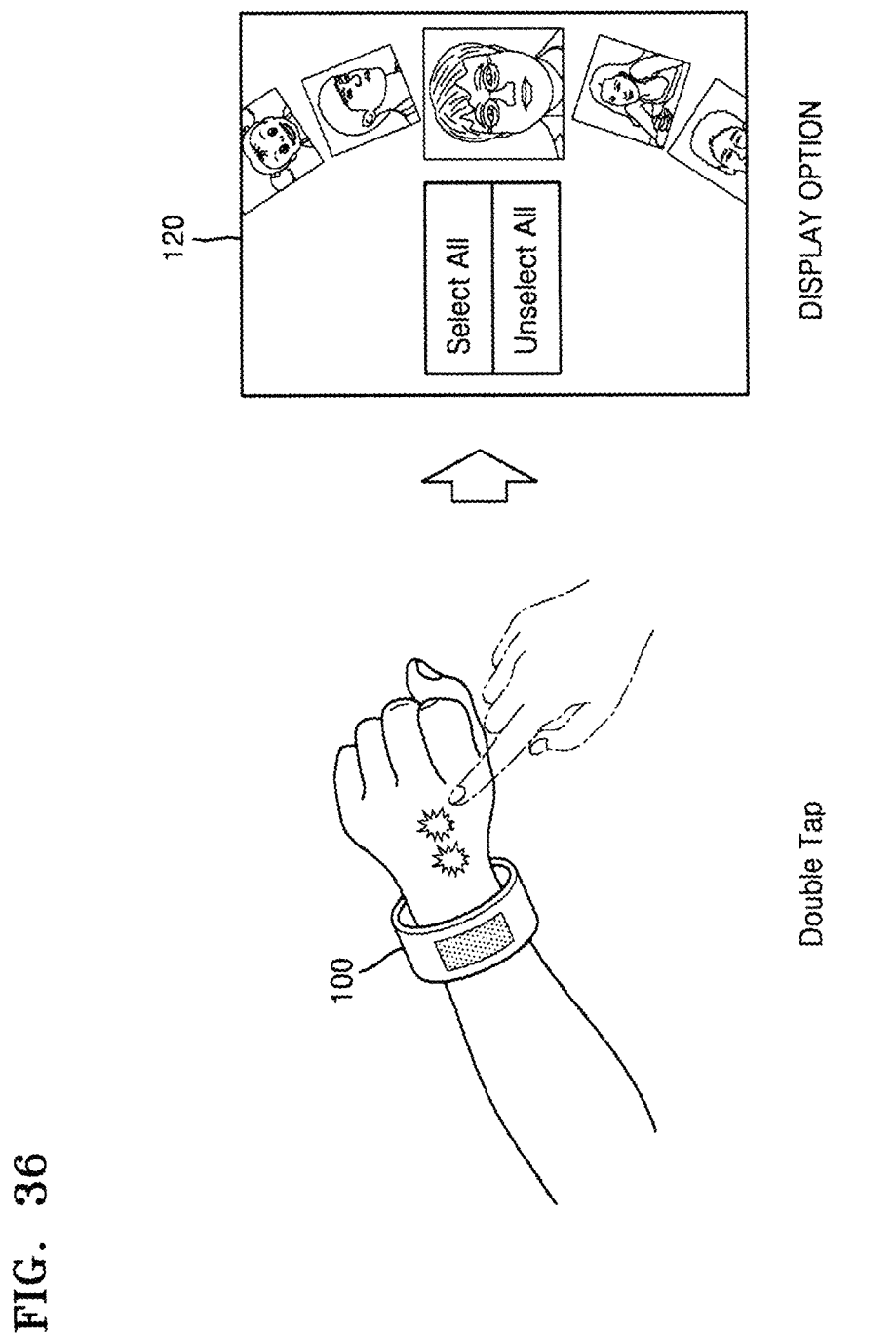

In FIG. 36, the wearable device 100 senses a double tap operation and displays an option on the display unit 120. For example, the wearable device 100 displays executable functions according to a current display status on the display unit 120. FIG. 36 illustrates where the wearable device 100 senses the double tap operation and displays "Select All" and "Unselect all" on the display unit 120.

Figure 37:
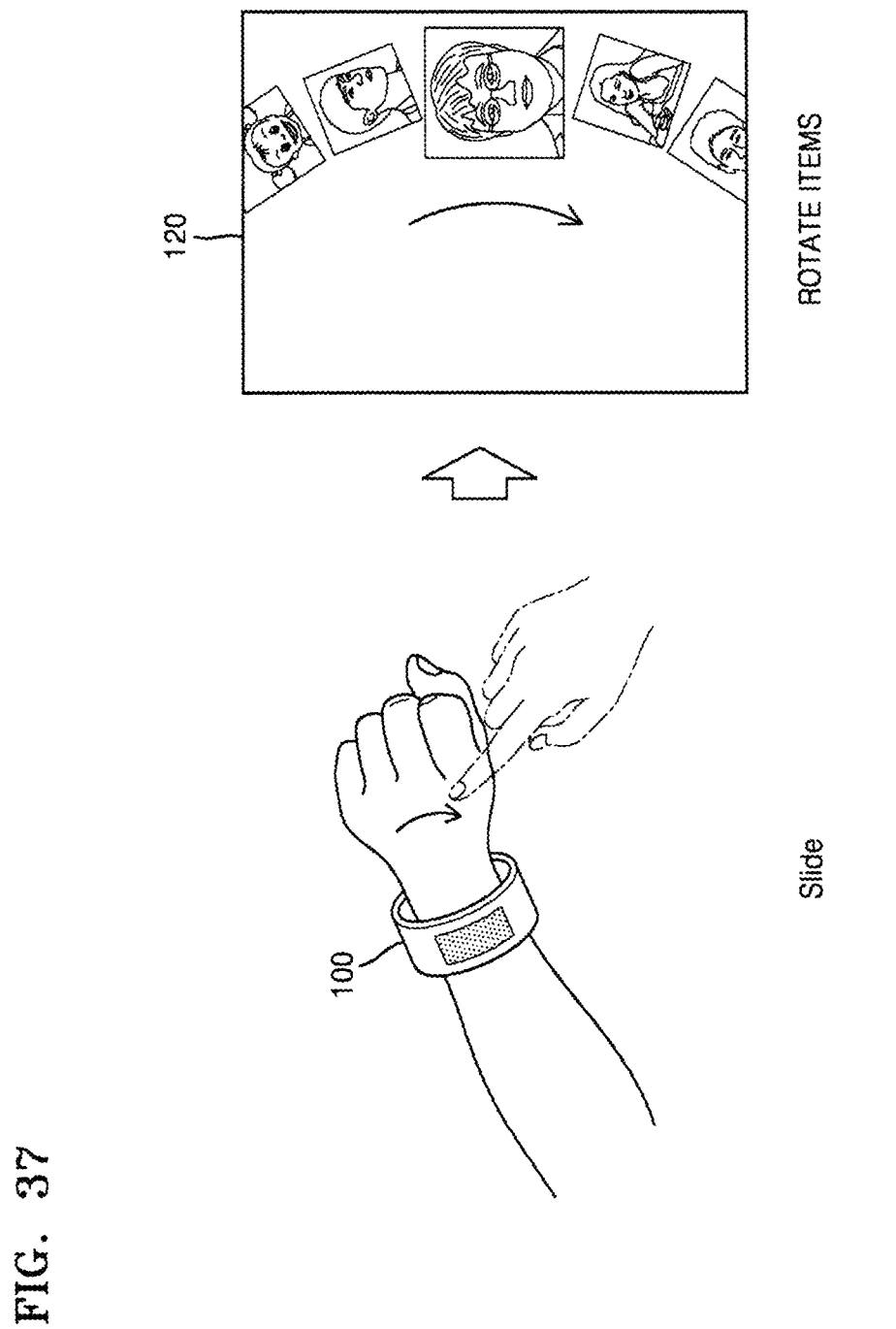

In FIG. 37, the wearable device 100 senses a slide operation and rotates items displayed on the display unit 120. The wearable device 100 determines a rotation direction of the items according to a direction in which a finger slides. In FIG. 37, the wearable device 100 senses an operation in which an object slides downward and moves the items displayed on the display unit 120 downward.

Figure 38:
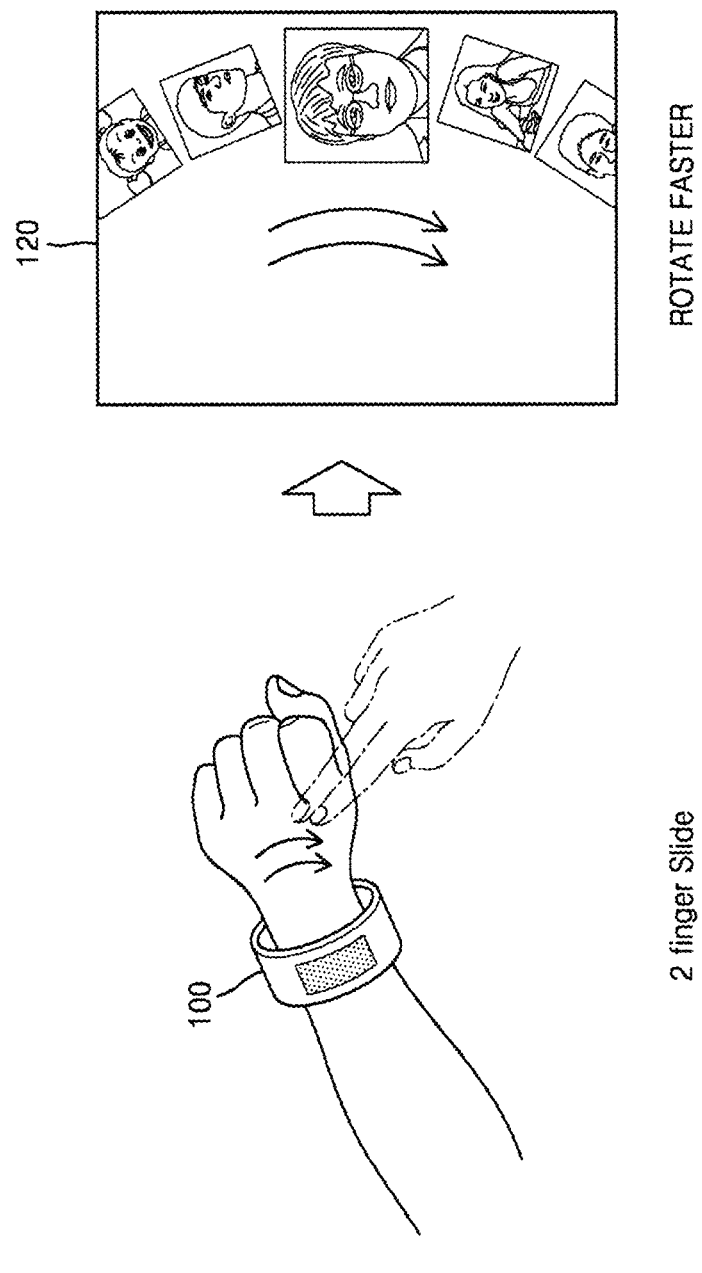

In FIG. 38, the wearable device 100 senses an operation in which two fingers slide and rotates items displayed on the display unit 120. The wearable device 100 increases a rotation speed of the items more when two fingers slide than when one finger slides.

In FIG. 39, the wearable device 100 senses a sweep operation of a finger and displays a home screen or performs an undo function. The wearable device 100 determines an operation in which the finger moves left and right more than 3 times as the sweep operation. The home screen is a basic screen such as an initial screen of the wearable device 100. The undo function is for undoing a most recently performed function.

Figure 40:
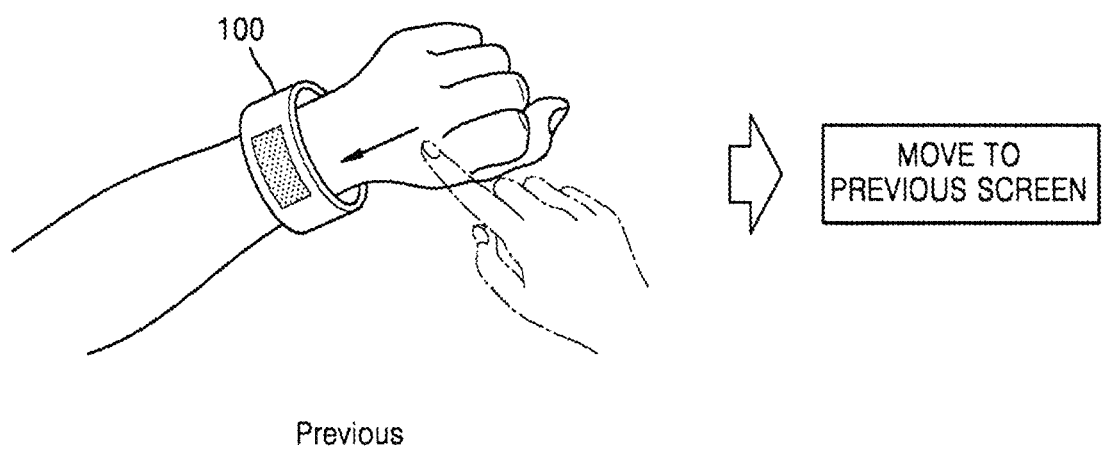

In FIG. 40, the wearable device 100 senses an operation in which a finger moves left and moves to a previous screen. The wearable device 100 displays a most recent screen before displaying a current screen.

In FIG. 41, the wearable device 100 senses an operation in which a finger moves right and moves to a next screen.

Figure 42:
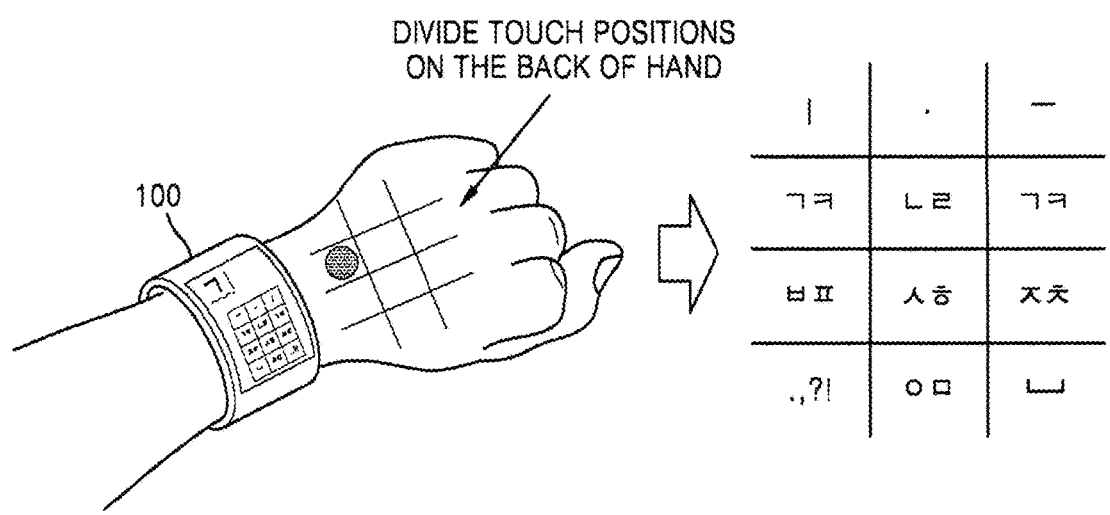
FIGS. 42 and 43 illustrate a method in which a wearable device senses a touch on the back of a hand and inputs characters, according to embodiments.
Figure 43:
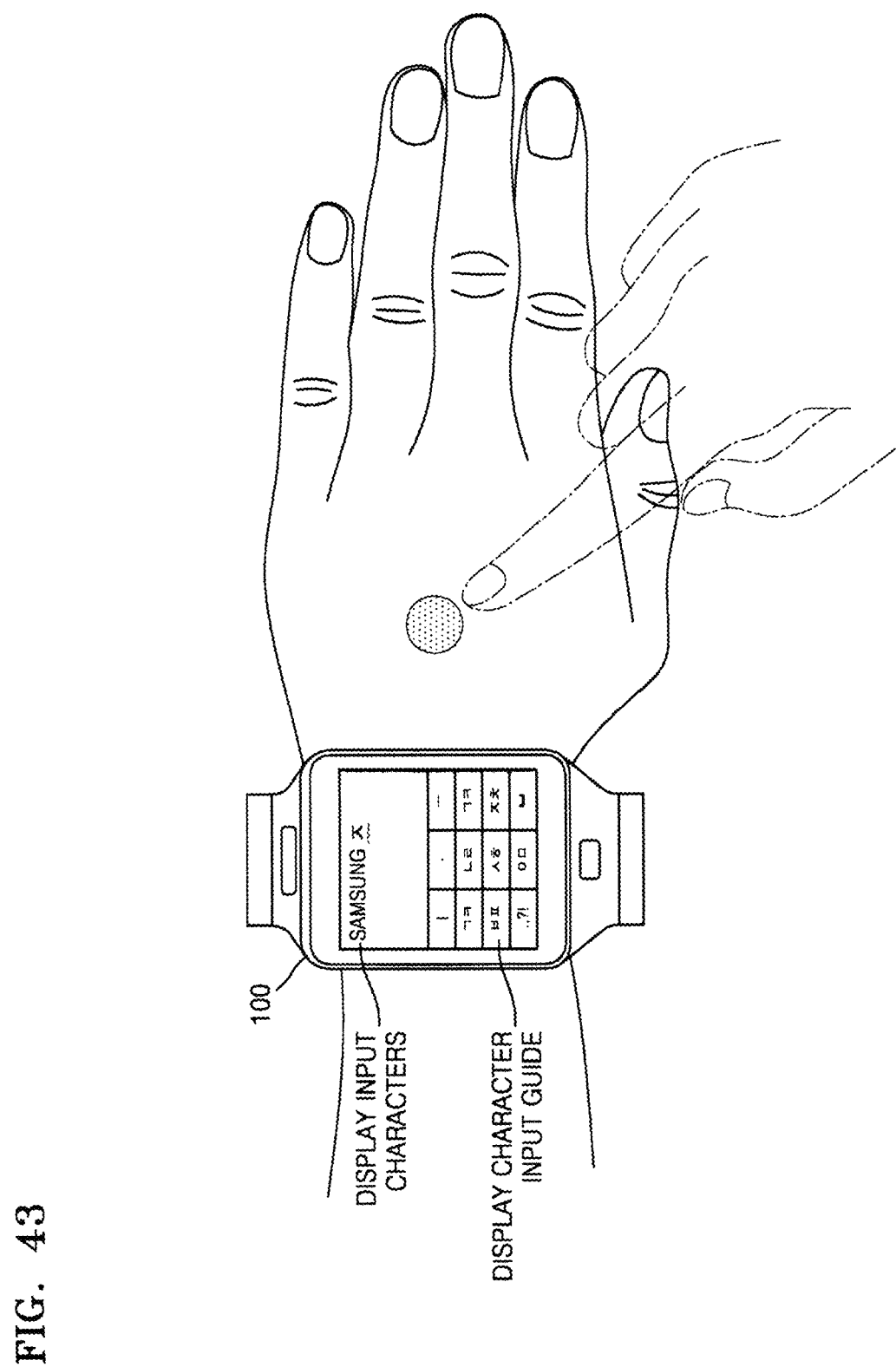

FIGS. 42 and 43 illustrate a method in which the wearable device 100 senses a touch on the back of a user's hand and inputs characters, according to embodiments of the present disclosure. The display unit 120 of the wearable device 100 is almost always smaller than that of a smart phone or a tablet PC. Thus, when a user touches the display unit 120 of the wearable device 100 and inputs characters, it is probable that a typo may occur. The wearable device 100 according to an embodiment sets a relatively wide region on the back of a user's hand compared to the display unit 120, thereby exactly identifying characters that are to be input by the user.

Referring to FIG. 42, the wearable device 100 divides the back of the user's hand into a plurality of regions. In FIG. 42, for example, the wearable device 100 divides the back of the hand into 12 regions.

The wearable device 100 sets a range of the back of the user's hand wearing the wearable device 100.

The wearable device 100 determines which region the user touches among the plurality of regions. The wearable device 100 senses which part of the back of the user's hand the user touches through a sensor provided in a side surface. In other words, the wearable device 100 determines a position in which a user's finger is sensed. For example, the wearable device 100 measures distances between two sensors and the user's finger and calculates the position where the user's finger is sensed by using the measured distances.

The wearable device 100 determines a character corresponding to a region touched by the user. The wearable device 100 maps a set region and the character. FIG. 42 illustrates characters mapped to 12 regions. For example, a second row and second column region is where ㄴ and ㄹ are mapped.

FIG. 43 illustrates characters input to the wearable device 100 and a guide for inputting displayed characters. Referring to FIG. 43, the wearable device 100 displays the characters input to the display unit 120 by sensing a user touch and inputting the characters according to the touched position.

The wearable device 100 displays a character input guide on the display unit 120. In other words, the wearable device 100 displays a status in which the characters are arranged on the display unit 120. A user may identify the touch position by referring to the character input guide.

Figure 44:
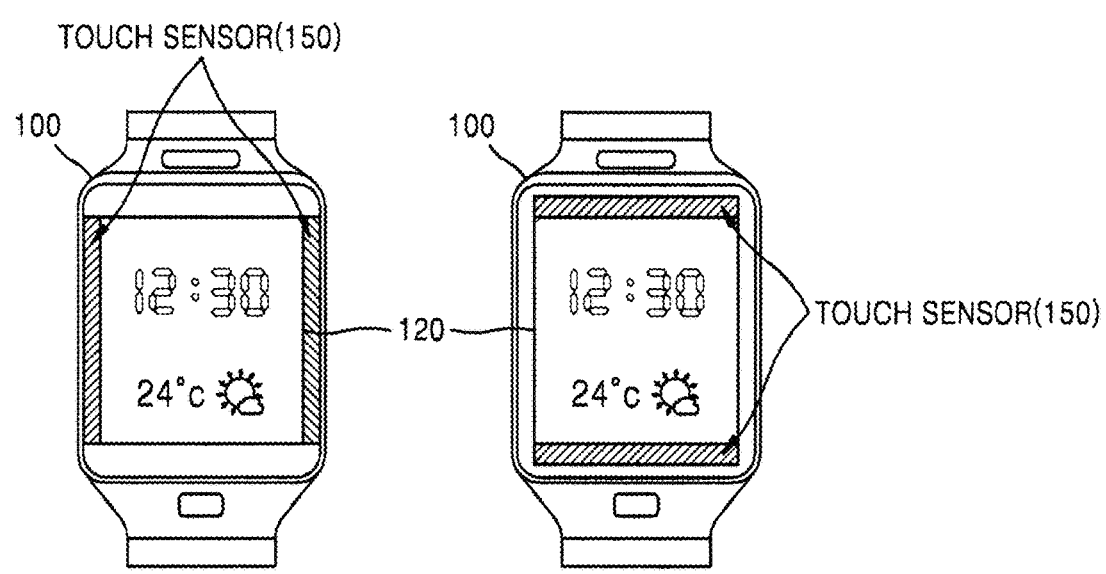
FIGS. 44 and 45 illustrate an arrangement of touch sensors of a wearable device, according to embodiments.
Figure 45:
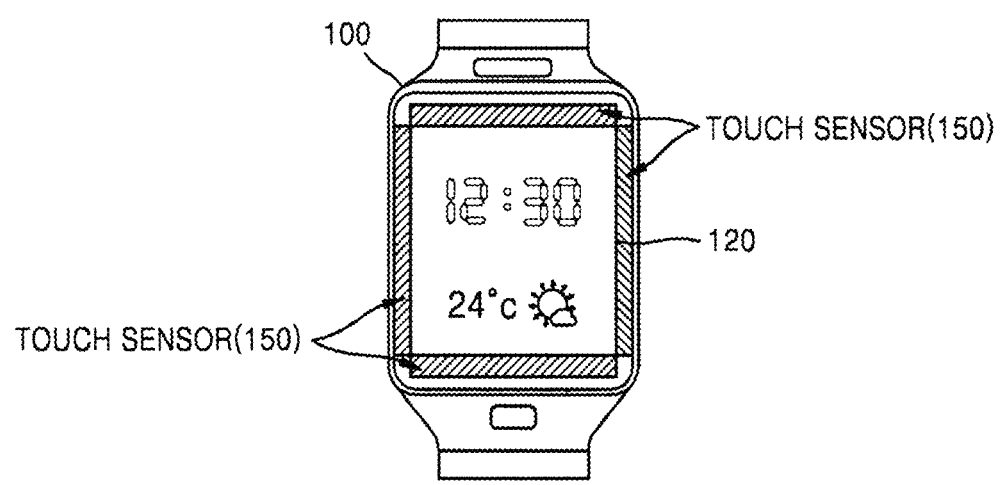

FIGS. 44 and 45 illustrate an arrangement of touch sensors 150 of the wearable device 100, according to embodiments of the present disclosure. Referring to FIG. 44, the wearable device 100 includes the touch sensors 150 in the left and right (shown in the left configuration of the wearable device 100) or up and down (shown in the right configuration of the wearable device 100) edge positions of the front of the wearable device 100. The touch sensors 150 are arranged to surround the display unit 120.

Figure 46:
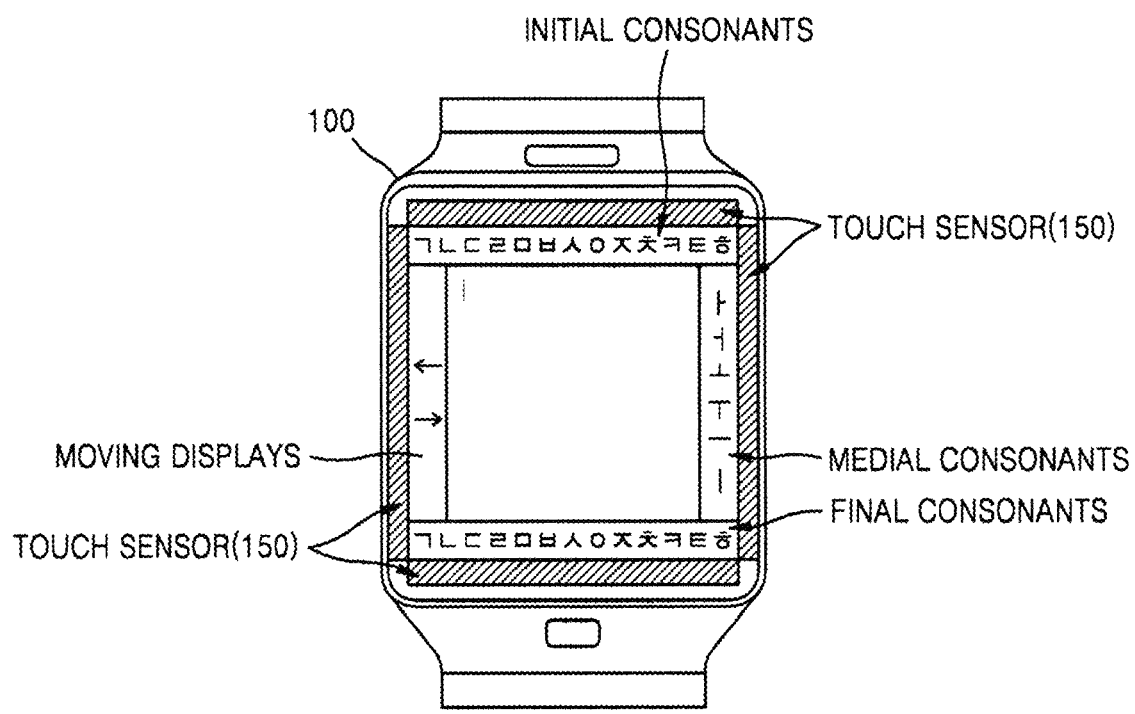
FIG. 46 illustrates a character input method, according to an embodiment of the present disclosure.

FIG. 46 illustrates a character input method, according to an embodiment of the present disclosure. Referring to FIG. 46, the wearable device 100 inputs characters by using the touch sensors 150. The wearable device 100 displays the characters in parallel to the touch sensors 150 disposed in four sides. For example, initial consonants are arranged in an upper side of the wearable device 100, medial consonants are arranged in a right side of the wearable device 100, final consonants are arranged in a lower side of the wearable device 100, and moving displays are arranged in a left side of the wearable device 100. The wearable device 100 determines a position in which a user touch is sensed in the touch sensors 150 and inputs characters arranged in the determined position. Korean characters are arranged in FIG. 46 but characters of various languages such as English, Japanese, and Spanish. may also be arranged.

Figure 47:
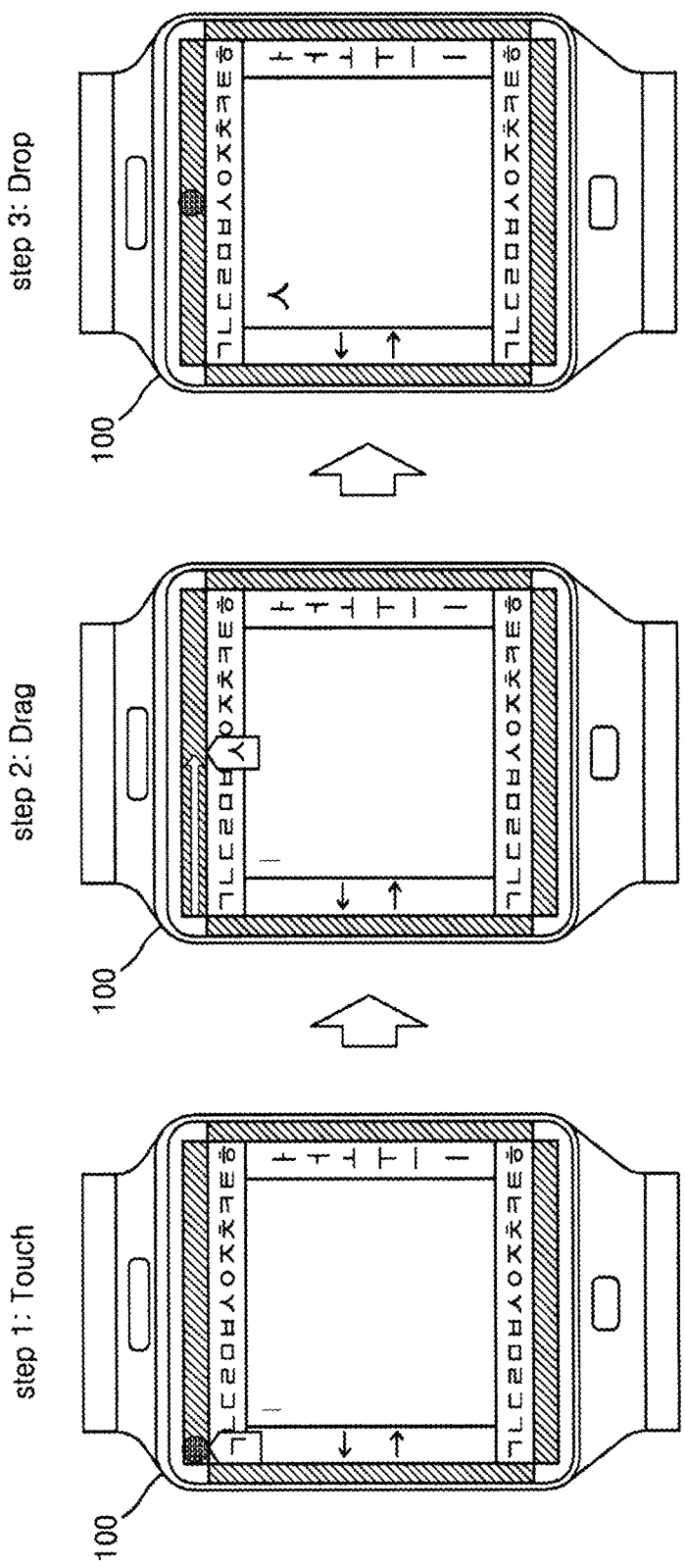
FIG. 47 illustrates a character input method, according to another embodiment of the present disclosure.

FIG. 47 illustrates a character input method, according to another embodiment of the present disclosure. Referring to FIG. 47, the wearable device 100 inputs characters by sensing touch, drag, and drop operations.

In step 1, the wearable device 100 senses the touch operation through the touch sensor 150. If the touch operation is sensed, the wearable device 100 determines a touched position and enlarges and displays a character disposed in the determined position.

In step 2, the wearable device 100 senses the drag operation through the touch sensor 150. The drag operation is where a user moves while touching the touch sensor 150. If the drag operation is sensed, the wearable device 100 enlarges a character according to a movement of a user touch input.

In step 3, the wearable device 100 senses the drop operation through the touch sensor 150. The drop operation is where a user ends a touch input. For example, a user's finger contacting the touch sensor 150 drops from the touch sensor 150. If the drop operation is sensed, the wearable device 100 inputs a character enlarged when the drop operation is sensed and displays the character on a display unit ㅅ is input in FIG. 47.

Figure 48:
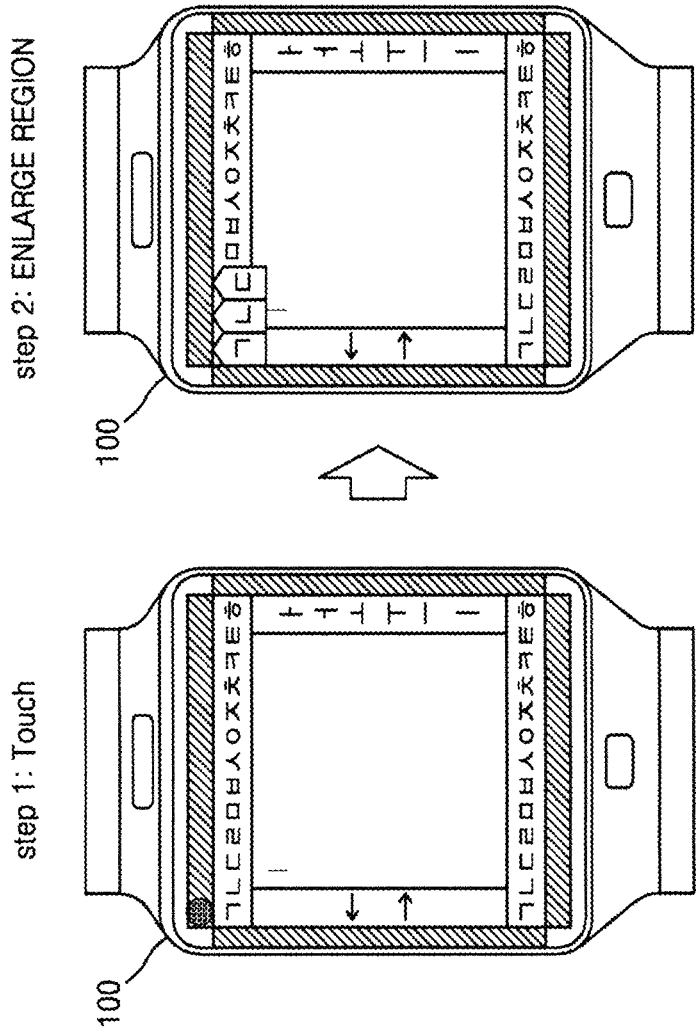
FIGS. 48 and 49 illustrate a character input method, according to another embodiment of the present disclosure.
Figure 49:
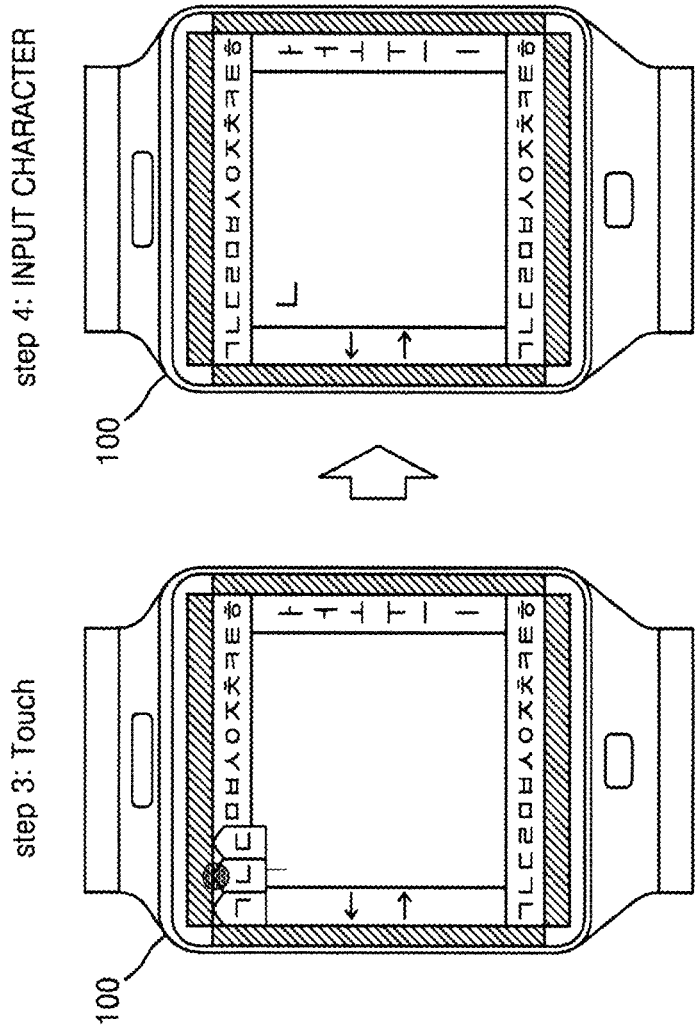

FIGS. 48 and 49 illustrate a character input method, according to another embodiment of the present disclosure. Referring to FIGS. 48 and 49, the wearable device 100 senses at least two touch operations and input characters.

In step 1, the wearable device 100 senses a touch operation through the touch sensor 150.

In step 2, if the touch operation is sensed, the wearable device 100 determines a touched position and enlarges and displays at least one character adjacent to the determined position. For example, the wearable device 100 enlarges and displays a character displayed on the determined position and a character displayed on a position most adjacent to the determined position. In FIG. 49, when a user touches the touch sensor 150 of a part on which ㄴ is displayed, the wearable device 100 enlarges and displays ㄱ and ㄷ adjacent to ㄴ.

In step 3, the user touches the touch sensor 150 or an enlarged character. In FIG. 49, the user touches ㄴ between ㄱ, ㄴ, and ㄷ.

In step 4, the wearable device 100 determines a character touched by a user among enlarged characters, input the determined character, and display the input character on a display unit.

FIGS. 50 through 54 illustrate a screen rotation method, according to embodiments of the present disclosure. Referring to FIGS. 50 through 54, the wearable device 100 rotates a screen by using the touch sensors 150 disposed in edges of the wearable device 100.

Figure 50:
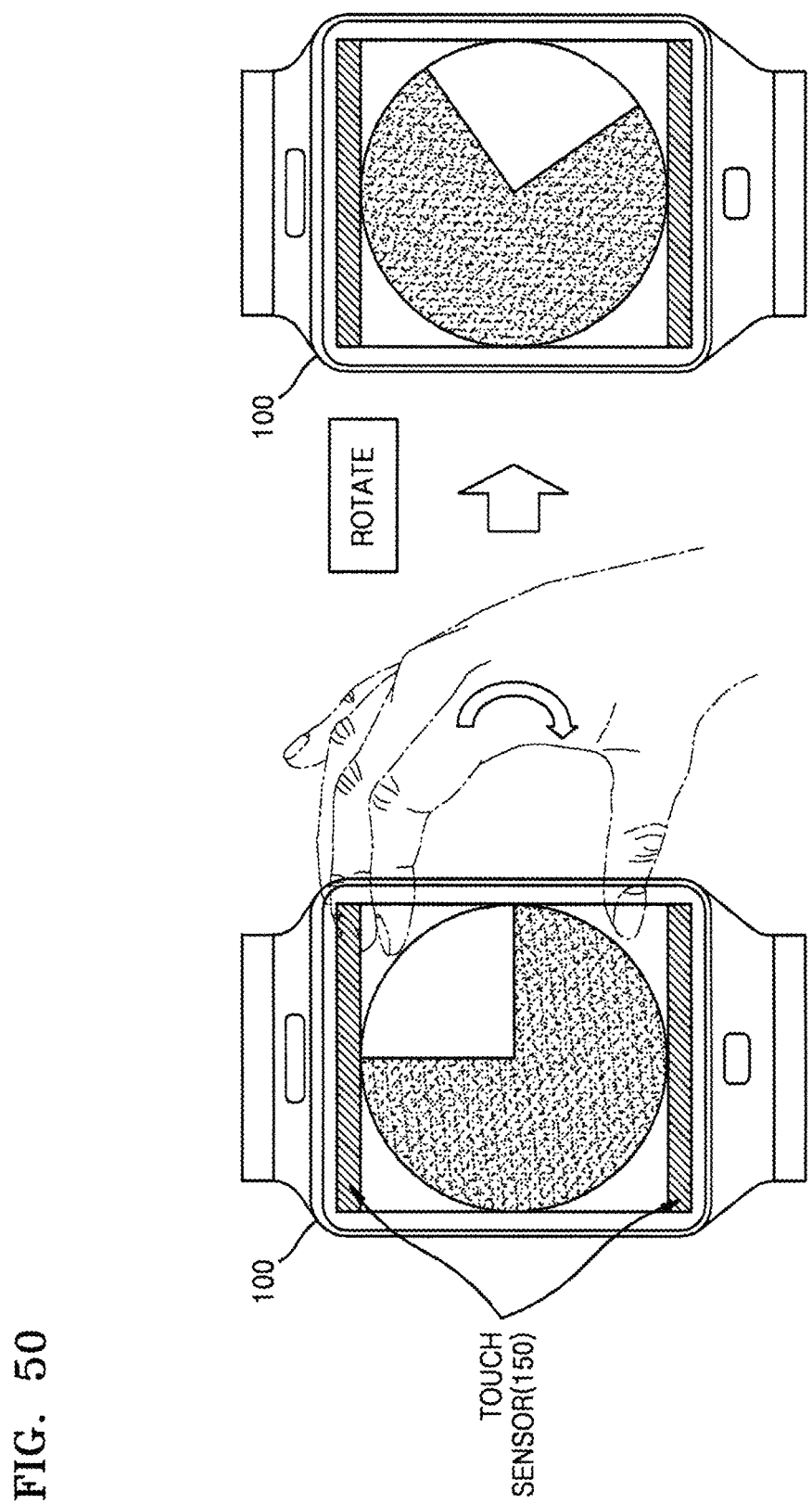
FIGS. 50 through 54 illustrate a screen rotation method, according to embodiments of the present disclosure.
Figure 51:
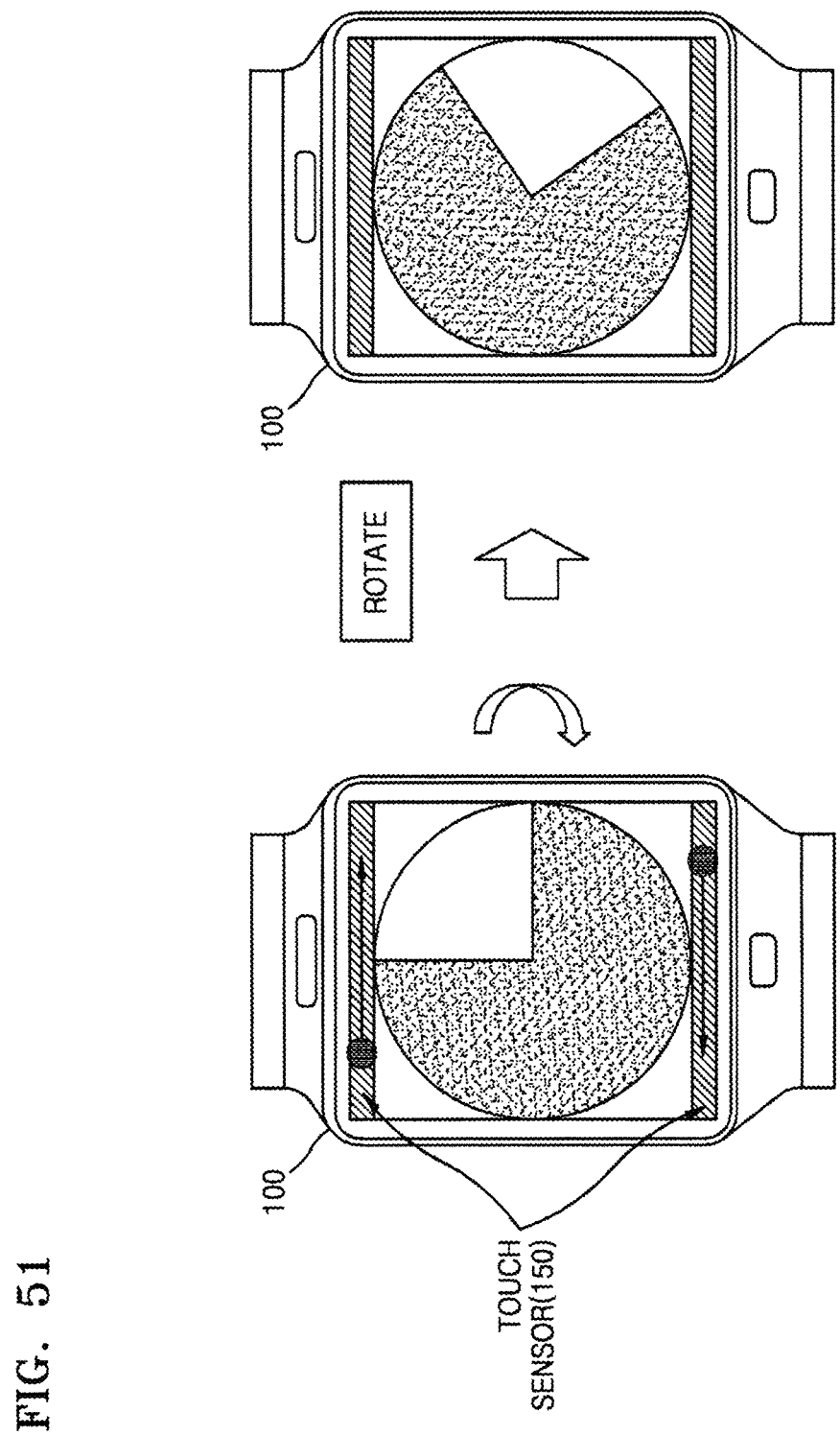

FIGS. 50 and 51 illustrate cases where the touch sensors 150 are disposed in upper and lower sides of the wearable device 100. The wearable device 100 receives a user touch through the touch sensors 150 disposed in the upper and lower sides and rotates the screen according to a pattern of the received touch. FIG. 50 illustrates an example in which the wearable device 100 rotates a figure in a clockwise direction according to a user input.

FIG. 51 illustrates a method of sensing a pattern of a user input of FIG. 50. The wearable device 100 senses touch and drag operations in the upper and lower touch sensors 150. The wearable device 100 determines directions of the drag operations sensed by the touch sensors 150. The wearable device 100 performs an operation set according to the directions of the drag operations sensed by the upper and lower touch sensors 150. For example, when the direction of the drag operation sensed by the upper touch sensor 150 and the direction of the drag operation sensed by the lower touch sensor 150 are opposite to each other, the wearable device 100 rotates the screen.

In FIG. 51, the upper touch sensor 150 senses the drag operation from a left direction to a right direction, and the lower touch sensor 150 senses the drag operation from the right direction to the left direction. The wearable device 100 rotates the screen in a clockwise direction.

Figure 52:
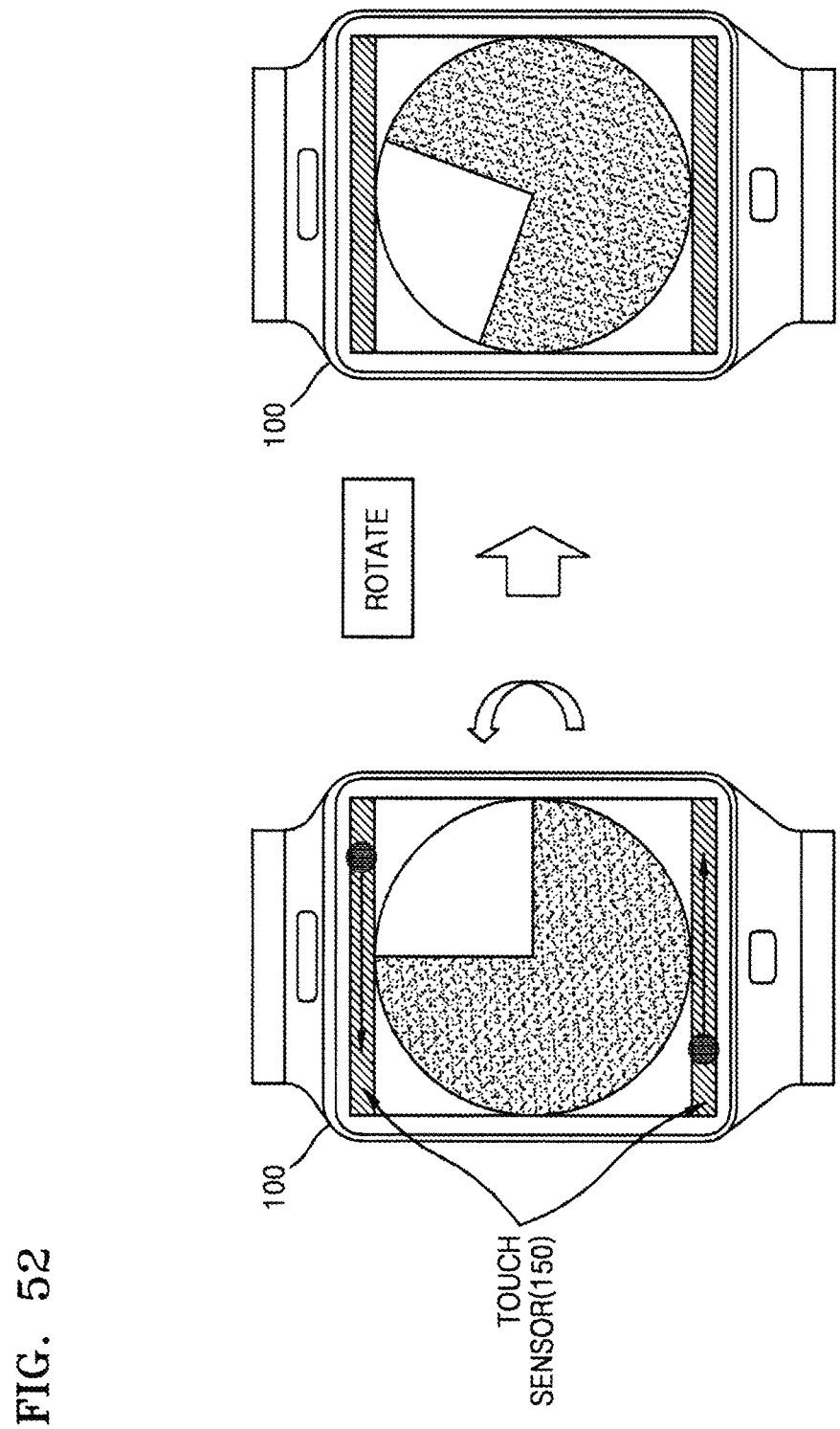

In FIG. 52, when the upper touch sensor 150 senses a drag operation from a right direction to a left direction, and the lower touch sensor 150 senses the drag operation from the left direction to the right direction, the wearable device 100 rotates a screen in a counterclockwise direction.

Figure 53:
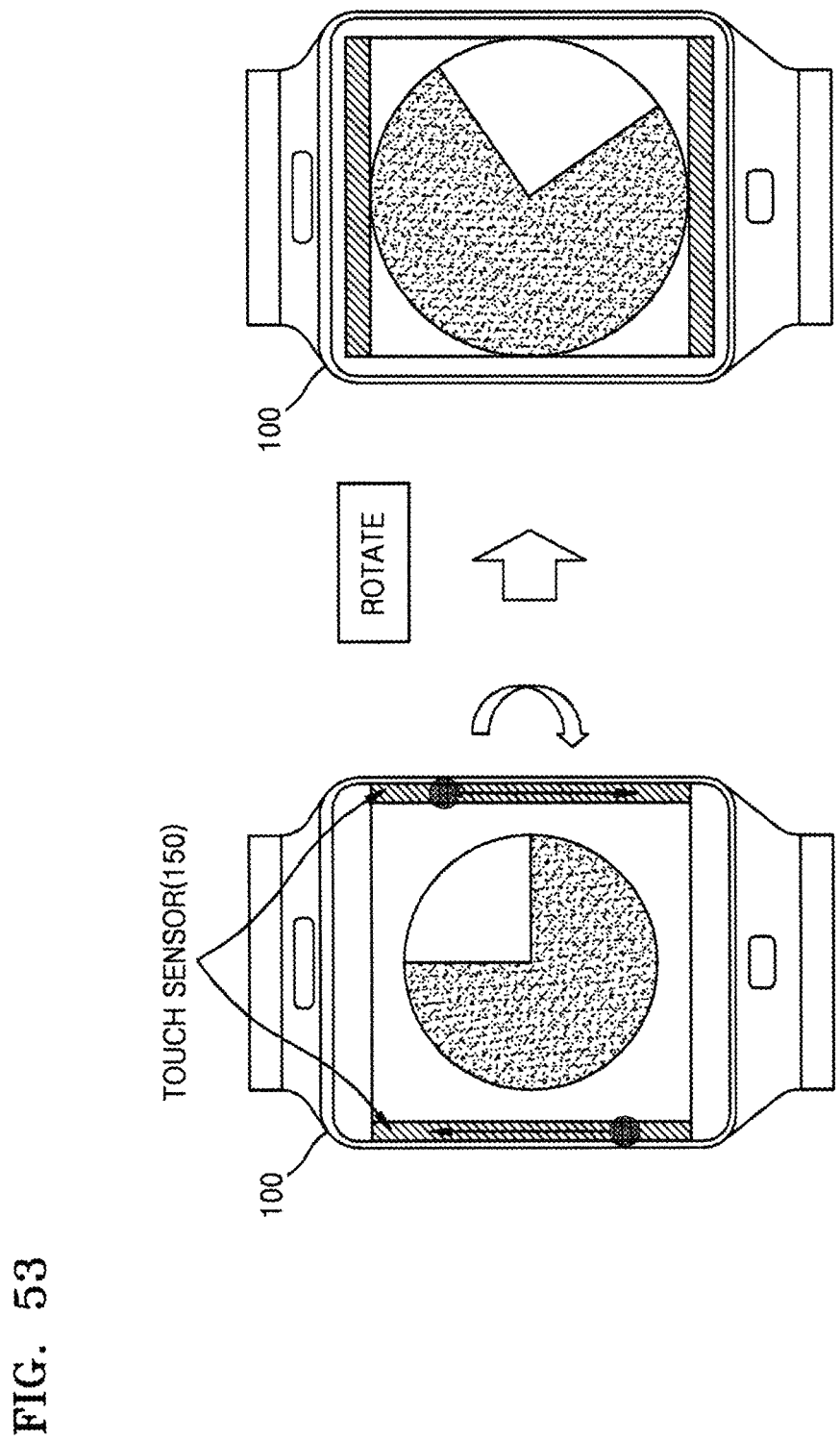
Figure 54:
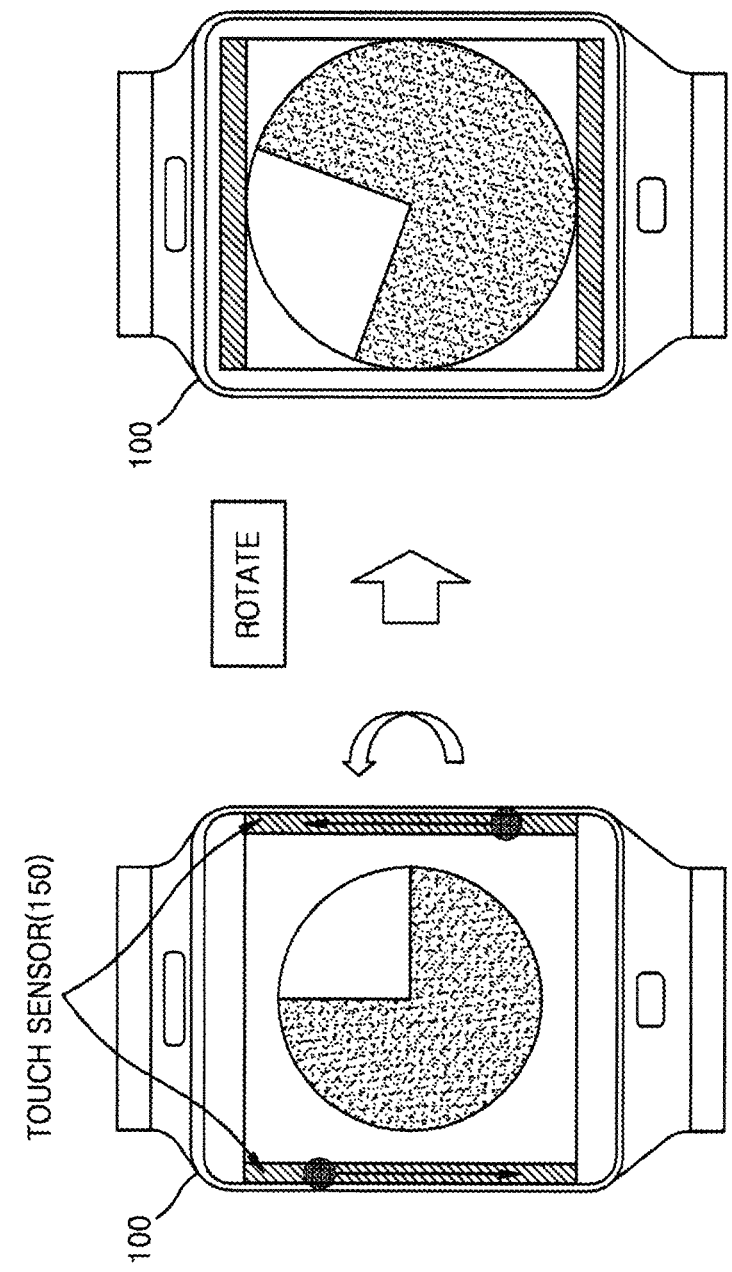

FIGS. 53 and 54 illustrate cases where the touch sensors 150 are disposed in left and right sides of the wearable device 100. The wearable device 100 receives a user touch through the touch sensors 150 disposed in the left and right sides and rotates a screen according to a pattern of the received touch.

FIG. 53 illustrates an example in which the wearable device 100 rotates a figure in a clockwise direction according to a user input. The wearable device 100 senses touch and drag operations in the left and right touch sensors 150. The wearable device 100 determines directions of the drag operations sensed by the touch sensors 150. The wearable device 100 performs an operation set according to the directions of the drag operations sensed by the left and right touch sensors 150. For example, when the direction of the drag operation sensed by the left touch sensor 150 and the direction of the drag operation sensed by the right touch sensor 150 are opposite to each other, the wearable device 100 rotates the screen.

In FIG. 53, the left touch sensor 150 senses the drag operation from a lower to an upper direction, and the right touch sensor 150 senses the drag operation from the upper to the lower direction. The wearable device 100 rotates the screen in a clockwise direction.

In FIG. 54, when the left touch sensor 150 senses a drag operation from an upper to a lower direction, and the right touch sensor 150 senses the drag operation from the lower to the upper direction, the wearable device 100 rotates a screen in a counterclockwise direction.

As described above, according to embodiments of the present disclosure, the method of operating the wearable device provides a user with a convenient menu selection method.

The device described herein may comprise a processor, a memory for storing and executing program data, a permanent storage unit such as a disk drive, a communications port for handling communications with external devices, and user interface devices, including a touch panel, keys, and buttons. When software modules or algorithms are involved, these software modules may be stored as program instructions or computer readable codes executable on a processor on a computer-readable medium. Examples of the computer readable recording medium include magnetic storage media such as Read-Only Memory (ROM), floppy disks, and hard disks, and optical recording media such as CD-ROMs or DVDs. The computer readable recording medium can also be distributed over network coupled computer systems so that the computer readable code is stored and executed in a distributed fashion. This media can be read by the computer, stored in the memory, and executed by the processor.

The inventive concept may be described in terms of functional block components and various processing steps. Such functional blocks may be realized by any number of hardware and/or software components configured to perform the specified functions. For example, the inventive concept may employ various integrated circuit (IC) components, such s memory elements, processing elements, logic elements, and look-up tables, which may perform a variety of functions under the control of one or more microprocessors or other control devices. Similarly, where the elements of the inventive concept are implemented using software programming or software elements, the inventive concept may be implemented with any programming or scripting language such as C, C++, Java, or an assembler, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, and data processing. The words "mechanism", "element", "means", and "configuration" are used broadly and are not limited to mechanical or physical embodiments, but can include software routines in conjunction with processors.

The particular implementations shown and described herein are illustrative examples of the inventive concept and are not intended to otherwise limit the scope of the inventive concept in any manner. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

It should be understood that the embodiments described herein should be considered in a descriptive sense only and not for purposes of limitation. Descriptions of features or aspects within each embodiment should typically be considered as available for other similar features or aspects in other embodiments.

While the present disclosure has been particularly shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A device comprising:
a sensor;
a display; and
a processor configured to:
control the sensor to detect a movement of a peripheral object,
control the display to display a plurality of items and a focus on at least one of the plurality of items,
determine a region including a detected movement of the peripheral object among one or more regions, and
shift the focus by changing a size of at least one of the plurality of items based on the determined region.

2. The device of claim 1, wherein the processor is further configured to calculate a coordinate of a start point at which the peripheral object starts moving and a coordinate of an end point at which the peripheral object stops moving and obtain a moving direction of the peripheral object using a position relationship between the start and end points and the device.

3. The device of claim 1, wherein the movement of the peripheral object is positioned outside of a periphery of the device.

4. The device of claim 1, wherein the processor is further configured to set the one or more regions based on the detected movement of the peripheral object and neutral regions between the one or more regions.

5. The device of claim 4, wherein the processor is further configured to control the display to provide a user with feedback when the detected movement of the peripheral object is included in the neutral regions.

6. The device of claim 1, wherein the processor is further configured to obtain the detected movement of the peripheral object at one of sides and in front of the device.

7. The device of claim 1, wherein the processor is further configured to set regions corresponding to shiftable directions of the focus according to a current position of the focus, and determine a region including the detected movement of the peripheral object among the regions corresponding to the shiftable directions of the focus.

8. The device of claim 1, wherein the processor is further configured to calculate a moving angle of the peripheral object and determine a shifting direction of the focus.

9. A method of operating a device, the method comprising:
displaying a plurality of items and displaying a focus on at least one of the plurality of items;
detecting a movement of a peripheral object;
determining a region including a detected movement of the peripheral object among one or more regions; and
shifting the focus by changing a size of at least one of the plurality of items based on the determined region.

10. The method of claim 9, further comprising:
calculating a coordinate of a start point at which the peripheral object starts moving and a coordinate of an end point at which the peripheral object stops moving and obtaining a moving direction of the peripheral object using the device and a position relationship between the start and end points and the device.

11. The method of claim 9, wherein the movement of the peripheral object is positioned outside of a periphery of the device.

12. The method of claim 9, further comprising:
setting the one or more regions based on the detected movement of the peripheral object; and
setting neutral regions between the one or more regions.

13. The method of claim 12, further comprising:
providing a user with feedback when the detected movement of the peripheral object is included in the neutral regions.

14. The method of claim 12, wherein setting the one or more regions comprises setting regions corresponding to shiftable directions of the focus according to a current position of the focus.

15. The method of claim 9, wherein the detected movement of the peripheral object is obtained at sides of the device.

16. The method of claim 9, wherein shifting the focus comprises:
calculating a moving angle of the peripheral object, determining a shifting direction of the focus, and shifting the focus according to the calculated moving angle.

17. A method of operating a device, the method comprising:
displaying a first item;
obtaining a movement of a peripheral object that is positioned outside of a periphery of the device, wherein a processor determines a region including the movement of the peripheral object among one or more regions, and determines a shifting direction of a focus;
determining a second item to be displayed, based on the obtained movement of the peripheral object; and
displaying the second item.

18. The method of claim 17, wherein the first and second items are displayed on a screen of the device.

19. The method of claim 17, wherein a direction of the movement of the peripheral object is obtained by calculating a moving angle of the peripheral device in relation to the device.

20. The method of claim 17, wherein the second item to be is determined according to relative positions of the first and second items.

* * * * *